United States Patent
Huang et al.

(10) Patent No.: US 11,057,636 B2
(45) Date of Patent: Jul. 6, 2021

(54) AFFINE MOTION PREDICTION

(71) Applicant: QUALCOMM Incorporated, San Diego, CA (US)

(72) Inventors: Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/572,387

(22) Filed: Sep. 16, 2019

(65) Prior Publication Data

US 2020/0092577 A1 Mar. 19, 2020

Related U.S. Application Data

(60) Provisional application No. 62/732,555, filed on Sep. 17, 2018, provisional application No. 62/735,051, (Continued)

(51) Int. Cl.
*H04N 19/176* (2014.01)
*H04N 19/16* (2014.01)
(Continued)

(52) U.S. Cl.
CPC ........... *H04N 19/52* (2014.11); *G06T 3/0075* (2013.01); *H04N 19/15* (2014.11); *H04N 19/176* (2014.11);
(Continued)

(58) Field of Classification Search
CPC ....................................................... H04N 19/52
See application file for complete search history.

(56) References Cited

U.S. PATENT DOCUMENTS 10,462,488 B1 * 10/2019 Li .......................... H04N 19/105
10,638,152 B2 * 4/2020 Chuang ................ H04N 19/423
(Continued)

FOREIGN PATENT DOCUMENTS

WO 2017157259 A1 9/2017
WO WO-2017156705 A1 * 9/2017 ........... H04N 19/105
(Continued)

OTHER PUBLICATIONS

Lin, et al., Affine transform prediction for next generation video coding, ISO/IEC JTC1/SC29/WG11 MPEG2015/ m37525, Oct. 2015, Geneva, Switzerland (Year: 2015).*
(Continued)

*Primary Examiner* — Alison Slater
(74) *Attorney, Agent, or Firm* — Polsinelli LLP

(57) ABSTRACT

Systems and techniques for improving costs and efficiency in affine motion prediction of a current block includes storing motion information of previously coded block in a line buffer or one or more local buffers of a coding unit such as coding tree unit (CTU). The line buffer can store motion information of a line of coding blocks located at a boundary of the CTU, while the local buffers can be utilized for storing motion information of coding blocks located anywhere in the CTU. The utilization of the line buffer can be improved by limiting the number of motion vectors of a neighboring block stored in the line buffer and obtaining remaining motion vectors from an additional block when available. The utilization of local buffers can be improved by restricting a size of neighboring blocks whose motion information is stored in the local buffers.

30 Claims, 24 Drawing Sheets

Related U.S. Application Data filed on Sep. 22, 2018, provisional application No. 62/742,435, filed on Oct. 7, 2018.

(51) Int. Cl.
| | |
|---|---|
| *H04N 19/105* | (2014.01) |
| *H04N 19/52* | (2014.01) |
| *H04N 19/96* | (2014.01) |
| *H04N 19/46* | (2014.01) |
| *H04N 19/50* | (2014.01) |
| *H04N 19/15* | (2014.01) |
| *H04N 19/169* | (2014.01) |
| *G06T 3/00* | (2006.01) |

(52) U.S. Cl.
CPC ......... *H04N 19/1883* (2014.11); *H04N 19/46* (2014.11); *H04N 19/96* (2014.11)

(56) References Cited

U.S. PATENT DOCUMENTS

| | | |
|---|---|---|
| 2013/0039426 A1 | 2/2013 | Helle et al. |
| 2014/0341291 A1 | 11/2014 | Schwarz et al. |
| 2018/0220149 A1 | 8/2018 | Son et al. |
| 2018/0234697 A1 | 8/2018 | Jang et al. |
| 2019/0028731 A1 | 1/2019 | Chuang et al. |
| 2019/0058896 A1 | 2/2019 | Huang et al. |
| 2019/0082191 A1* | 3/2019 | Chuang ............... H04N 19/176 |
| 2019/0089960 A1* | 3/2019 | Chen ................... H04N 19/54 |
| 2019/0116376 A1 | 4/2019 | Chen et al. |
| 2019/0327482 A1 | 10/2019 | Lin et al. |
| 2019/0335170 A1 | 10/2019 | Lee et al. |
| 2019/0342547 A1 | 11/2019 | Lee et al. |
| 2019/0385276 A1 | 12/2019 | Kondo |
| 2019/0387251 A1 | 12/2019 | Lin et al. |
| 2020/0007877 A1* | 1/2020 | Zhou ................... H04N 19/52 |
| 2020/0021836 A1* | 1/2020 | Xu ...................... H04N 19/176 |
| 2020/0021839 A1 | 1/2020 | Pham Van et al. |
| 2020/0021840 A1 | 1/2020 | Xu et al. |
| 2020/0029089 A1* | 1/2020 | Xu ...................... H04N 19/61 |
| 2020/0036997 A1* | 1/2020 | Li ....................... H04N 19/577 |
| 2020/0059659 A1* | 2/2020 | Chen ................... H04N 19/52 |
| 2020/0077113 A1 | 3/2020 | Huang et al. |
| 2020/0092578 A1* | 3/2020 | Huang ................. H04N 19/52 |
| 2020/0099949 A1 | 3/2020 | Xu et al. |
| 2020/0169738 A1* | 5/2020 | Piao ................... H04N 19/129 |
| 2020/0204824 A1* | 6/2020 | Lai ..................... H04N 19/126 |

FOREIGN PATENT DOCUMENTS

| | | | |
|---|---|---|---|
| WO | WO-2018061563 A1 * | 4/2018 | ............. H04N 19/54 |
| WO | 2018126163 A1 | 7/2018 | |

OTHER PUBLICATIONS

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pages.

Hsiao Y-L., et al., "CE42-related: MV Buffer Reduction for Non-adjacent Spatial Merge Candidates", 11. JVET Meeting: 20180711-20180718; Ljubljana; (The Joint Video Exploration Team of ISO/IEC JTC1/SC29/WG11 and ITU-TSG.16), No. JVET-K0246, Jul. 10, 2018, XP030199297, 6 pages, Retrieved from the Internet: URL: http://phenix.int-evry.fr/jvet/doc_end_user/documents/11_Ljubljana/wg11/JVET-K0246-v3.zip JVET-K0246-v2.docx [retrieved on Jul. 10, 2018] the whole document.

Huang (Qualcomm) H., et al., "CE4-related: Size Constrain for Inherited Affine Motion Prediction", 12. JVET Meeting: 20181003-20181012; Macao; (The Joint Video Exploration Team of ISO/IEC JTC1/SC29/WG11 and ITU-T SG.16), No. JVET-L0281, Sep. 25, 2018, XP030193817, 4 Pages, Retrieved from the Internet: URL: http://phenix.int-evry.fr/jvet/doc_end_user/documents/12_Macao/wg11/JVET-L0281-v1.zip JVET-L0281-CE4-related Size Constrain for affine inherited motion vector predictor.docx [retrieved on Sep. 25, 2018] the whole document.

Huang (Qualcomm) H., et al., "CE4: Test Results of CE4.1.10 and CE4.1.13", 12. JVET_Meeting; 20181003-20181012; Macao; (The Joint Video Exploration Team of ISO/IEC JTC1/SC29/WG11 and ITU-T SG.16), No. JVET-L0273, Sep. 25, 2018, XP030193810, 6 Pages, Retrieved from the Internet: URL: http://phenix.int-evry.fr/jvet/doc_end_user/documents/12_Macao/wg11/JVET-L0273-v1.zip JVET-L0273-CE4.1.10 and CE4.1.13.docx [retrieved on Sep. 25, 2018] the whole document.

International Search Report and Written Opinion—PCT/US2019/051581—ISA/EPO—dated Dec. 13, 2019.

Zhou (BROADCOM) M., et al., "Non-CE4: A Study on the Affine Merge Mode", 11. JVET Meeting; 20180711-20180718; Ljubljana; (The Joint Video Exploration Team of ISO/IEC JTC1/SC29 WG11 and ITU-TSG.16), No. JVET-K0052, Jul. 7, 2018, XP030199055, 10 Pages, Retrieved from the Internet: URL: http://phenix.int-evry.fr/jvet/doc_end_user/documents/11_Ljubljana/wg11/JVET-K0052-v2.zip JVET-K0052_v2.docx [retrieved on Jul. 7, 2018] abstract section 3.

* cited by examiner

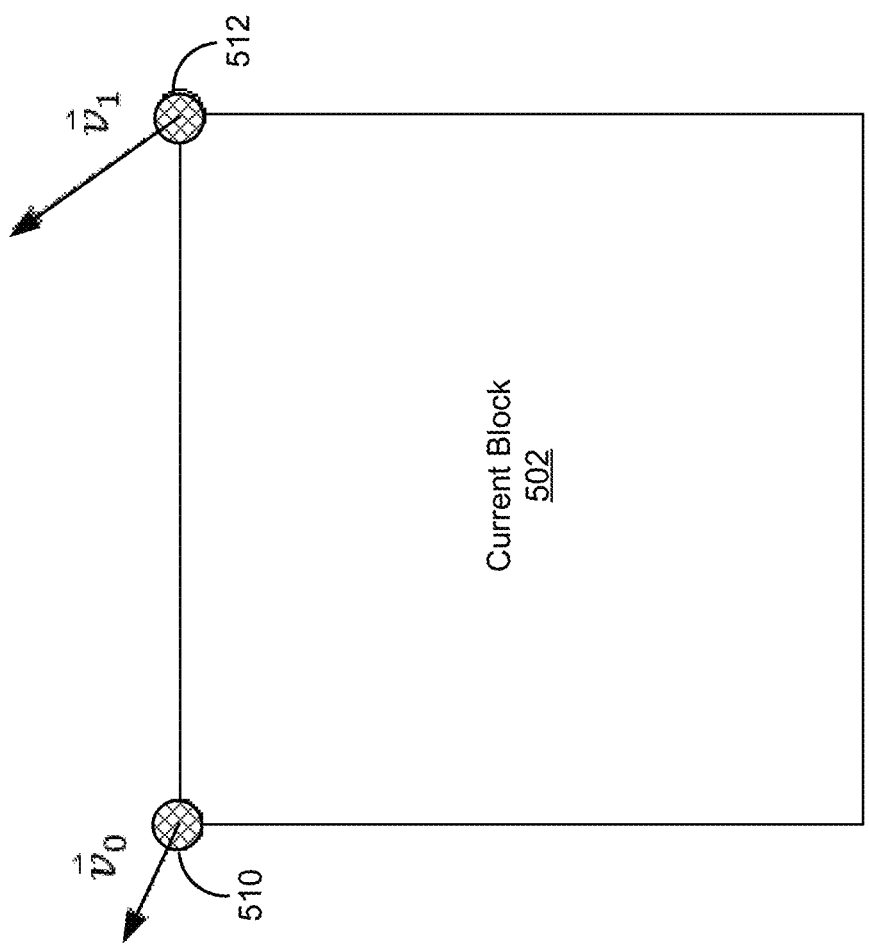

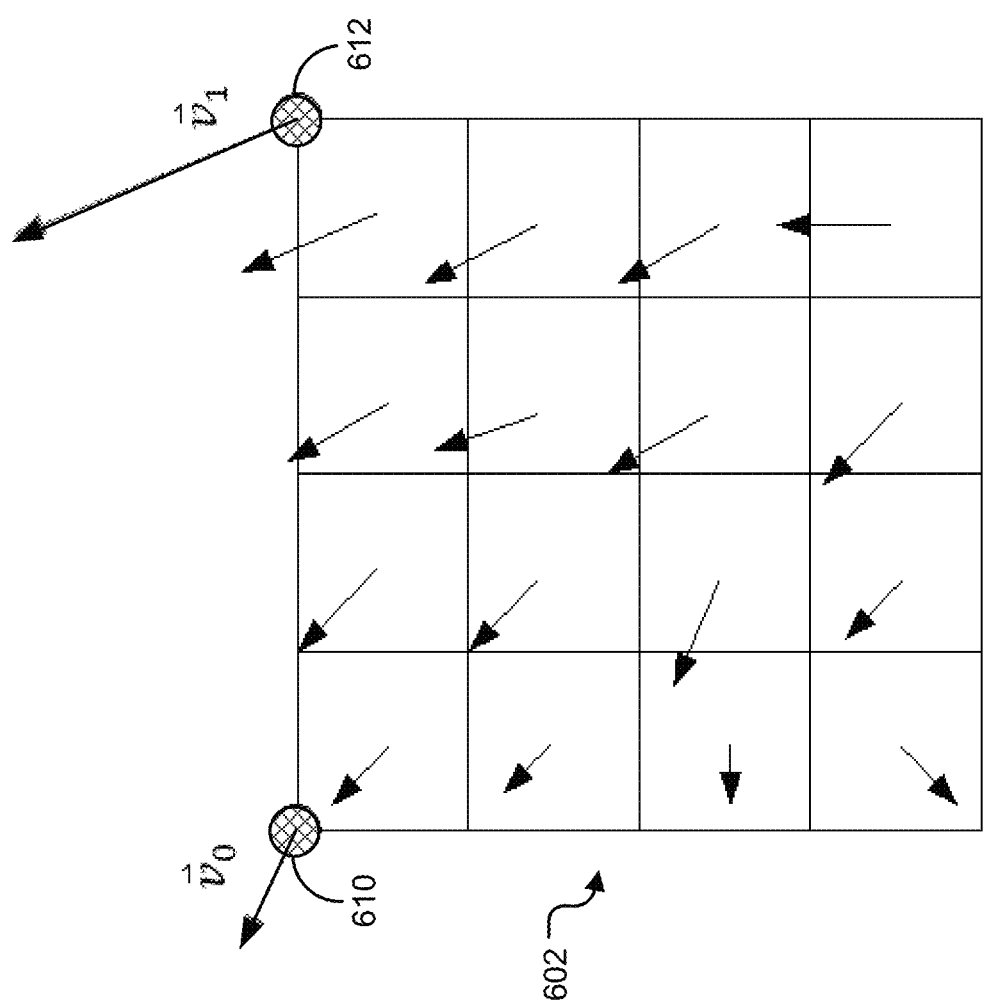

2100

```
┌─────────────────────────────────────────────────────┐
│  OBTAIN, VIDEO DATA FOR A CURRENT BLOCK OF A        │
│  CURRENT CODING UNIT                                │
│  2102                                               │
└─────────────────────────────────────────────────────┘
                          │
                          ▼
┌─────────────────────────────────────────────────────┐
│  DETERMINE, THAT A NEIGHBORING BLOCK OF THE         │
│  CURRENT BLOCK IS LOCATED OUTSIDE THE CURRENT       │
│  CODING UNIT                                        │
│  2104                                               │
└─────────────────────────────────────────────────────┘
                          │
                          ▼
┌─────────────────────────────────────────────────────┐
│  OBTAIN A FIRST MOTION VECTOR AND A SECOND          │
│  MOTION VECTOR ASSOCIATED WITH A BOUNDARY OF        │
│  THE NEIGHBORING BLOCK                              │
│  2106                                               │
└─────────────────────────────────────────────────────┘
                          │
                          ▼
┌─────────────────────────────────────────────────────┐
│  DETERMINE WHETHER A THIRD MOTION VECTOR FROM       │
│  AN ADDITIONAL NEIGHBORING BLOCK IS AVAILABLE       │
│  2108                                               │
└─────────────────────────────────────────────────────┘
                          │
                          ▼
┌─────────────────────────────────────────────────────┐
│  BASED ON A DETERMINATION THAT THE THIRD MOTION     │
│  VECTOR FROM THE ADDITIONAL NEIGHBORING BLOCK IS    │
│  AVAILABLE, DETERMINE A SET OF AFFINE MOTION        │
│  PARAMETERS FOR THE CURRENT BLOCK USING THE         │
│  FIRST MOTION VECTOR, THE SECOND MOTION VECTOR,     │
│  AND THE THIRD MOTION VECTOR                        │
│  2110                                               │
└─────────────────────────────────────────────────────┘
```

```
OBTAIN VIDEO DATA FOR A CURRENT BLOCK OF A CURRENT CODING
UNIT
2202
```

⬇

```
DETERMINE THAT A SIZE OF A NEIGHBORING BLOCK OF THE CURRENT
BLOCK IN THE CURRENT CODING UNIT IS GREATER THAN A MINIMUM
BLOCK SIZE FOR AFFINE MOTION PREDICTION
2204
```

⬇

```
DETERMINE WHETHER THE SIZE OF THE NEIGHBORING BLOCK IS LESS
THAN A MINIMUM SIZE THRESHOLD FOR USING AN AFFINE MOTION
VECTOR OF THE NEIGHBORING BLOCK AS AN AFFINE MOTION VECTOR OF
THE CURRENT BLOCK, THE MINIMUM SIZE THRESHOLD BEING DIFFERENT
FROM THE MINIMUM BLOCK SIZE
2206
```

⬇

```
DETERMINE WHETHER TO USE AN AFFINE MOTION VECTOR OF THE
NEIGHBORING BLOCK AS AN AFFINE MOTION VECTOR FOR THE CURRENT
BLOCK BASED ON WHETHER THE SIZE OF THE NEIGHBORING BLOCK IS
LESS THAN THE MINIMUM SIZE THRESHOLD
2208
```

FIG. 22

AFFINE MOTION PREDICTION

CROSS-REFERENCES TO RELATED APPLICATIONS

This application claims the benefit of and priority to U.S. Provisional Application 62/732,555, filed on Sep. 17, 2018, which is incorporated by reference herein in its entirety and for all purposes. This application also claims the benefit of and priority to U.S. Provisional Application 62/735,051, filed on Sep. 22, 2018, which is incorporated by reference herein in its entirety and for all purposes. This application also claims the benefit of and priority to U.S. Provisional Application 62/742,435, filed on Oct. 7, 2018, which is incorporated by reference herein in its entirety and for all purposes.

FIELD

This application is related to video coding and compression. For example, systems and methods are described for affine motion prediction.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Techniques and systems are described herein for affine motion derivation. Affine motion based prediction allows complex motions to be estimated, such as rotation, zooming, translation, or any combination thereof, among others. In some examples, the systems and techniques described herein relate to improving costs and efficiency in affine motion prediction. In some examples, affine motion vector predictors for a current block can be derived from affine motion vectors or normal motion vectors of neighboring coded blocks. The affine motion vector predictors can include inherited affine motion vector predictors and constructed affine motion vector predictors. For both types of affine motion vector predictors, the motion information can be obtained from reconstructed motion information of previously coded blocks which can be stored in one or more types of memory structures.

In some examples memory structures for storing motion information of previously coded block can include a line buffer, and possibly one or more local buffers. The line buffer can store motion information of a line of coding blocks located at a boundary of a coding unit such as a coding tree unit (CTU), while the local buffers can be utilized for storing motion information of coding blocks located anywhere in the CTU. The systems and techniques described herein can improve the utilization of the line buffers as well as the utilization of one or more local buffers in affine motion vector prediction.

For example, in some implementations, the utilization of the line buffers for use in affine motion prediction can include storing less than all of the motion vectors of a neighboring block in a line buffer where the neighboring block is located outside a current coding unit in which a current block is located. In some examples, where three motion vectors are used for affine motion vector prediction of the current block, a first motion vector and a second motion vector may be obtained from a line buffer associated with a boundary of the neighboring block, where the first motion vector and the second motion vector may have been stored in the line buffer. A third motion vector, if available, can be obtained from an additional neighboring block, where the third motion vector may have already been stored in the line buffer or a local buffer and would not increase the storage demands on the line buffer. A set of affine motion parameters for the current block may be determined using the first motion vector, the second motion vector, and the third motion vector.

In some implementations the utilization of one or more local buffers may be improved. In some examples, a decision on whether to inherit an affine motion vector predictor (MVP) of a neighboring block to be used as a motion vector for a current block of a current coding unit can be based on one or more size constraints associated with the neighboring block. In some examples, obtaining control point motion vectors (CPMVs) from a neighboring block of a current block for inherited affine MVP of the current block can include an intermediate step of storing the CPMVs of the neighboring block in a local buffer. As mentioned above, storing the CPMVs can increase the memory usage for the local buffer. One or more size constraints may be applied to limit the neighboring blocks whose CPMVs may be stored in the local buffer, which can reduce the amount of local buffer storage that is required to store the CPMVs.

In some examples, a minimum size threshold can be defined for neighboring blocks whose control point motion vectors (CPMVs) can be used for inherited affine motion vector prediction (MVP) of a current block. CPMVs of neighboring blocks whose sizes are less than the minimum size threshold can be excluded from being used for inherited affine MVP of the current block. By excluding the CPMVs of neighboring blocks whose sizes are less than the minimum size threshold from being used for inherited affine MVP of the current block, the CPMVs of neighboring blocks whose sizes are less than the minimum size threshold need not be stored in the local buffers. Thus, prior to storing CPMVs of neighboring blocks, example techniques described herein may include a comparison of the size of the neighboring blocks with the minimum size threshold. The minimum size threshold used in this comparison is different from the minimum block size for a block coded with affine motion model.

According to at least one example, a method of processing video data includes obtaining video data for a current block of a current coding unit. The method includes determining that a size of a neighboring block of the current block in the current coding unit is greater than a minimum block size for affine motion prediction. The method further includes determining whether the size of the neighboring block is less than a minimum size threshold for using an affine motion vector of the neighboring block as an affine motion vector of the current block, the minimum size threshold being different from the minimum block size. The method further includes determining whether to use an affine motion vector of the neighboring block as an affine motion vector for the current block based on whether the size of the neighboring block is less than the minimum size threshold.

In another example, an apparatus for processing video data is provided. The apparatus includes a memory and a processor implemented in circuitry. The apparatus is configured to and can obtain video data for a current block of a current coding unit. The apparatus is further configured to and can determine that a size of a neighboring block of the current block in the current coding unit is greater than a minimum block size for affine motion prediction. The apparatus is further configured to and can determine whether the size of the neighboring block is less than a minimum size threshold for using an affine motion vector of the neighboring block as an affine motion vector of the current block, the minimum size threshold being different from the minimum block size. The apparatus is further configured to and can determine whether to use an affine motion vector of the neighboring block as an affine motion vector for the current block based on whether the size of the neighboring block is less than the minimum size threshold.

In another example, a non-transitory computer-readable medium is provided that has stored thereon instructions that, when executed by one or more processors, cause the one or more processors to: obtain video data for a current block of a current coding unit; determine that a size of a neighboring block of the current block in the current coding unit is greater than a minimum block size for affine motion prediction; determine whether the size of the neighboring block is less than a minimum size threshold for using an affine motion vector of the neighboring block as an affine motion vector of the current block, the minimum size threshold being different from the minimum block size; and determine whether to use an affine motion vector of the neighboring block as an affine motion vector for the current block based on whether the size of the neighboring block is less than the minimum size threshold.

In another example, an apparatus for processing video data is provided. The apparatus includes: means for obtaining video data for a current block of a current coding unit; means for determining that a size of a neighboring block of the current block in the current coding unit is greater than a minimum block size for affine motion prediction; means for determining whether the size of the neighboring block is less than a minimum size threshold for using an affine motion vector of the neighboring block as an affine motion vector of the current block, the minimum size threshold being different from the minimum block size; and means for determining whether to use an affine motion vector of the neighboring block as an affine motion vector for the current block based on whether the size of the neighboring block is less than the minimum size threshold.

Some aspects of the methods, apparatuses, and computer-readable medium described above further include determining that the the size of the neighboring block is less than the minimum size threshold; and excluding the affine motion vector of the neighboring block from being used as an affine motion vector of the current block, based on a restriction that affine motion vectors of neighboring blocks with sizes that are less than the minimum threshold are not used as affine motion vectors of the current block.

In some aspects of the methods, apparatuses, and computer-readable medium described above, the minimum size threshold includes at least one of a minimum width and a minimum height.

Some aspects of the methods, apparatuses, and computer-readable medium described above further include a decoder, where the video data is obtained from an encoded video bitstream provided by an encoder.

In some aspects of the methods, apparatuses, and computer-readable medium described above, the minimum size threshold is obtained from signaling provided by the encoder.

In some aspects of the methods, apparatuses, and computer-readable medium described above, the signaling includes a logarithmic representation of the minimum size threshold.

Some aspects of the methods, apparatuses, and computer-readable medium described above, further include determining that the the size of the neighboring block is greater than or equal to the minimum size threshold; and using the affine motion vector of the neighboring block as an affine motion vector of the current block, based on the size of the neighboring block being greater than or equal to the minimum size threshold.

Some aspects of the methods, apparatuses, and computer-readable medium described above, further include obtaining the affine motion vector of the neighboring block from one or more local buffers of the current coding unit.

In some aspects of the methods, apparatuses, and computer-readable medium described above, the one or more local buffers include a first set of one or more local buffers and a second set of one or more local buffers, where: the first set of one or more local buffers includes one or more affine motion vectors of one or more neighboring blocks of the current block; and the second set of one or more local buffers includes one or more motion vectors of one or more neighboring blocks of the current block.

In some aspects of the methods, apparatuses, and computer-readable medium described above, the first set of one or more local buffers includes one or more row buffers; and the second set of one or more local buffers includes one or more column buffers.

In some aspects of the methods, apparatuses, and computer-readable medium described above, the one or more local buffers includes a first set of one or more local buffers and a second set of one or more local buffers, where: the first set of one or more local buffers includes a first subset of the one or more affine motion vectors and the one or more motion vectors; and the second set of one or more local buffers includes a second subset of the one or more affine motion vectors.

In some aspects of the methods, apparatuses, and computer-readable medium described above, the one or more affine motion vectors of the one or more neighboring blocks include one or more control point motion vectors, where: the first subset of the one or more affine motion vectors includes top-right control point motion vectors for a top-right portion of the one or more neighboring blocks and bottom-left control point motion vectors for a bottom-left portion of the one or more neighboring blocks; and the second subset of the one or more affine motion vectors includes top-left control point motion vectors for a top-left portion of the one or more neighboring blocks.

In some aspects of the methods, apparatuses, and computer-readable medium described above, the affine motion vector of the neighboring block includes one or more scaling variables and one or more position variables.

Some aspects of the methods, apparatuses, and computer-readable medium described above, include an encoder.

In some aspects of the methods, apparatuses, and computer-readable medium described above, the current coding unit includes a current coding tree unit (CTU).

According to at least one example, a method of processing video data includes obtaining video data for a current block of a current coding unit. The method includes determining that a neighboring block of the current block is located outside the current coding unit. The method further includes obtaining a first motion vector and a second motion vector associated with a boundary of the neighboring block. The method further includes determining whether a third motion vector associated with an additional neighboring block is available. The method further includes, based on a determination that the third motion vector from the additional neighboring block is available, determining a set of affine motion parameters for the current block using the first motion vector, the second motion vector, and the third motion vector In another example, an apparatus for processing video data is provided. The apparatus includes a memory and a processor implemented in circuitry. The apparatus is configured to and can obtain video data for a current block of a current coding unit. The apparatus is further configured to and can determine that a neighboring block of the current block is located outside the current coding unit. The apparatus is further configured to and can obtain a first motion vector and a second motion vector associated with a boundary of the neighboring block. The apparatus is further configured to and can determine whether a third motion vector from an additional neighboring block is available. The apparatus is further configured to and can, based on a determination that the third motion vector from the additional neighboring block is available, determine a set of affine motion parameters for the current block using the first motion vector, the second motion vector, and the third motion vector.

In another example, a non-transitory computer-readable medium is provided that has stored thereon instructions that, when executed by one or more processors, cause the one or more processors to: obtain video data for a current block of a current coding unit; determine that a neighboring block of the current block is located outside the current coding unit; obtain a first motion vector and a second motion vector associated with a boundary of the neighboring block; determine whether a third motion vector from an additional neighboring block is available; and based on a determination that the third motion vector from the additional neighboring block is available, determine a set of affine motion parameters for the current block using the first motion vector, the second motion vector, and the third motion vector.

In another example, an apparatus for processing video data is provided. The apparatus includes: means for obtaining video data for a current block of a current coding unit; means for determining that a neighboring block of the current block is located outside the current coding unit; means for obtaining a first motion vector and a second motion vector associated with a boundary of the neighboring block; means for determining whether a third motion vector from an additional neighboring block is available; and means for determining a set of affine motion parameters for the current block using the first motion vector, the second motion vector, and the third motion vector, based on a determination that the third motion vector from the additional neighboring block is available.

In some aspects of the methods, apparatuses, and computer-readable medium described above the boundary of the neighboring block is a bottom boundary and the neighboring block is located above a row associated with the current coding unit.

Some aspects of the methods, apparatuses, and computer-readable medium described above further include obtaining the first motion vector and the second motion vector from a line buffer.

Some aspects of the methods, apparatuses, and computer-readable medium described above further include, based on a determination that the additional neighboring block is located outside of the current coding unit, obtaining the third motion vector from a line buffer.

Some aspects of the methods, apparatuses, and computer-readable medium described above further include based on a determination that the additional neighboring block is located within the current coding unit, obtaining the third motion from a motion vector buffer of the current coding unit.

In some aspects of the methods, apparatuses, and computer-readable medium described above the first motion vector and the second motion vector are associated with a same y-coordinate as a top-left control point motion vector of the current block.

Some aspects of the methods, apparatuses, and computer-readable medium described above further include obtaining the first motion vector from a bottom-left corner of the neighboring block; obtaining the second motion vector from a bottom-right corner of the neighboring block; and obtaining the third motion vector from a below-left neighboring block or a left neighboring block of the current block.

Some aspects of the methods, apparatuses, and computer-readable medium described above further include obtaining the first motion vector from a bottom-left corner of the neighboring block; obtaining the second motion vector from a bottom-middle of the neighboring block; and obtaining the third motion vector from a below-left neighboring block or a left neighboring block of the current block.

Some aspects of the methods, apparatuses, and computer-readable medium described above further include obtaining the first motion vector from a bottom-middle of the neighboring block; obtaining the second motion vector from a bottom-right corner of the neighboring block; and obtaining the third motion vector from a below-left neighboring block or a left neighboring block of the current block.

Some aspects of the methods, apparatuses, and computer-readable medium described above further include, based on a determination that the third motion vector from the additional neighboring block is not available, determining the set of affine motion parameters for the current block using the first motion vector and the second motion vector according to a 4-parameter affine model.

In some aspects of the methods, apparatuses, and computer-readable medium described above, the boundary of the neighboring block is a right boundary and the neighboring block is located to the left of the current coding unit.

Some aspects of the methods, apparatuses, and computer-readable medium described above, further include obtaining the first motion vector and the second motion vector from a line buffer.

Some aspects of the methods, apparatuses, and computer-readable medium described above, further include, based on a determination that the additional neighboring block is located within the current coding unit, obtaining the third motion from a motion vector buffer of the current coding unit.

In some aspects of the methods, apparatuses, and computer-readable medium described above, the first motion vector and the second motion vector from the neighboring block are associated with a same x-coordinate as a top-left control point motion vector of the current block.

Some aspects of the methods, apparatuses, and computer-readable medium described above, further include obtaining the first motion vector from a top-right corner of the neighboring block; obtaining the second motion vector from a bottom-right corner of the neighboring block; and obtaining the third motion vector from an above neighboring block or an above-right neighboring block of the current block.

Some aspects of the methods, apparatuses, and computer-readable medium described above, further include obtaining the first motion vector from a top-right corner of the neighboring block; obtaining the second motion vector from a middle of the right boundary of the neighboring block; and obtaining the third motion vector from an above neighboring block or an above-right neighboring block of the current block.

Some aspects of the methods, apparatuses, and computer-readable medium described above, further include obtaining the first motion vector from a middle of the right boundary of the neighboring block; obtaining the second motion vector from a bottom-right corner of the neighboring block; and obtaining the third motion vector from a below-left neighboring block or a left neighboring block of the current block.

Some aspects of the methods, apparatuses, and computer-readable medium described above, include a decoder, where the video data is obtained from an encoded video bitstream provided by an encoder.

Some aspects of the methods, apparatuses, and computer-readable medium described above, include an encoder.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Examples of various implementations are described in detail below with reference to the following figures:

FIG. 5 is a diagram illustrating an example of a simplified affine motion model for a current block, in accordance with some examples;

FIG. 6 is a diagram illustrating an example of a motion vector field of sub-blocks of a block, in accordance with some examples;

FIG. 21 is a flow chart illustrating an example of a process for determining one or more sets of affine motion parameters for a current block of a CTU, in accordance with some examples;

FIG. 22 is a flow chart illustrating an example of a process determining whether to use an affine motion vector of a neighboring block as an affine motion vector for a current block of a CTU, in accordance with some examples;

DETAILED DESCRIPTION

Figure 1:
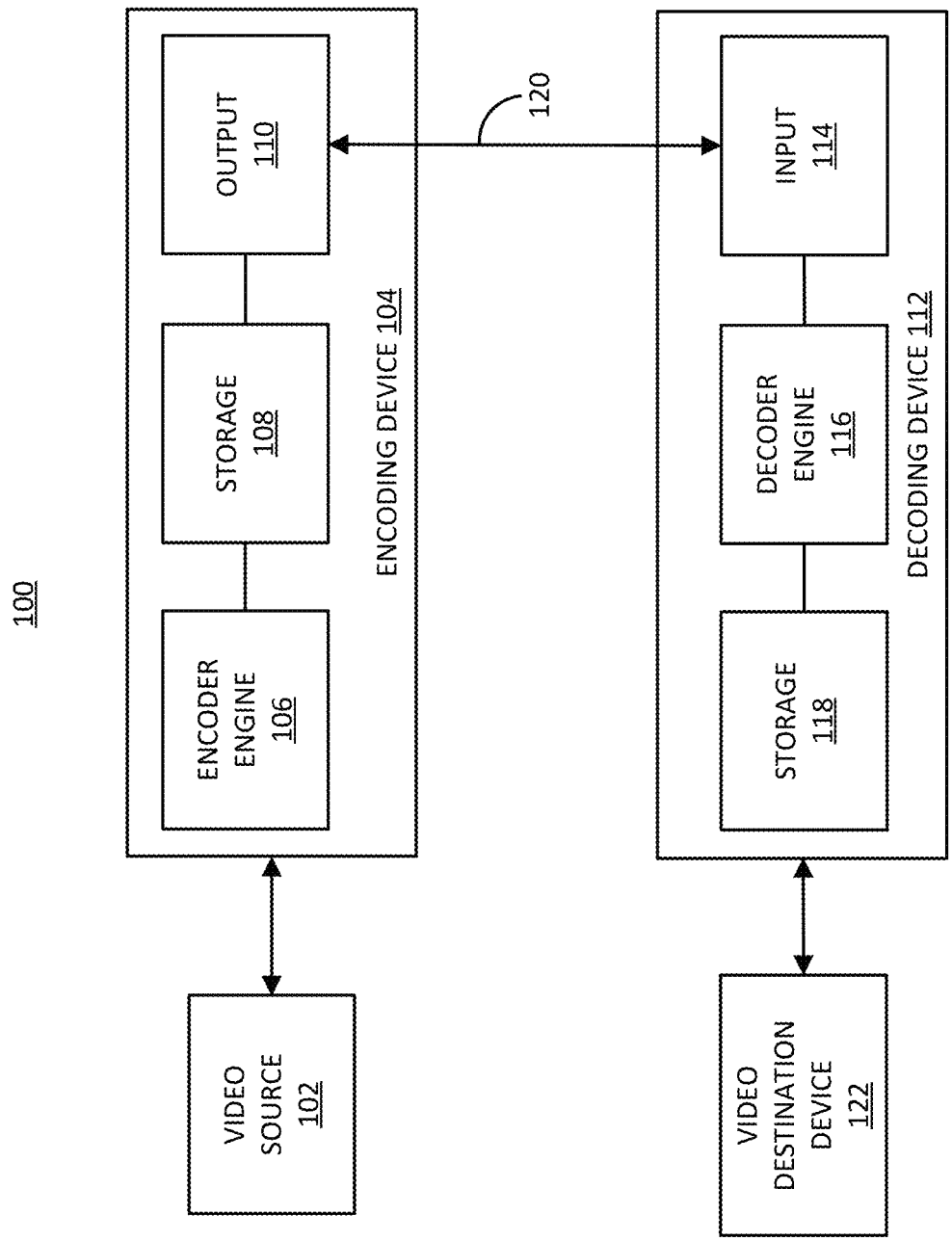
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Systems, apparatuses, methods (also referred to as processes), and computer-readable media are described herein that are related to inter prediction in video codecs. For example, as described in more detail herein, the techniques described herein are related to affine motion prediction. In some examples, the systems and techniques described herein relate to improving costs and efficiency in affine motion prediction. According to various video coding standards (e.g., VVC and HEVC), affine motion vector predictors for a current block can be derived from affine motion vectors or normal motion vectors of neighboring coded blocks. The affine motion vector predictors can include inherited affine motion vector predictors and constructed affine motion vector predictors. For both types of affine motion vector predictors, the motion information can be obtained from reconstructed motion information of previously reconstructed blocks which is stored in buffers. The buffers can include local memory such as low latency line buffers, which are a limited resource provided in coding units. Systems and techniques are described herein for improving the utilization of the line buffers in affine motion vector prediction.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

The techniques described herein can be applied to one or more of a variety of block based video coding techniques in which video is reconstructed on block-by-block basis. For example, the techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, AV1, and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9 and AV1 are other video coding standards that can be used.

Many embodiments described herein can be performed using video codecs such as VTM, VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, $\text{refIdx}_0$ and $\Delta x_1$, $y_1$, $\text{refIdx}_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, $\text{refIdx}_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may include pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

As described above, for each block, a set of motion information (also referred to herein as motion parameters) can be available. A set of motion information can contain motion information for forward and backward prediction directions. Here, forward and backward prediction directions are two prediction directions of a bi-directional prediction mode and the terms "forward" and "backward" do not necessarily have a geometry meaning. Instead, forward and backward can correspond to a reference picture list 0 (RefPicList0) and a reference picture list 1 (RefPicList1) of a current picture, slice, or block. In some examples, when only one reference picture list is available for a picture, slice, or block, only RefPicList0 is available and the motion information of each block of a slice is always forward. In some examples, RefPicList0 includes reference pictures that precede a current picture in time, and RefPicList1 includes reference pictures that follow the current picture in time. In some cases, a motion vector together with an associated reference index can be used in decoding processes. Such a motion vector with the associated reference index is denoted as a uni-predictive set of motion information.

For each prediction direction, the motion information can contain a reference index and a motion vector. In some cases, for simplicity, a motion vector can have associated information, from which it can be assumed a way that the motion vector has an associated reference index. A reference index can be used to identify a reference picture in the current reference picture list (RefPicList0 or RefPicList1). A motion vector can have a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, within one coded video sequence two pictures with the same POC value does not occur often. When multiple coded video sequences are present in a bitstream, pictures with a same POC value may be closer to each other in terms of decoding order. POC values of pictures can be used for reference picture list construction, derivation of reference picture set as in HEVC, and/or motion vector scaling, among other things.

In H.264/AVC, each inter-macroblock (MB) may be partitioned into four different ways, including: one 16×16 macroblock partition; two 16×8 macroblock partitions; two 8×16 macroblock partitions; and four 8×8 macroblock partitions, among others. Different macroblock partitions in one macroblock may have different reference index values for each prediction direction (e.g., different reference index values for RefPicList0 and RefPicList1).

In some cases, when a macroblock is not partitioned into four 8×8 macroblock partitions, the macroblock can have only one motion vector for each macroblock partition in each prediction direction. In some cases, when a macroblock is partitioned into four 8×8 macroblock partitions, each 8×8 macroblock partition can be further partitioned into sub-blocks, each of which can have a different motion vector in each prediction direction. An 8×8 macroblock partition can be divided into sub-blocks in different ways, including: one 8×8 sub-block; two 8×4 sub-blocks; two 4×8 sub-blocks; and four 4×4 sub-blocks, among others. Each sub-block can have a different motion vector in each prediction direction. Therefore, a motion vector can be present in a level equal to or higher than a sub-block.

In HEVC, the largest coding unit in a slice is called a coding tree block (CTB). A CTB contains a quad-tree, the nodes of which are coding units. The size of a CTB can range from 16×16 pixels to 64×64 pixels in the HEVC main profile. In some cases, 8×8 pixel CTB sizes can be supported.

Figure 2:
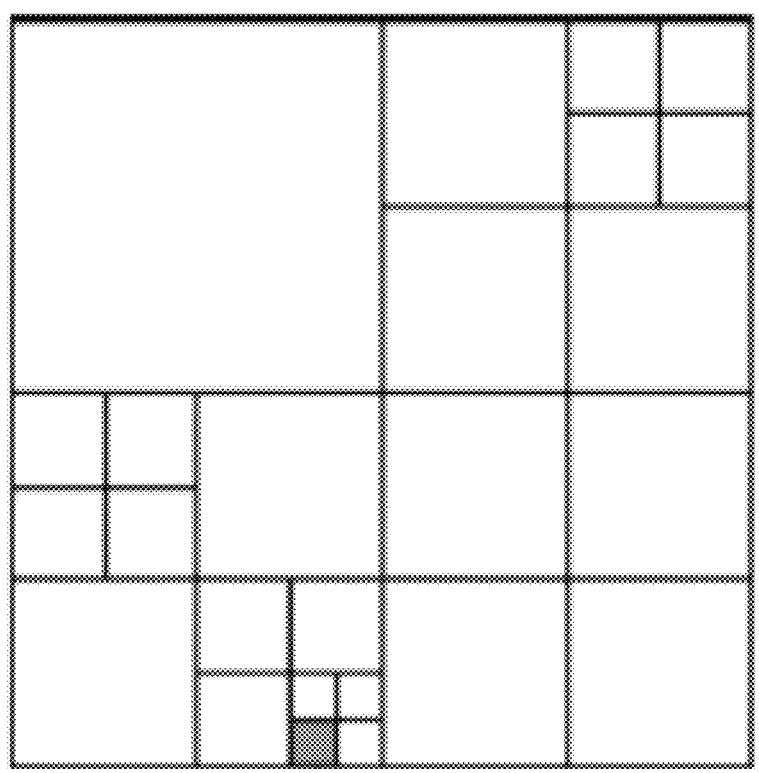
FIG. 2 is a diagram illustrating an example of a coding unit (CU) structure in HEVC, in accordance with some examples.

FIG. 2 is a diagram illustrating a CTB 200, which may be recursively split into coding units (CU) in a quad-tree manner. A CU could be the same size of the CTB 200 and as small as 8×8 pixels. In some cases, each CU is coded with either intra-prediction mode or inter-prediction mode. When a CU is inter-coded using an inter-prediction mode, the CU may be further partitioned into two or four prediction units (PUs), or may be treated as one PU when further partitioning does not apply. When two PUs are present in one CU, the two PUs can be half size rectangles or two rectangles that are ¼ or ¾ the size of the CU.

Figure 3:
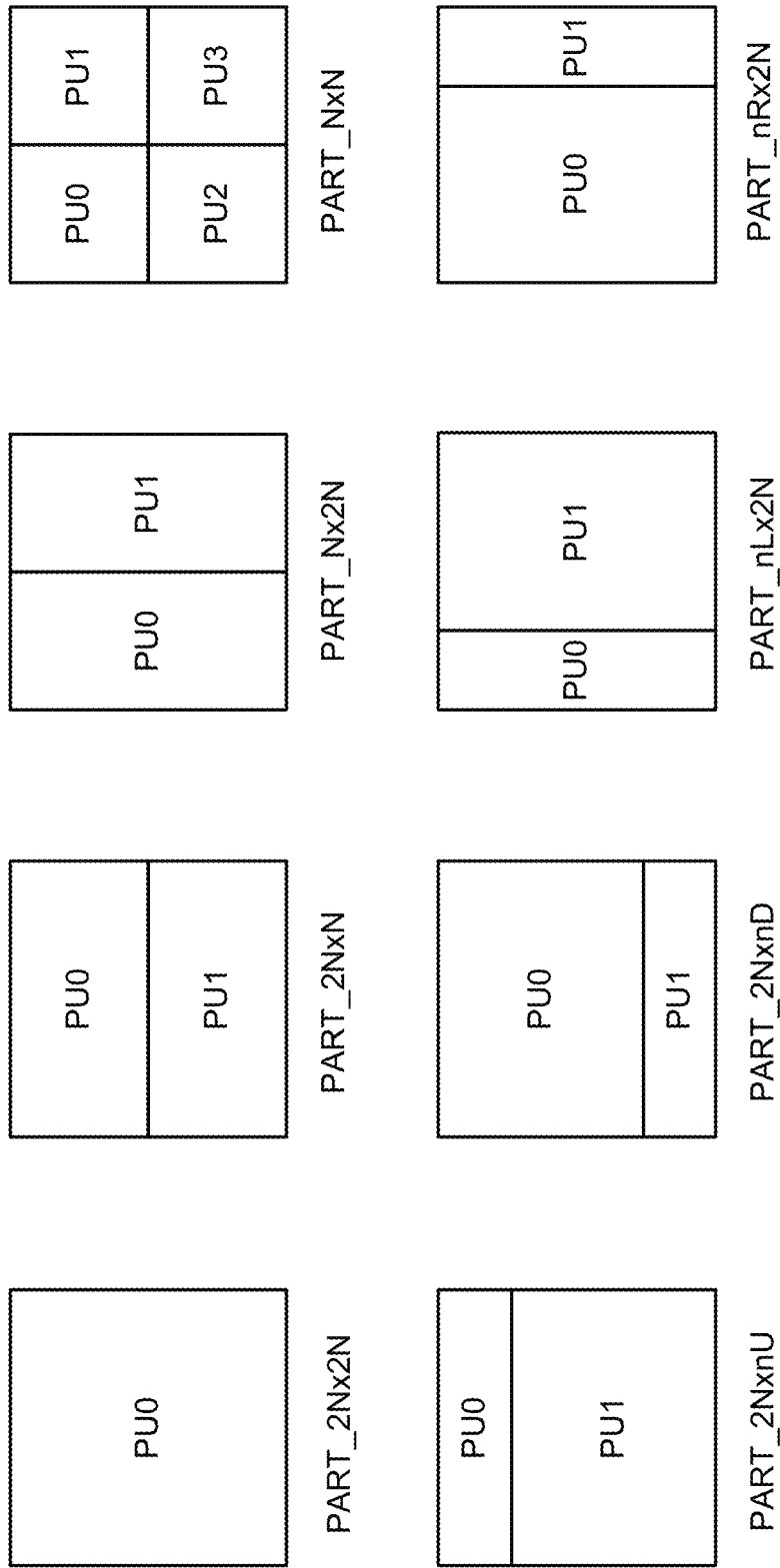
FIG. 3 is a diagram illustrating an example of partition modes for an inter-prediction mode, in accordance with some examples.

FIG. 3 is a diagram illustrating eight partition modes for a CU coded with inter-prediction mode using up to four PUs including PU0, PU1, PU2, and PU3. As shown, the partition modes include PART 2N×2N, PART 2N×N, PART N×2N, PART N×N, PART_2N×nU, PART_2N×nD, PART_nL×2N, and PART_nR×2N. A CU can be partitioned into PUs according to the different partition modes. Accordingly, a CU can be predicted using one or more of the partitioning modes.

When the CU is inter-coded, one set of motion information can be present for each PU. In addition, each PU can be coded with one inter-prediction mode to derive the set of motion information. In some cases, when a CU is intra-coded using intra-prediction mode, the PU shapes can be 2N×2N and N×N. Within each PU, a single intra-prediction mode is coded (while chroma prediction mode is signalled at the CU level). In some cases, the N×N intra PU shapes are allowed when the current CU size is equal to the smallest CU size defined in SPS.

For motion prediction in HEVC, there can be two inter-prediction modes for a CU or PU, including a merge mode and an advanced motion vector prediction (AMVP) mode. A skip mode is considered as a special case of the merge mode. In either AMVP or merge mode, a motion vector (MV) candidate list can be maintained for multiple motion vector (MV) predictors. The motion vector(s), as well as reference indices in the merge mode, of the current PU can be generated by taking one candidate from the MV candidate list.

In some examples, the MV candidate list can contain up to five MV candidates for the merge mode and two MV candidates for the AMVP mode. In other examples, different numbers of candidates can be included in a MV candidate list for merge mode and/or AMVP mode. A merge candidate may contain a set of motion information (e.g., motion vectors corresponding to one or both reference picture lists (list 0 and list 1)) and the reference indices. If a merge candidate is identified by a merge index, the reference pictures can be used for the prediction of the current block. The reference picture can also be used to determine associated motion vectors. An AVMP candidate contains only a motion vector; thus, in AVMP mode, a reference index may need to be explicitly signaled, together with an MVP index to the MV candidate list, for each potential prediction direction from either list 0 or list 1. In AMVP mode, the predicted motion vectors can be further refined.

As can be seen above, a merge candidate corresponds to a full set of motion information, while an AMVP candidate contains just one motion vector for a specific prediction direction and reference index. The candidates for both merge and AMVP modes can be derived similarly from the same spatial and/or temporal neighboring blocks.

Figure 4B:
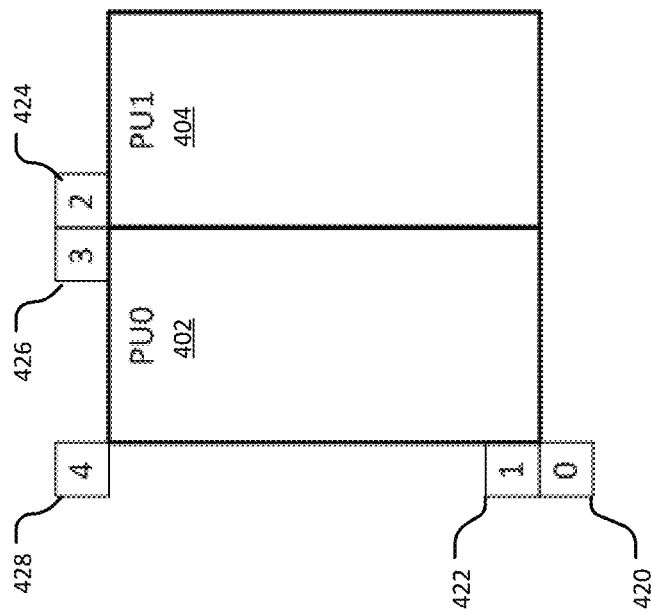
FIG. 4B is a diagram illustrating an example of a method for deriving spatial neighboring MV candidates for advanced motion vector prediction (AMVP) inter-prediction mode, in accordance with some examples.
Figure 4A:
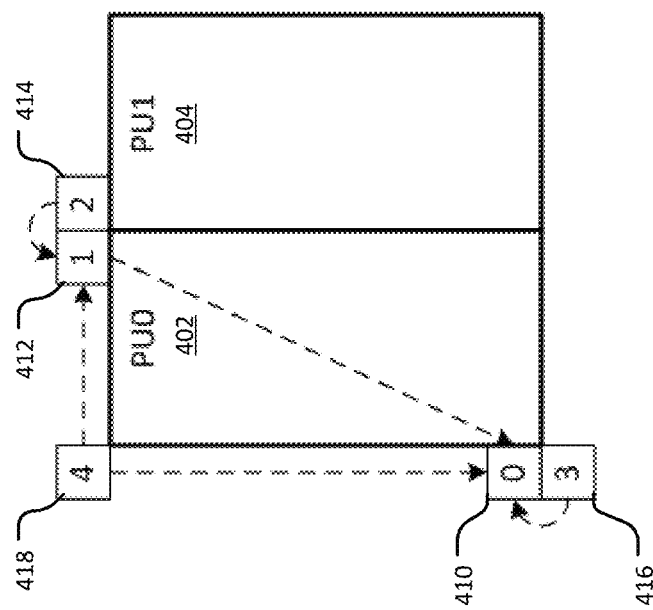
FIG. 4A is a diagram illustrating an example of a method for deriving spatial neighboring motion vector (MV) candidates for merge inter-prediction mode, in accordance with some examples.

FIG. 4A and FIG. 4B are diagrams illustrating example derivations of spatial neighboring MV candidates. Spatial MV candidates for a specific PU (PU0 402) can be derived from neighboring blocks, including relative to a neighboring PU1 404, located to the right of PU0 402.

The diagram in FIG. 4A illustrates derivation of spatial MV candidates for merge mode. In merge mode, up to five spatial MV candidates (and in some cases up to four) can be derived in, for example, the following order: a left candidate 410 (block 0), an above candidate 412 (block 1), an above right candidate 414 (block 2), a below left candidate 416 (block 3), and an above left candidate 418 (block 4). The locations of the spatial MV candidates with respect to PU0 402 is illustrated in FIG. 4A. Specifically, the left candidate 410 is located adjacent to and to the left of the lower left corner of PU0 402; the above candidate 412 is located adjacent to and above the upper right corner of PU0 402; the above right candidate 414 is located adjacent to and above the upper left corner of neighboring PU1 404; the below left candidate 416 is located below the left candidate 410; and the above left candidate 418 is located above and to the left of the upper left corner of PU0 402.

The diagram in FIG. 4B illustrates derivation of spatial neighboring MV candidates for AVMP mode. In AVMP mode, the neighboring blocks are divided into, for example, two groups. The first group, which can be referred to as a left group, can include a first block 420 (block 0), located below and to the left of PU0 402, and a second block 422 (block 1), located to the left of and adjacent to the lower left corner of PU0 402. The second group, which can be referred to as the above group, can include a third block 424 (block 2), located above and adjacent to the upper left corner of neighboring PU1 404, a fourth block 426 (block 3) located above and adjacent to the upper right corner of PU0 402, and a fifth block 428 (block 4), located above and to the left of the upper left corner of PU0 402. For each group, a potential candidate MV in a neighboring block referring to the same reference picture as that indicated by the signaled reference index can have the highest priority among blocks to be chosen to form a final candidate of the group. In some cases, it is possible that all neighboring blocks do not contain a motion vector pointing to the same reference picture. Therefore, if such a candidate cannot be found, the first available candidate can be scaled to form the final candidate, so that the temporal distance differences can be compensated.

In some cases, merge and AMVP modes can include other aspects, such as motion vector scaling, artificial motion vector candidate generation, and a pruning process for candidate insertion.

A quad-tree-binary-tree (QTBT) has been proposed for future video coding standard beyond HEVC. Simulations showed the proposed QTBT structure can be more efficient than quad-tree structure in used HEVC. In the proposed QTBT structure, a CTB is firstly partitioned using a quad-tree structure, where the quad-tree splitting of one node can be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is namely a CU, which can be used for prediction (e.g., intra-prediction or inter-prediction) and transform without any further partitioning. In some cases, there are two splitting types in the binary tree splitting—symmetric horizontal splitting and symmetric vertical splitting.

In one illustrative example of the QTBT partitioning structure, the CTU size can be set as 128×128 (luma samples and two corresponding 64×64 chroma samples), the MinQTSize can be set as 16×16, the MaxBTSize can be set as 64×64, the MinBTSize (for both width and height) can be set as 4, and the MaxBTDepth can be set as 4. The quad-tree partitioning is applied to the CTU first to generate quad-tree leaf nodes. In some examples, the quad-tree leaf nodes may have a size from 16×16 (in this case, the MinQTSize) to 128×128 (in this case, the CTU size). If the leaf quad-tree node is 128×128, it will not be further split by the binary tree since the size exceeds the MaxBTSize (in this case, 64×64). Otherwise, the leaf quad-tree node will be further partitioned by the binary tree. In this example, the quad-tree leaf node is also the root node for the binary tree and has the binary tree depth as 0. When the binary tree depth reaches MaxBT-Depth (4 in this example), it implies that no further splitting. When the binary tree node has width equal to MinBTSize (4 in this example), it implies no further horizontal splitting. Similarly, when the binary tree node has height equal to MinBTSize (4 in this example), it implies no further vertical splitting. The leaf nodes of the binary tree are namely CUs, and can be further processed by prediction and transform without any further partitioning.

In HEVC and earlier video coding standards, only a translational motion model is applied for motion compensation prediction (MCP). For example, a translational motion vector can be determined for each block (e.g., each CU or each PU) of a picture. However, in the real world, there are more kinds of motions other than translational motion, including zooming (e.g., zooming in and/or out), rotation, perspective motions, among other irregular motions. In the Joint exploration model (JEM) by ITU-T VCEG and MPEG, a simplified affine transform motion compensation prediction can be applied to improve coding efficiency.

FIG. 5 is a diagram which illustrates an affine motion field of a current block 502 described by two motion vectors $\vec{v}_0$ and $\vec{v}_0$ of two control points 510 and 512. Using the motion vector $\vec{v}_0$ of the control point 510 and the motion vector $\vec{v}_1$ of the control point 512, the motion vector field (MVF) of the current block 502 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Equation (1)}$$

In equation (1), $v_x$ and $v_y$ form the motion vector for each pixel within the current block 502, x and y provide the position of each pixel within the current block 502 (e.g., the top-left pixel in a block can have coordinate or index (x, y)=(0,0)), ($v_{0x}$, $v_{0y}$) is the motion vector of the top-left corner control point 510, w is the width of the current block 502, and ($v_{1x}$, $v_{1y}$) is the motion vector of the top-right corner control point 512. The $v_{0x}$ and $v_{1x}$ values are horizontal values for the respective motion vectors, and $v_{0y}$ and $v_{1y}$ values are the vertical values for the respective motion vectors. Additional control points (e.g., four control points, six control points, eight control points, or some other number of control points) can be defined by adding additional control point vectors, for example at the lower corners of the current block 502, the center of the current block 502, or other position in the current block 502.

Equation (1) above illustrates a 4-parameters motion model, where the four affine parameters a, b, c, and d are defined as:

$$a = \frac{(v_{1x} - v_{0x})}{w}; b = \frac{(v_{1y} - v_{0y})}{w};$$

$c = v_{0x}$; and $d = v_{0y}$. Using equation (1), given the motion vector ($v_{0x}$, $v_{0y}$) of the top-left corner control point 710 and the motion vector ($v_{1x}$, $v_{1y}$) of the top-right corner control point 712, the motion vector for every pixel of the current block can be calculated using the coordinate (x, y) of each pixel location. For instance, for the top-left pixel position of the current block 702, the value of (x, y) can be equal to (0, 0), in which case the motion vector for the top-left pixel becomes $V_x=v_{0x}$ and $V_y=v_{0y}$. In order to further simplify the MCP, block-based affine transform prediction can be applied.

FIG. 6 is a diagram which illustrates block-based affine transform prediction of a current block 602 divided into sub-blocks. The example shown in FIG. 6 includes a 4×4 partition, with sixteen total sub-blocks. Any suitable partition and corresponding number of sub-blocks can be used. A motion vector can then be derived for each sub-block using equation (1). For example, to derive a motion vector of each the 4×4 sub-blocks, the motion vector of the center sample of each sub-block (as shown in FIG. 6) is calculated according to equation (1). The resulting motion vector can be rounded, for example to a ¹⁄₁₆ fraction accuracy or other suitable accuracy (e.g., ¼, ⅛, or the like). Motion compensation can then be applied using the derived motion vectors of the sub-blocks to generate the prediction of each sub-block. For example, a decoding device can receive the four affine parameters (a, b, c, d) describing the motion vectors $\vec{v}_0$ of the control point 610 and the motion vector $\vec{v}_1$ of the control point 612, and can calculate the per-sub-block motion vector according to the pixel coordinate index describing the location of the center sample of each sub-block. After MCP, the high accuracy motion vector of each sub-block can be rounded, as noted above, and can be saved as the same accuracy as the translational motion vector.

Figure 7:
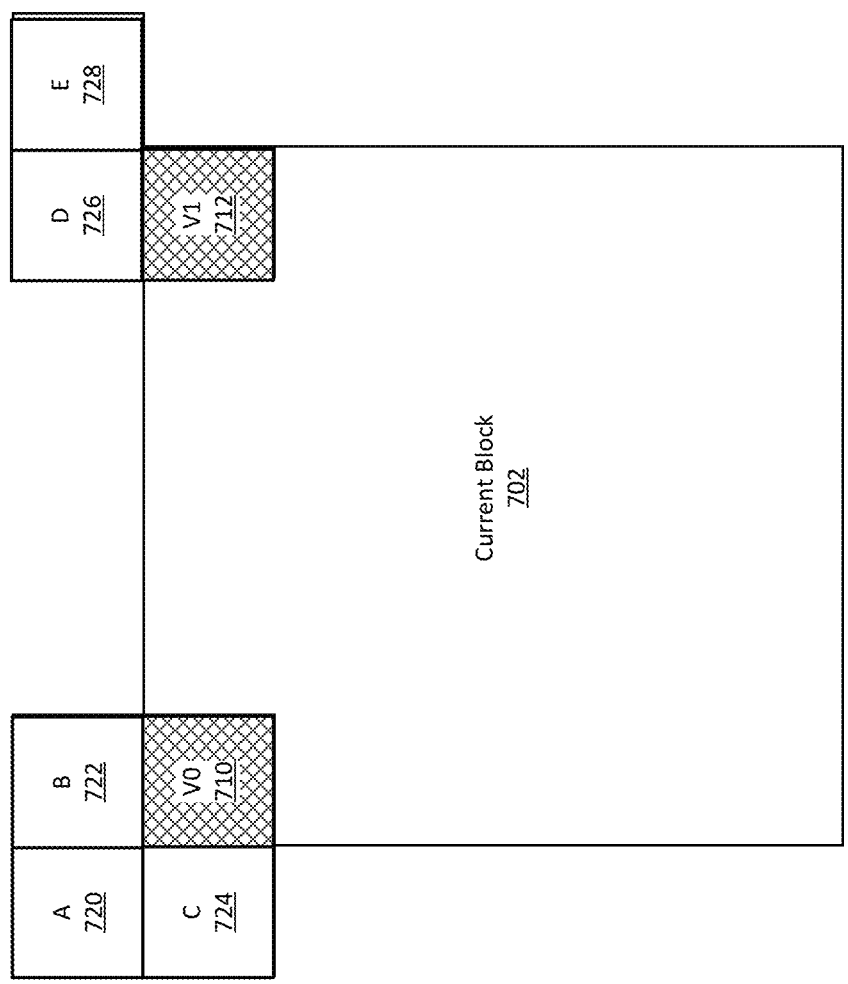
FIG. 7 is a diagram illustrating an example of motion vector prediction in affine inter (AF_INTER) mode, in accordance with some examples.

FIG. 7 is a diagram illustrating an example of motion vector prediction in affine inter (AF_INTER) mode. In JEM, there are two affine motion modes: affine inter (AF_INTER) mode and affine merge (AF_MERGE) mode. In some examples, when a CU has a width and height larger than 8 pixels, AF_INTER mode can be applied. An affine flag can be placed (or signaled) in the bitstream in relation to a block (e.g., at the CU level), to indicate whether AF_INTER mode was applied to the block. As illustrated in the example of FIG. 7, in AF_INTER mode, a candidate list of motion vector pairs can be constructed using neighboring blocks. For example, for a sub-block 710, located in the upper left corner of a current block 702, a motion vector $v_0$ can be selected from a neighboring block A 720 above and to the left of the sub-block 710, neighboring block B 722 above the sub-block 710, and neighboring block C 724 to the left of the sub-block 710. As a further example, for a sub-block 712, located in the upper right corner of the current block 702, a motion vector $v_1$ can be selected from neighboring block D 726 and neighboring block E 728 in the above and the above-right directions, respectively. A candidate list of motion vector pairs can be constructed using the neighboring blocks. For example, given motion vectors $v_A$, $v_B$, $v_C$, $v_D$, and $v_E$ corresponding to blocks A 720, B 722, C 724, D 726, and E 728, respectively, the candidate list of motion vector pairs can be expressed as $\{(v_0, v_1)|v_0=\{v_A, v_B, v_C\}, v_1=\{v_D, v_E\}\}$.

As noted above and as shown in FIG. 7, in AF_INTER mode, the motion vector $v_0$ can be selected from the motion vectors of the blocks A 720, B 722, or C 724. The motion vector from the neighboring block (block A, B, or C) can be scaled according to the reference list and the relationship among the POC of the reference for the neighboring block, the POC of the reference for the current CU (e.g., the current block 702), and the POC of the current CU. In these examples, some or all of the POCs can be determined from a reference list. Selection of $v_1$ from the neighboring blocks D or E is similar to the selection of $v_0$.

In some cases, if the number of candidate lists is less than two, the candidate list can be padded with motion vector pairs by duplicating each of the AMVP candidates. When the candidate list is larger than two, in some examples, the candidates in the candidate list can first be sorted according to the consistency of the neighboring motion vectors (e.g., consistency can be based on the similarity between the two motion vectors in a motion vector pair candidate). In such examples, the first two candidates are kept and the rest may be discarded.

In some examples, a rate-distortion (RD) cost check can used to determine which motion vector pair candidate is selected as the control point motion vector prediction (CPMVP) of the current CU (e.g., the current block 702). In some cases, an index indicating the position of the CPMVP in the candidate list can be signaled (or otherwise indicated) in the bitstream. Once the CPMVP of the current affine CU is determined (based on the motion vector pair candidate), affine motion estimation can be applied, and the control point motion vector (CPMV) can be determined. In some cases, the difference of the CPMV and the CPMVP can be signalled in the bitstream. Both CPMV and CPMVP include two sets of translational motion vectors, in which case the signaling cost of affine motion information is higher than that of translational motion.

Figure 8:
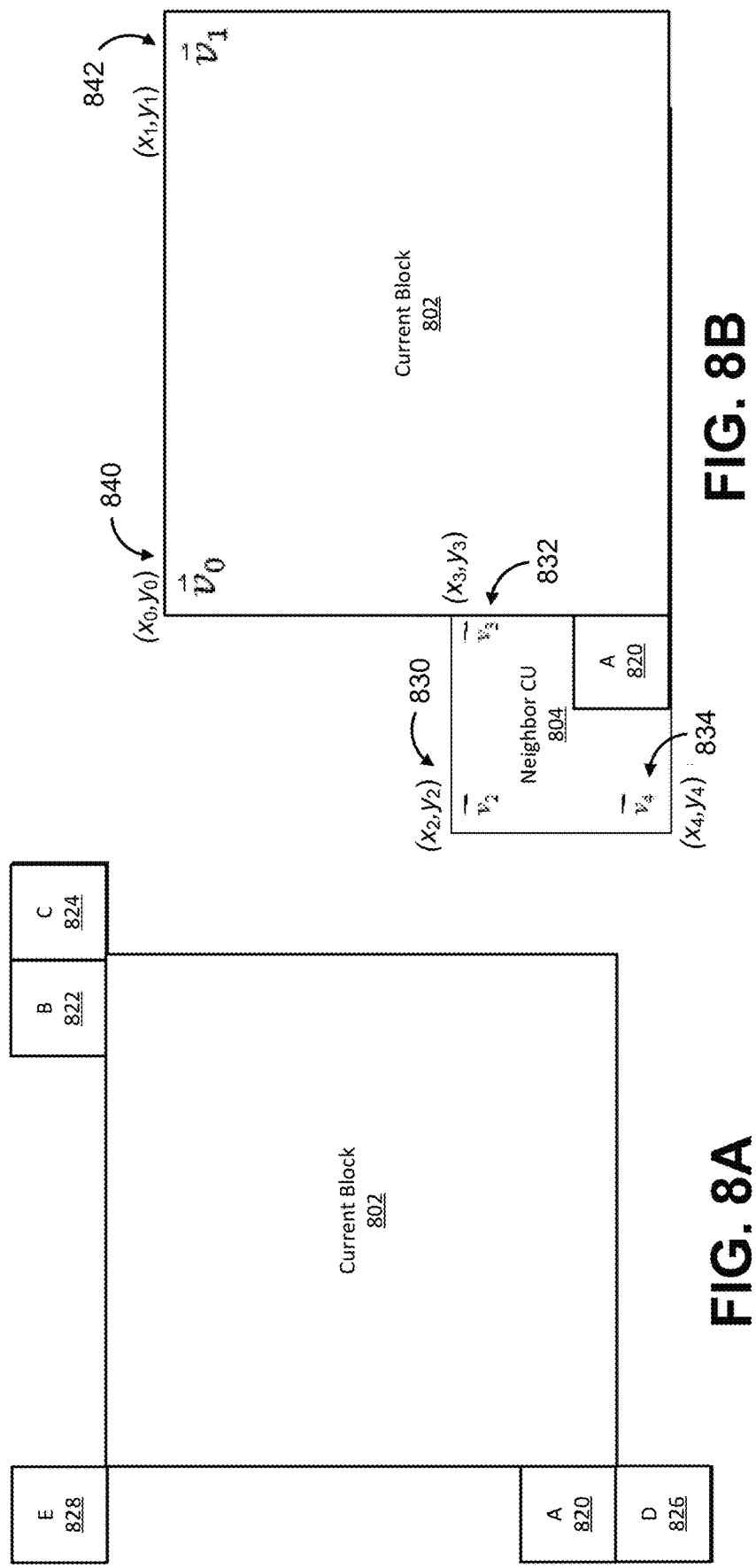
FIG. 8A and FIG. 8B are diagrams illustrating an example of motion vector prediction in affine merge (AF_MERGE) mode, in accordance with some examples.

FIG. 8A and FIG. 8B illustrate an example of motion vector prediction in AF_MERGE mode. When a current block 802 (e.g., a CU) is coded using AF_MERGE mode, a motion vector can be obtained from a valid neighboring reconstructed block. For example, the first block from the valid neighbor reconstructed blocks that is coded with affine mode can be selected as the candidate block. As shown in FIG. 8A, the neighboring block can be selected from among a set of neighboring blocks A 820, B 822, C 824, D 826, and E 828. The neighboring blocks may be considered in a particular selection order for being selected as the candidate block. One example of a selection order is the left neighbor (block A 820), followed by the above neighbor (block B 822), then the above right neighbor (block C 824), then the left bottom neighbor (block D 826), and then the above left neighbor (block E 828).

As noted above, the neighboring block that is selected can be the first block (e.g., in the selection order) that has been coded with affine mode. For example, block A 820 may have been coded in affine mode. As illustrated in FIG. 8B, block A 820 can be included in a neighboring CU 804. For the neighboring CU 804, motion vectors for the top left corner ($v_2$ 830), above right corner ($v_3$ 832), and left bottom corner ($v_4$ 834) of the neighboring CU 804 may have been derived. In this example, a control point motion vector, $v_0$ 840, for the top left corner of the current block 802 is calculated according to $v_2$ 830, $v_3$ 832, and $v_4$ 834. The control point motion vector, $v_1$ 842, for the top right corner of the current block 802 can then be determined.

Once the control point motion vectors (CPMV), $v_0$ 840 and $v_1$ 842, of the current block 1002 have been derived, equation (1) can be applied to determine a motion vector field for the current block 802. In order to identify whether the current block 802 is coded with AF_MERGE mode, an affine flag can be included in the bitstream when there is at least one neighboring block coded in affine mode.

In many cases, the process of affine motion estimation includes determining affine motion for a block at the encoder side by minimizing the distortion between the original block and the affine motion predicted block. As affine motion has more parameters than translational motion, affine motion estimation can be more complicated than translational motion estimation. In some cases, a fast affine motion estimation method based on Taylor expansion of signal can be performed to determine the affine motion parameters (e.g., affine motion parameters a, b, c, d in a 4-parameters model).

The fast affine motion estimation can include a gradient-based affine motion search. For example, given a pixel value $I_t$ at time t (with t0 being the time of the reference picture), the first order Taylor expansion for the pixel value $I_t$ can be determined as:

$$I_t = I_{t0} + \frac{\partial I_{t0}}{\partial t}(t - t0) = \quad \text{Equation (2)}$$

$$I_{t0} + \frac{\partial I_{t0}}{\partial x} \cdot \frac{\partial x}{\partial t} \cdot (t - t_0) + \frac{\partial I_{t0}}{\partial y} \cdot \frac{\partial y}{\partial t} \cdot (t - t_0)$$

Where $$\frac{\partial I_{t0}}{\partial x} \text{ and } \frac{\partial I_{t0}}{\partial y}$$

are the pixel gradient $G_{0x}$, $G_{0y}$ in the x and y directions, respectively, while $$\frac{\partial x}{\partial t} \cdot (t - t_0) \text{ and } \frac{\partial y}{\partial t} \cdot (t - t_0)$$

indicate the motion vector components $V_x$ and $V_y$ for the pixel value $I_t$. The motion vector for the pixel $I_t$ in the current block points to a pixel $I_{to}$ in the reference picture.

The equation (2) can be rewritten as equation (3) as follows:

$$I_t = I_{to} + G_{x0} \cdot V_x + G_{y0} \cdot V_y \quad \text{Equation (3)}$$

The affine motion $V_x$ and $V_y$ for the pixel value $I_t$ can then be solved by minimizing the distortion between the prediction ($I_{to} + G_{x0} \cdot V_x + G_{y0} \cdot V_y$) and the original signal. Taking 4-parameters affine model as an example, $$V_x = a \cdot x - b \cdot y + c \quad \text{Equation (4)}$$

$$V_y = b \cdot x + a \cdot y + d, \quad \text{Equation (5)}$$

where x and y indicate the position of a pixel or sub-block. Taking equations (4) and (5) into equation (3), and then minimizing the distortion between original signal and the prediction using equation (3), the solution of affine parameters a, b, c, d can be determined:

$$\{a,b,c,d\} = \arg\min\{\Sigma_{i \in current\ template}(I_t^i - I_{t0}^i - G_{x0}^i \cdot (a \cdot x + b \cdot y + c) - G_{y0}^i \cdot (b \cdot x - a \cdot y + d))^2\} \quad \text{Equation (6)}$$

Once the affine motion parameters are determined, which define the affine motion vectors for the control points, the per-pixel or per-sub-block motion vectors can be determined using the affine motion parameters (e.g., using equations (4) and (5), which are also represented in equation (1)). Equation (3) can be performed for every pixel of a current block (e.g., a CU). For example, if a current block is 16 pixels×16 pixels, the least squares solution in equation (6) can then be used to derive the affine motion parameters (a, b, c, d) for the current block by minimizing the overall value over the 256 pixels.

Any number of parameters can be used in affine motion models for video data. For instance, a 6-parameters affine motion or other affine motion can be solved in the same way as that described above for the 4-parameters affine motion model. For example, a 6-parameters affine motion model can be described as:

$$\begin{cases} v_x = ax + by + e \\ v_y = cx + dy + f \end{cases}, \quad \text{Equation (7)}$$

In equation (7), ($v_x$, $v_y$) is the motion vector at the coordinate (x, y), and a, b, c, d, e, and f are the six affine parameters. The affine motion model for a block can also be described by the three motion vectors (MVS) $\vec{v}_0 = (v_{0x}, v_{0y})$, $\vec{v}_1 = (v_{1x}, v_{1y})$, and $\vec{v}_2 = (v_{2x}, v_{2y})$ at three corners of the block.

Figure 9:
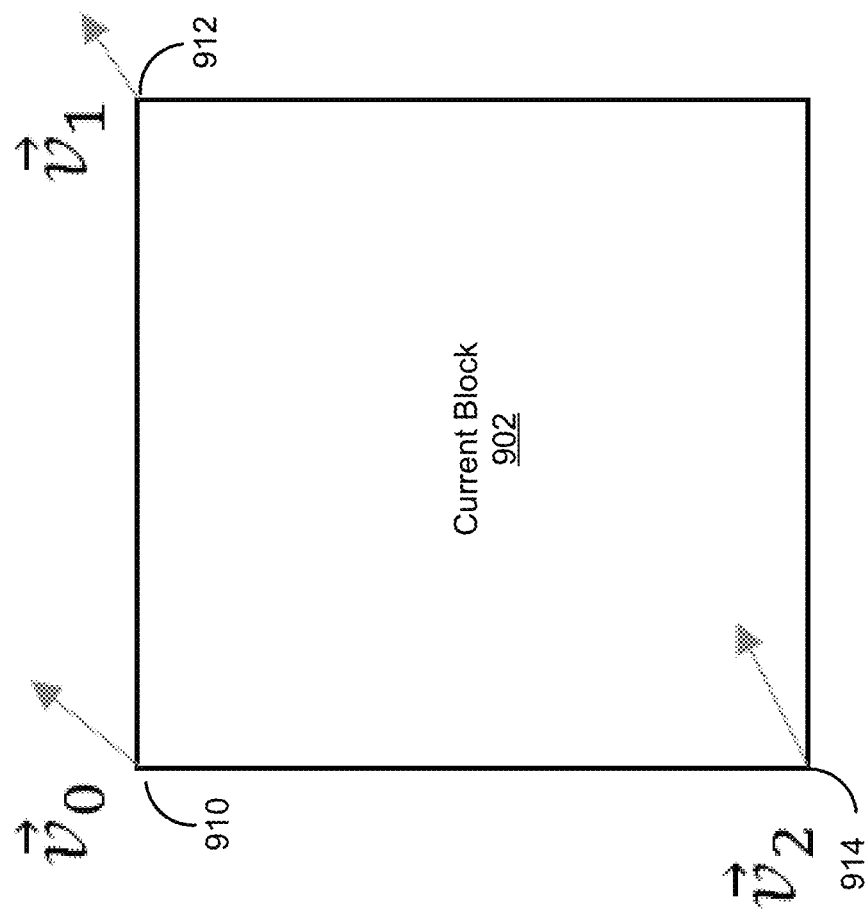
FIG. 9 is a diagram illustrating an example of an affine motion model for a current block, in accordance with some examples.

FIG. 9 is a diagram which illustrates an affine motion filed of a current block 902 described by three motion vectors at three control points 910, 912, and 914. The motion vector $\vec{v}_0$ is at the control point 910 located at the top-left corner of the current block 902, the motion vector $\vec{v}_1$ is at the control point 912 located at the top-right corner of the current block 902, and the motion vector $\vec{v}_2$ is at the control point 914 located at the bottom-left corner of the current block 902. The motion vector field (MVF) of the current block 902 can be described by the following equation:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases}, \quad \text{Equation (8)}$$

Equation (8) represents a 6-parameters affine motion model where w and h are the width and height of the current block 902.

While a 4-parameters motion model was described with reference to equation (1) above, a simplified 4-parameters affine model using the width and the height of the current block can be described by the following equation:

$$\begin{cases} v_x = ax - by + e \\ v_y = bx + ay + f \end{cases} \quad \text{Equation (9)}$$

The simplified 4-parameters affine model for a block based on equation (9) can be described by two motion vectors $\vec{v}_0 = (v_{0x}, v_{0y})$ and $\vec{v}_1 = (v_{1x}, v_{1y})$ at two of four corners of the block. The motion field can then be described as:

$$\begin{cases} v_x = \frac{(v_{1x} - v_{0x})}{w}x - \frac{(v_{1y} - v_{0y})}{h}y + v_{0x} \\ v_y = \frac{(v_{1y} - v_{0y})}{w}x + \frac{(v_{1x} - v_{0x})}{h}y + v_{0y} \end{cases} \quad \text{Equation (10)}$$

As previously mentioned, the motion vector $\vec{v}_i$ is referred to herein as a control point motion vector (CPMV). The CPMVs for the 4-parameters affine motion model are not necessarily the same as the CPMVs for the 6-parameters affine motion model. In some examples, different CPMVs can be selected for the affine motion model.

Figure 10:
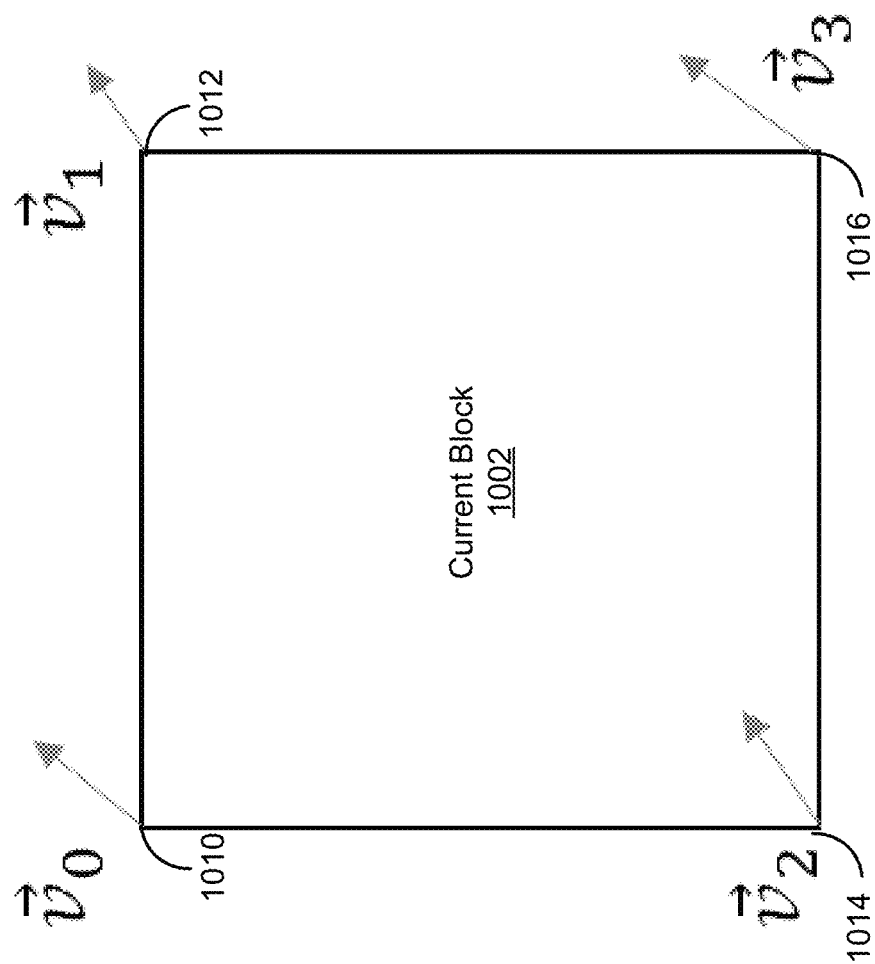
FIG. 10 is a diagram illustrating another example of an affine motion model for a current block, in accordance with some examples.

FIG. 10 is a diagram which illustrates selection of control point vectors for an affine motion model of a current block 1002. Four control points 1010, 1012, 1014, and 1016 are illustrated for the current block 1002. The motion vector $\vec{v}_0$ is at the control point 1010 located at the top-left corner of the current block 1002, the motion vector $\vec{v}_1$ is at the control point 1012 located at the top-right corner of the current block 1002, the motion vector $\vec{v}_2$ is at the control point 1014 located at the bottom-left corner of the current block 1002, and the motion vector $\vec{v}_3$ is at the control point 1016 located at the bottom-right corner of the current block 1002.

In an example, for a 4-parameters affine motion model (according to either equation (1) or equation (10)), control point pairs can be selected from any two of the four motion vectors $\{\vec{v}_0, \vec{v}_1, \vec{v}_2, \vec{v}_3\}$. In another example, for a 6-parameters affine motion model, the control point pairs can be selected from any three of the four motion vectors $\{\vec{v}_0, \vec{v}_1, \vec{v}_2, \vec{v}_3\}$. Based on the selected control point motion vectors, the other motion vectors for the current block 1002 can be calculated, for example, using the derived affine motion model.

In some examples, alternative affine motion model representations can also be used. For instance, an affine motion model based on delta MVs can be represented by an anchor MV $\vec{v}_0$ at a coordinate $(x_0, y_0)$, a horizontal delta MV $\nabla\vec{v}_h$, and a vertical delta MV $\nabla\vec{v}_v$. In general, a MV $\vec{v}$ at the coordinate (x, y) can be calculated as $\vec{v}=\vec{v}_0+x*\nabla\vec{v}_h+y*\nabla\vec{v}_v$.

In some examples, the affine motion model representation based on CPMVs can be converted to the alternative affine motion model representation with delta MVs. For example, $v_0$ in the delta MV affine motion model representation is the same as the top-left CPMV, $\nabla\vec{v}_h=(\vec{v}_1-\vec{v}_0)/w$, $\nabla\vec{v}_v=(\vec{v}_2-\vec{v}_0)/h$. It is to be noted that for these vector operations, the addition, division, and multiplication are applied element wise.

In some examples, affine motion vector prediction can be performed using affine motion predictors. In some examples, the affine motion predictors for a current block can be derived from the affine motion vectors or normal motion vectors of the neighboring coded blocks. As described above, the affine motion predictors can include inherited affine motion vector predictors (e.g., inherited using affine merge (AF_MERGE) mode) and constructed affine motion vector predictors (e.g., constructed using affine inter (AF_INTER) mode).

An inherited affine motion vector predictor (MVP) uses one or more affine motion vectors of a neighboring coded block to derive the predicted CPMVs of a current block. The inherited affine MVP is based on an assumption that the current block shares the same affine motion model as the neighboring coded block. The neighboring coded block is referred to as a neighboring block or a candidate block. The neighboring block can be selected from different spatial or temporal neighboring locations.

Figure 11:
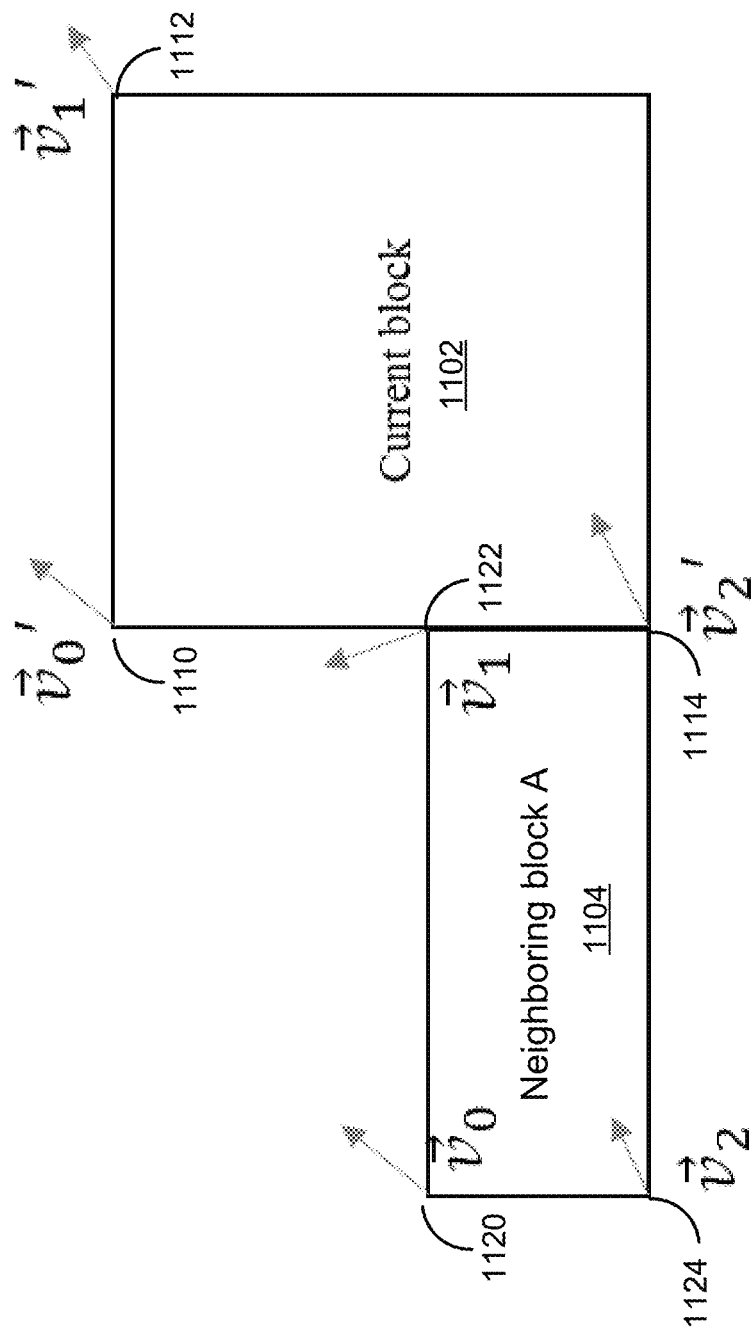
FIG. 11 is a diagram illustrating an example of current block and a candidate block, in accordance with some examples.

FIG. 11 is a diagram illustrating an inherited affine MVP of a current block 1102 from a neighboring block 1102 (block A). The affine motion vectors of the neighboring block 1102 are represented in terms of the respective motion vectors $\{\vec{v}_0, \vec{v}_1, \vec{v}_2\}$ at the control points 1120, 1122, and 1124 as follows: $\vec{v}_0=(v_{0x}m\ v_{oy})$, $\vec{v}_1=(v_{1x}, v_{1y})$, $\vec{v}_2=(v_{2x}, v_{2y})$. In an example, the size of the neighboring block 1104 can be represented by the parameters (w, h) where w is the width and h is the height of the neighboring block 1104. The coordinates of control points of the neighboring block 1104 are represented as (x0, y0), (x1, y1), and (x2, y2). The affine motion vectors $\vec{v}'_0=(v_{0x}', v_{oy}')$, $\vec{v}'_0=(v_{1x}', v_{1y}')$, $\vec{v}'_2=(v_{2x}', v_{2y}')$ can be predicted for the current block 1102 at the respective control points 110, 1112, and 1114. The predicted affine motion vectors $\vec{v}'_0=(v_{0x}', v_{oy}')$, $\vec{v}'_0=(v_{1x}', v_{1y}')$, $\vec{v}'_2=(v_{2x}', v_{2y}')$ for the current block 1102 can be derived by replacing (x, y) in equation (8) with the coordinate difference between the control points of the current block 1102 and the top-left control point of the neighboring block 1104 as described in the following equations:

$$\begin{cases} v'_{0x} = \frac{(v_{1x}-v_{0x})}{w}(x0'-x0) + \frac{(v_{2x}-v_{0x})}{h}(y0'-y0) + v_{0x} \\ v'_{0y} = \frac{(v_{1y}-v_{0y})}{w}(x0'-x0) + \frac{(v_{2y}-v_{0y})}{h}(y0'-y0) + v_{0y} \end{cases} \quad \text{Equation (11)}$$

$$\begin{cases} v'_{1x} = \frac{(v_{1x}-v_{0x})}{w}(x1'-x0) + \frac{(v_{2x}-v_{0x})}{h}(y1'-y0) + v_{0x} \\ v'_{1y} = \frac{(v_{1y}-v_{0y})}{w}(x1'-x0) + \frac{(v_{2y}-v_{0y})}{h}(y1'-y0) + v_{0y} \end{cases} \quad \text{Equation (12)}$$

$$\begin{cases} v'_{2x} = \frac{(v_{1x}-v_{0x})}{w}(x2'-x0) + \frac{(v_{2x}-v_{0x})}{h}(y2'-y0) + v_{0x} \\ v'_{2y} = \frac{(v_{1y}-v_{0y})}{w}(x2'-x0) + \frac{(v_{2y}-v_{0y})}{h}(y2'-y0) + v_{0y} \end{cases} \quad \text{Equation (13)}$$

In equations (11)-(13), (x0', y0'), (x1', y1'), and (x2', y2') are the coordinates of control points of the current block 1102. If represented as delta MVs, $\vec{v}'_0=v_{0x}+(x0'-x0)*\nabla\vec{v}_h+(y0'-y0)*\nabla\vec{v}_v$, and $\vec{v}'_1=v_{0x}+(x1'-x0)*\nabla\vec{v}_h+(y1'-y0)*\nabla\vec{v}_v$, $\vec{v}'_2=v_{0x}+(x2-x0)*\nabla\vec{v}_h+(y2'-y0)*\nabla\vec{v}_v$.

Similarly, if the affine motion model of the neighboring coded block (e.g., the neighboring block 1104) is a 4-parameters affine motion model, then the equation (10) can be applied in deriving the affine motion vectors at the control points for the current block 1102. In some examples, using the equation (10) for obtaining the 4-parameters affine motion model can include avoiding the equation (13) above.

Figure 12:
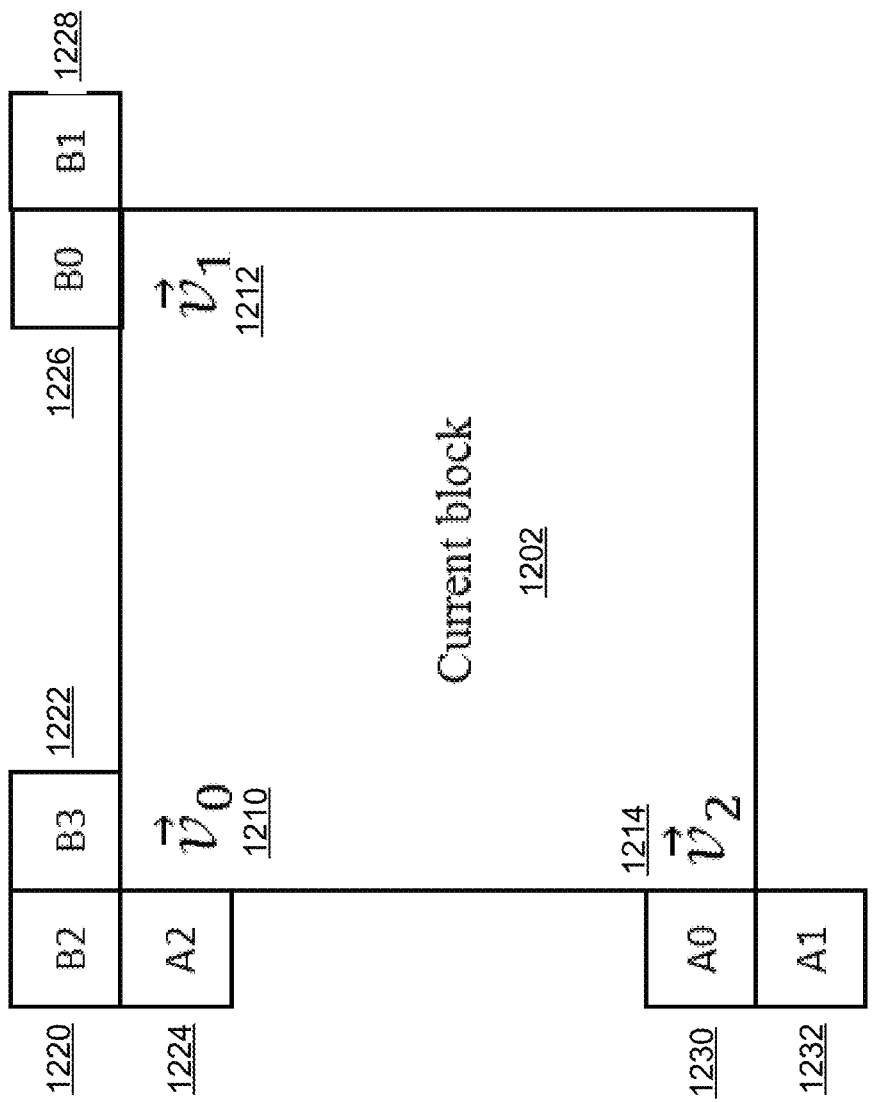
FIG. 12 is a diagram illustrating an example of current block, control points of the current block, and candidate blocks, in accordance with some examples.

FIG. 12 is a diagram which illustrates possible locations for a neighboring candidate block for use in the inherited affine MVP model for a current block 1202. For example, the affine motion vectors $\{\vec{v}_0, \vec{v}_1, \vec{v}_2\}$ at the control points 1210, 1212, and 1214 of the current block can be derived from one of the neighboring blocks 1230 (block A0), 1226 (block B0), 1228 (block B1), 1232 (block A1) and/or 1220 (block B2). In some cases the neighboring blocks 1223 (block A2) and/or 1222 (block B3) can also be used. More specifically, the motion vector $\vec{v}_0$ at the control point 1210 located at the top left corner of the current block 1202 can be inherited from the neighboring block 1220 (block B2) located above and to the left of the control point 1210, the neighboring block 1222 (block B3) located above the control point 1210, or from the neighboring block 1224 (block A2) located to the left of the control point 1210; the motion vector $\vec{v}_1$ at the control point 1212 located at the top right corner of the current block 1202 can be inherited from the neighboring block 1226 (block B0) located above the control point 1210 or the neighboring block 1228 (block B1) located above and to the right of the control point 1210; and the motion vector $\vec{v}_{21}$ at the control point 1214 located at the bottom left corner of the current block 1202 can be inherited from the neighboring block 1230 (block A0) located to the left of the control point 1210 or the neighboring block 1232 (block A1) located to the left and below the control point 1210.

In some examples, memory structures such as buffers can be used for affine motion prediction of blocks according to the various techniques discussed above. For example, since motion information predictors are derived from the reconstructed motion information of previously reconstructed blocks (also referred to as previously coded blocks), the motion parameters from previously coded blocks can be stored in the buffers. In the case of affine motion prediction, motion information from neighboring blocks can be stored in buffers such as a line buffer or a local buffer. As will be described in further detail in the following sections, the line buffer can be used to store motion information of a line of previously coded blocks located at boundary of a coding unit such as a coding tree unit (CTU). The information stored in the line buffer can be used for affine motion prediction of one or more blocks of another CTU according to different inter-prediction techniques in some examples. By contrast, the local buffers may be local to a CTU and can be used to store motion information previously coded blocks located anywhere in the CTU. The information stored in the local buffers can be used for affine motion prediction of one or more blocks of the same CTU according to different inter-prediction techniques in some examples.

In an example decoder design (e.g., for the decoding device 112), a buffer which is generally referred to as a working buffer can be provided for storing reconstructed data. For example, the reconstructed data can include pixel values, coding information (e.g. skip mode, prediction mode, merge mode, and/or other coding information), and the reconstructed motion information (e.g. reference picture index, motion vectors, and/or other information). The reconstructed data can be stored for a pre-defined working block size in the working buffer. In some examples, the working block size can include a coding unit or coding tree unit (CTU) or a largest coding unit (LCU). The working buffer can use a local memory with very low access latency. For example, the local memory can include a cache, on-chip memory, and/or other low access latency memory.

In some examples, the working block size can be assumed as being equal to the CTU size. For each block within the CTU, if the prediction coding information is derived from the neighboring blocks within the same CTU, fetching the data stored in the working buffer may be sufficient for the prediction. However, when the prediction coding information is derived from neighboring blocks outside a current CTU to which the current block belongs, the prediction information may need to be fetched from a buffer (or other memory) outside the working buffer of the current CTU. Fetching data from a memory outside the current CTU can lead to long latencies and delays. In some implementations, to solve this issue, the line buffer can be used to avoid or reduce the long access latencies in cases where the neighboring candidate blocks may be located outside the current CTU.

In some implementations, the line buffer can be designed to provide low access latency. The line buffer can be used to store the predicting coding information of the blocks outside of the current working block (e.g., a current CTU). For example, the line buffer can be used for storing motion parameters of one or more neighboring blocks outside the current CTU, where the motion parameters can be used for affine motion prediction of a current block of the current CTU. In some examples, the information stored in the line buffer can include the information used for spatial prediction for blocks in the CTU.

In some examples, the CTUs can be encoded and/or decoded in a raster-scan order (e.g., in the case of large-resolution video, or other video). In some examples, the reconstructed samples and other coding information may be written to a non-local memory such as the line buffer. Upon decoding the CTUs, the storage capacity of the line buffer can be released for encoding and/or decoding of subsequent CTUs. For example the line buffer can be implemented using technology such as Double Data-Rate (DDR) Static Random Access Memory (SRAM), or other memory which can provide the low access latency expectations of the line buffer.

In some examples of encoding and/or decoding a row of the CTU in raster-scan order, information from another row may need to be re-loaded into a local buffer. For example, when starting to encode and/or decode a current row of the CTU, the reconstructed samples and other coding information from the bottom row of a previous row of the CTU needs to be re-loaded into the local buffer, such that the required data from the previous row can be made available once the computation units need them for the encoding and/or decoding of the current row.

Figure 13:
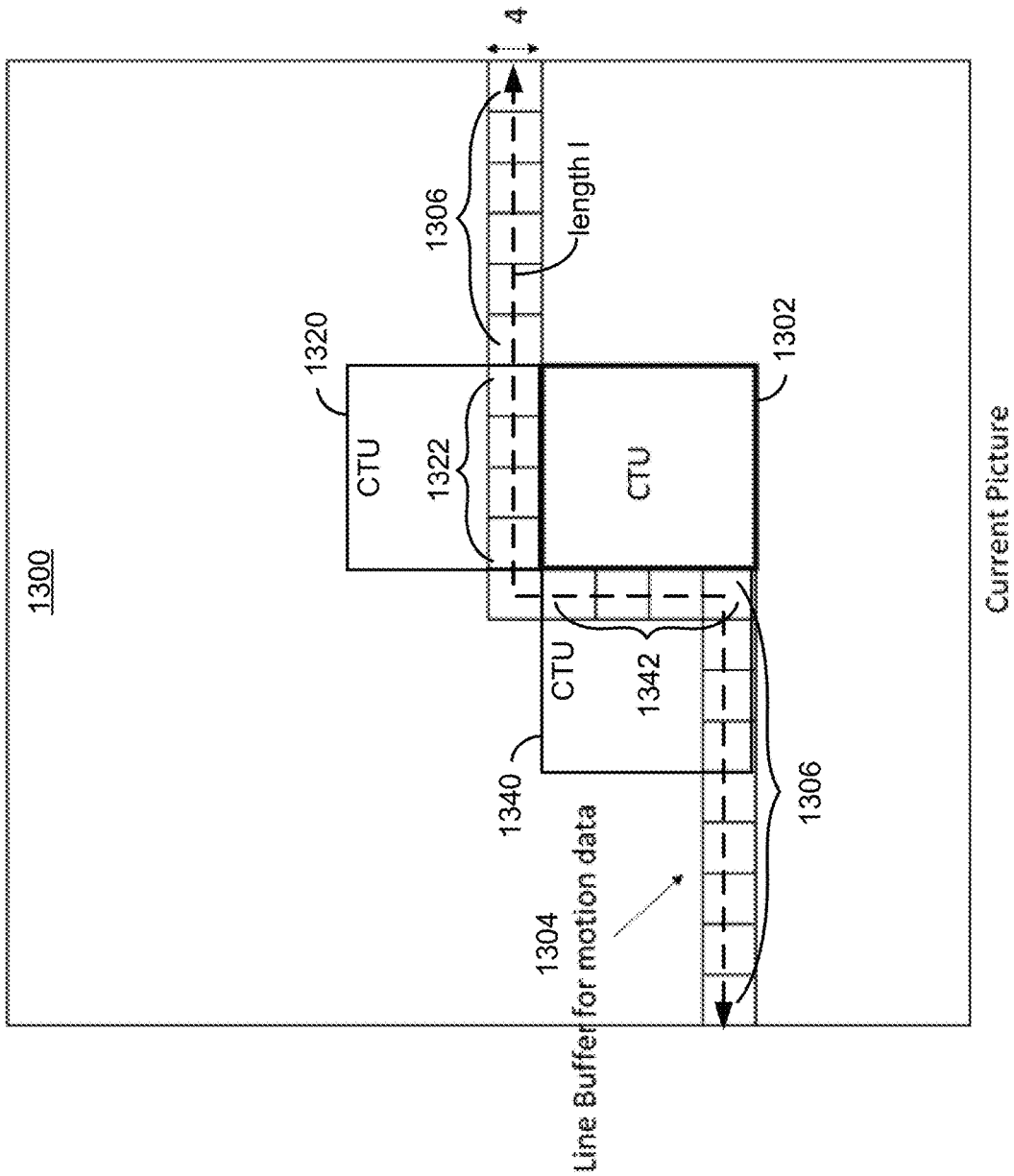
FIG. 13 is a diagram illustrating an example of line buffer that can be used for video coding, in accordance with some examples.

FIG. 13 is a diagram which illustrates an example implementation of a line buffer. In an example HEVC implementation, a current picture 1300 can be encoded and/or decoded using one or more CTUs such as a CTU 1302. The CTU 1302 can be referred to as a current CTU. One or more neighboring CTUs 1320 and 1340 of the current CTU 1302 are also shown. A conceptual illustration of a line buffer 1304 is provided in FIG. 13, where the line buffer 1304 can include a memory structure which can store the motion information of one or more coding blocks of one or more CTUs of the current picture 1300. In some examples, some of the motion information stored in the line buffer 1304 can be used for spatial motion vector (MV) prediction of blocks of the CTU 1302.

In an illustrative example, the line buffer 1304 can store motion information of one or more coding blocks of size 4×4 each. Several sets of 4×4 blocks are identified in FIG. 13, including a set of coding blocks 1306 which may belong to one or more CTUs which have not been specifically illustrated, as well as a set of coding blocks 1322 belonging to the CTU 1320 and a set of coding blocks 1342 belonging to the CTU 1340. In some example, there may be several rows of CTUs associated with the current picture 1300, with N CTUs per row. In such examples, a line of coding blocks for each of the N CTUs in a row may be stored in the line buffer 1304, with a size of the line buffer 1304 being large enough to accommodate the line of coding blocks from each of the N CTUs. In some examples, the coding blocks 1306 and 1322 can correspond to coding blocks at a bottom boundary of associated CTUs to which they belong. In some examples, coding blocks of another boundary such as a right boundary of a CTU can also be stored in the line buffer 1304. For example, the coding blocks 1342 in the right boundary of the CTU 1340 can also be stored in the line buffer 1304, and the size of the line buffer 1304 can be expanded to accommodate such coding blocks 1342 as well. A length "l" of the line buffer 1304 is indicated in FIG. 13, which can correspond to the number of coding blocks in the bottom boundary of each all of the CTUs in a row added to the number of coding blocks in the right boundary of a CTU such as the CTU 1342. In some implementations, the storage space of the line buffer 1304 may be allocated based on the length 1 and the size of the coding blocks. Since this storage space may be limited as noted above, it is desirable to improve the utilization of the storage space of the line buffer 1304.

In some examples, the CTU 1320 can belong to a previous row where the CTU 1302 belongs to a current row. As previously mentioned, one or more coding blocks 1322 of the bottom boundary of the CTU 1320 (also referred to as an above CTU with respect to the current CTU 1302) can be stored in the line buffer 1304. The one or more coding blocks 1322 can be used for inter-prediction of one or more affine motion vectors of the CTU 1302. In some examples, one or more coding blocks 1342 of the right boundary of the CTU 1340 (also referred to as a left CTU with respect to the current CTU 1302) can also be stored in the line buffer 1304. The one or more coding blocks 1342 can also be used for inter-prediction of one or more affine motion vectors of the CTU 1302.

In the case of the inherited affine motion vector predictors, one or more additional buffers (or alternatively, additional storage in excess of the line buffer 1304) may be utilized for storing the control point MVs (CPMVs) which may be used for affine motion prediction of coding blocks of the CTU 1302. Compared to the normal translational motion model where only one MV is used for inherited motion vector prediction, some implementations of the inherited affine motion model may utilize three CPMVs (or two or four CPMVs in some cases) for affine motion prediction, as described above. For example in a 6-parameters affine motion model, motion information such as CPMVs of three control points of a neighboring block may be stored for being utilized in inherited affine motion vector prediction of a current block. If the neighboring block is located outside a current CTU in which the current block belongs, then the CPMVs may be stored in the line buffer. Storing the three CPMVs (or more or less CPMVs in some cases) can significantly increase the size of line buffer from the size of the line buffer 1304 discussed above. In addition, as seen from equations (11) to (12), the location, width, and height of the neighboring block are also required for the inherited affine MVP of the current block. Thus, for affine motion predictors, the location, width, and height of the neighboring block located outside the current CTU also need to be stored in the line buffer, which can further increase the size of the line buffer needed for inherited affine motion vector prediction.

In some examples, the motion information used for the inherited affine motion vector prediction can include a motion vector and a reference picture index to indicate which reference picture is used for prediction. In cases when bi-prediction is allowed, a motion vector and a reference picture index are required for each prediction direction. In addition, an inter-prediction direction is used to indicate the prediction direction (e.g., whether it is forward prediction, backward prediction, or bi-prediction). As used herein, the term "motion vector" (MV) is used interchangeably to represent a single MV or all of the motion information required for an inter-prediction coded block.

In the case of Advanced Motion Vector Prediction (AMVP) mode, the MV is represented by a motion vector predictor (MVP) and a motion vector difference (MVD). An MVP index is also used to indicate a selected MVP. The MVP can be derived from neighboring coded blocks, and is referred to as an AMVP candidate. In the case of a 6-parameters affine coded block, the MVP and the MVD both include 3 MVs. In the case of a 4-parameters affine coded block, the MVP and the MVD both include 2 MVs.

In the merge mode, the motion information is represented only by an index of MVP. The MVP in merge mode is referred to as a merge candidate. The index is referred to as a merge index and is used to indicate the selected merge candidate.

As noted above, techniques are described herein for affine motion prediction. In some examples, systems, apparatuses, methods, and computer-readable media are described herein that are related to inherited affine MVP with improved utilization of the line buffers. For example, some restrictions and/or modifications can be made to the inherited affine MVP from a 6-parameters affine coded neighboring block so that no additional line buffer or less additional line buffers can be utilized.

The following terminology is used for describing illustrative examples of the inherited affine MVP. In some examples, the term "coordinate" of a CTU can refer to different points (e.g., samples corresponding to color components such as Y Cb Cr, or pixels) within the CTU. For example, the points within the CTU can include a top-left point, the center point, or other point of the CTU. As described herein, a coordinate (neiCtuX, neiCtuY) refers to the coordinate of the CTU in which a neighboring candidate block is located. A coordinate (curCtuX, curCtuY) refers to the coordinate of a current CTU in which a current block for inherited affine MVP is located. A location (x0',y0') refers to the location of a top left control point motion vector (CPMV) of the current block, (x1',y1 ') refers to the location of a top right CPMV of the current block, and (x2',y2') refers to the location of a bottom left CPMV of the current block. In examples of the current block, x0' is equal to x2', and y0' is equal to y1'.

In some implementations, an inherited affine motion vector predictor (MVP) can be obtained from a neighboring CTU, which may be an above CTU or other neighboring CTU (e.g., a left neighboring CTU, a top-left neighboring CTU, or other neighboring CTU). In some examples, the neighboring candidate block can be located in a row above the current CTU's row (e.g., neiCtuY>curCtuY && neiCtuX>=curCtuX). As noted above, obtaining and storing three (or more) CPMVs from the neighboring candidate block for inherited affine MVP of the current block can increase the size of the line buffer. The following techniques can be implemented to prevent such an increase in the size of the line buffer.

Figure 14:
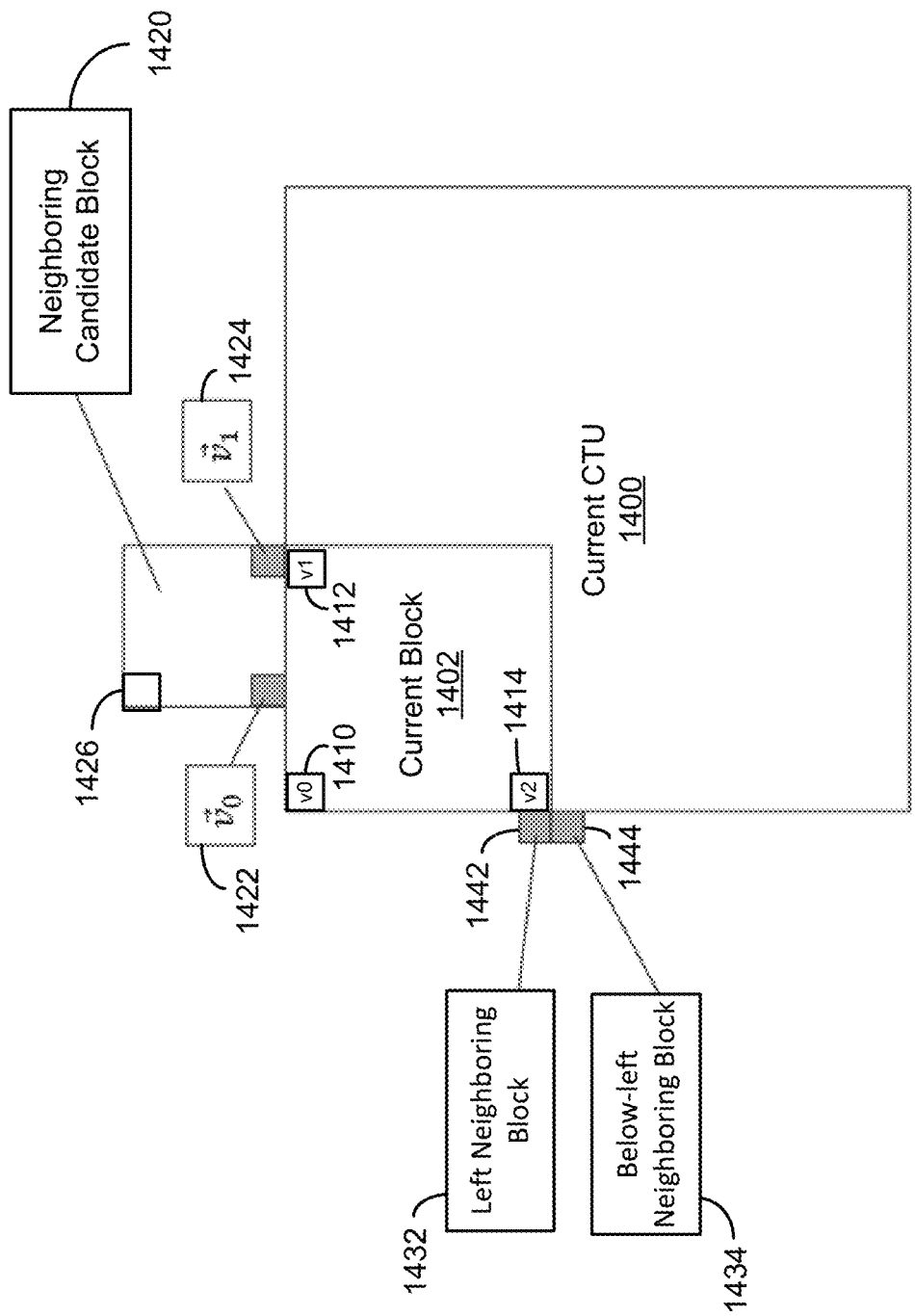
FIG. 14 is a diagram illustrating an example of a current block of a current coding tree unit (CTU), in accordance with some examples.

FIG. 14 is a diagram illustrating an example aspect of improved line buffer utilization in affine motion prediction. In FIG. 14, a current CTU 1400 is shown to include a current block 1402. Affine motion prediction of the current block 1402 can be performed using affine motion vectors or CPMVs at control points 1410, 1412, and 1414. In the example shown in FIG. 14, a neighboring block 1420 of the current block 1402 is located outside of the current CTU 1400 in an above neighboring CTU above the current CTU 1400. For example the neighboring block 1420 may be one of a line of blocks in a bottom boundary of the above neighboring CTU, similar to the blocks 1322 shown in the above CTU 1320 in FIG. 13. In some examples, other neighboring blocks of the current block 1402 may also be located outside the CTU 1400, such as a neighboring block in a left neighboring CTU to the left of the current CTU 1400 or in another neighboring CTU relative to the current CTU 1400. For example, a neighboring block of the current block 1402 can be one of a line of blocks on a right boundary of a left neighboring CTU, similar to the blocks 1342 shown in the left CTU 1342 in FIG. 13. Using the affine motion vector predictor inheritance techniques described above, one or more of the motion vectors $\{\vec{v}_0, \vec{v}_1, \vec{v}_2\}$ at the control points 1422, 1424, and 1426 of the neighboring block 1420 can be inherited for use as CPMVs of the current block 1402. Inheriting motion vectors from the neighboring block 1420 includes an intermediate step of storing the inherited motion vectors in a line buffer because the neighboring block 1420 is outside the current CTU 1400. As previously mentioned, it is desirable to improve the utilization of the storage space provided by the line buffer. In some examples, utilization of the storage space of the line buffer can be improved by avoiding the storing of all three motion vectors from the neighboring block 1420 in the line buffer.

In some examples using the techniques described herein, affine motion prediction for the current block 1402 can be performed by inheriting less than all three motion vectors $\{\vec{v}_0, \vec{v}_1, \vec{v}_2\}$ from the neighboring block 1420. In one illustrative example, a motion vector from the control point 1426 of the neighboring block 1420 can be restricted from being inherited. For instance, avoiding or restricting the motion vector from the control point 1426 of the neighboring block 1420 from being inherited can include preventing or restricting the motion vector from the control point 1426 of the neighboring block 1420 from being stored in the line buffer according to techniques described below. As described below, when three motion vectors are used for affine motion prediction of the current block 1402, two motion vectors can be obtained from the neighboring block 1420 and a third can be derived or computed using one or more motion vectors obtained from a different neighboring block than the neighboring block 1420. In some examples, the different neighboring block can be referred to as an additional neighboring block. In some examples, the additional neighboring block may be located outside the CTU 1400. In some examples, the additional neighboring block may be selected from a left neighboring block 1432 or a below left neighboring block 1434. For example, at least a motion vector 1442 of the left neighboring block 1432 and/or at least a motion vector 1444 of the below left neighboring block 1434 may already be stored (or previously stored) in the line buffer. For example, as noted above, the left neighboring block 1432 and/or the below left neighboring block 1434 may be similar to the blocks 1342 in the left CTU 1340 of FIG. 4, and so their respective motion vectors 1442 and/or 1444 may already be stored in a line buffer such as the line buffer 1304. Therefore, obtaining the motion vector 1442 or the motion vector 1444 from the line buffer for use as a CPMV of the current block 1402 can avoid the need for storing the third motion vector from the control point 1426 of the neighboring block 1420 in the line buffer.

In more detail, in some examples, two MVs, a first motion vector $\vec{v}_0$ and a second motion vector $\vec{v}_1$, at a bottom boundary of the neighboring block 1420 are obtained for determining CPMVs for the current block 1402. For instance, the two MVs $\vec{v}_0$ and $\vec{v}_1$ can be at control points 1422 and 1424 located at (x0, y0) and (x1, y1) respectively in the neighboring block 1420, where y0 is equal to y1, and x0 is not equal to x1. The two MVs $\vec{v}_0$ and $\vec{v}_1$ can be inherited from the neighboring block 1420 and used as CPMVs for the current block 1402. The two MVs $\vec{v}_0$ and $\vec{v}_1$ can be stored in a line buffer since the bottom boundary of the neighboring block 1420 is adjacent to a top boundary of the current CTU 1400 (e.g., similar to the line buffer 1304 shown in FIG. 13 where one or more blocks 1322 in a bottom boundary of the above CTU 1320 may be stored in the line buffer 1304).

In some examples, a third motion vector (MV) $\vec{v}_2$ can be obtained from an additional neighboring block. In FIG. 14, the third motion vector (MV) $\vec{v}_2$ can be obtained from the left neighboring block 1432 located to the left of the control point 1414 of the current block 1402 or from the below left neighboring block 1434 located below and to the left of the control point 1414 of the current block 1402. For example, the third motion vector (MV) $\vec{v}_2$ can be obtained from the motion vector 1442 of the left neighboring block 1432 or the below left neighboring block 1434. In some examples, the motion vector 1442 and/or the motion vector 1444 can include translational motion vectors or CPMVs. In some examples, the additional neighboring block can be selected from one of the left neighboring block 1432 or the below left neighboring block 1434 based on which one of these two neighboring blocks 1432 or 1434 may include the MV $\vec{v}_2$. In some examples, these two neighboring blocks 1432 or 1434 may be checked for the MV $\vec{v}_2$ in an order which can be predefined. In some examples, the order can include checking the left neighboring block 1432 first and then the below left neighboring block 1434. In some examples, the order can be reversed to include checking the below left neighboring block 1434 first and then the left neighboring block 1432. The location of the left neighboring block 1432 and the below left neighboring block 1434 can be similar to that of HEVC and/or VVC in some cases. In some examples, the MV $\vec{v}_2$ obtained from the additional neighboring block can be used to obtain a third CPMV for the current block 1402 at the control point 1414 located at (x2, y2), where y2 is not equal to y0. In some examples, the MV $\vec{v}_2$ from the additional neighboring block can be used as the CPMV for inherited affine MVP at the control point 1414. In some examples, the MV $\vec{v}_2$ from the additional neighboring block can be used to derive the CPMV for an AMVP mode (e.g., AF_INTER mode) of affine motion prediction at the control point 1414.

In some examples, the additional neighboring block can also be located outside the current CTU 1400. For example, the left neighboring block 1432 and the below left neighboring block 1434 are shown to be located outside the current CTU 1400 in FIG. 14. In such cases, the MV $\vec{v}_2$ from the additional neighboring block is already or previously stored in the line buffer as previously explained. Accordingly, obtaining the MV $\vec{v}_2$ from the additional neighboring block for inheriting or deriving the CPMV of the control point 1414 of the current block 1402 can include obtaining the MV $\vec{v}_2$ previously stored in the line buffer maintained for the current CTU 1400.

In some examples, the additional neighboring block can be located inside the current CTU 1400. For example, the additional neighboring block can include a neighboring coded block located to the left or below left of the current block and within the current CTU (not specifically illustrated). In such cases, the MV $\vec{v}_2$ from the additional neighboring block may have already been stored or was previously stored in a local buffer such as a motion vector (MV) buffer of the current CTU. Such local buffers, as previously discussed may be provided in addition to the line buffer and may be used for storing coding information of blocks within a CTU. Unlike the line buffer, the local buffers may store coding information of any block within the CTU, not necessarily only the coding blocks on a boundary of the CTU. Thus, the storage space in the local buffer such as the MV buffer may not be similarly restricted to only storing motion information of coded blocks on the boundary of the CTU. As such, the storage space constraints for the MV buffer may be separate from the storage space constraints in the line buffer. In some examples, coding information stored in the MV buffer may be used instead of relying on coding information stored in the line buffer as a way of reducing the demands on the line buffer. Accordingly, in some examples, obtaining the MV $\vec{v}_2$ from the additional neighboring block for inheriting or deriving the CPMV of the control point 1414 of the current block 1402 can include obtaining the MV $\vec{v}_2$ previously stored in the MV buffer.

In some examples, as illustrated in FIG. 14, the two MVs inherited from the neighboring block 1420 and the additional MV obtained from the neighboring block 1432 or 1434 can be used for determining the affine motion parameters or CPMVs of the current block 1402. For example, the first motion vector, the second motion vector, and the third motion vector ($\vec{v}_0$, $\vec{v}_1$, and $\vec{v}_2$) can be used to inherit and/or derive the CPMVs for the affine motion model of the current block 1402.

In some examples, the two MVs $\vec{v}_0$ and $\vec{v}_1$ from the neighboring block 1420 are considered to have the same y coordinate as the top left CPMV at the control point 1410 of the current block 1402. For instance, the CPMVs of the inherited affine MVP can be derived as $\vec{v}'_0=\vec{v}_0+(x0'-x0)*(\vec{v}_1-\vec{v}_0)/(x1-x0)$, $\vec{v}'_1=\vec{v}_0+(x1'-x0)*(\vec{v}_1-\vec{v}_0)/(x1-x0)$ and $\vec{v}'_2=\vec{v}_2$.

In some examples, the two MVs $\vec{v}_0$ and $\vec{v}_1$ from the neighboring block 1420 can be located at the center of two sub-blocks (not specifically illustrated). In such cases a temporary MV $\vec{v}_t$ can be obtained at location (x2, y0), derived as $\vec{v}_t=\vec{v}_0+(x2-x0)*(\vec{v}_1-\vec{v}_0)/(x1-x0)$. For example, the temporary MV can be obtained from a location in the bottom boundary of the neighboring block 1420 from a control point located at the same x axis as the third motion vector $\vec{v}_2$ but at the same y axis as the first motion vector $\vec{v}_0$. In such cases, the CPMVs of the inherited affine MVP are derived as:

$$\vec{v}'_0 = \vec{v}_0 + (x0' - x0) * \frac{\vec{v}_1 - \vec{v}_0}{x1 - x0} + (y0' - y0) * \frac{\vec{v}_2 - \vec{v}_t}{y2 - y0}$$

$$\vec{v}'_1 = \vec{v}_0 + (x1' - x0) * \frac{\vec{v}_1 - \vec{v}_0}{x1 - x0} + (y1' - y0) * \frac{\vec{v}_2 - \vec{v}_t}{y2 - y0}$$

$$\vec{v}'_2 = \vec{v}_0 + (x2' - x0) * \frac{\vec{v}_1 - \vec{v}_0}{x1 - x0} + (y2' - y0) * \frac{\vec{v}_2 - \vec{v}_t}{y2 - y0}$$

In some examples, the two MVs $\vec{v}_0$ and $\vec{v}_1$ from the neighboring block 1420 have the same y coordinate as the top left CPMV located at the control point 1410 of the current block 1402 (not specifically illustrated). In such cases, a temporary MV $\vec{v}_t$ can be obtained at a location (x2, y0), derived as $\vec{v}_t=\vec{v}_0+(x2-x0)*(\vec{v}_1-\vec{v}_0)/(x1-x0)$. For example, the temporary MV can be obtained from a location in the bottom boundary of the neighboring block 1420 from a control point located at the same x axis as the third motion vector $\vec{v}_2$ but at the same y axis as the CPMV $\vec{v}_0$. In such cases, the CPMVs of the inherited affine MVP are derived as:

$$\vec{v}'_0 = \vec{v}_0 + (x0' - x0) * \frac{\vec{v}_1 - \vec{v}_0}{x1 - x0}$$

$$\vec{v}'_1 = \vec{v}_0 + (x1' - x0) * \frac{\vec{v}_1 - \vec{v}_0}{x1 - x0}$$

$$\vec{v}'_2 = \vec{v}_0 + (x2' - x0) * \frac{\vec{v}_1 - \vec{v}_0}{x1 - x0} + (y2' - y0) * \frac{\vec{v}_2 - \vec{v}_t}{y2 - y0}$$

While the above discussion is directed to obtaining the third motion vector (MV) $\vec{v}_2$ from the additional neighboring block (e.g., block 1432 or block 1434), in some cases the third motion $\vec{v}_2$ may not be available from such an additional neighboring block. For example, the additional neighboring blocks such as the left neighboring block 1432 and the below left neighboring block 1434 at the location (x2, y2) may not be inter-coded, or these additional neighboring blocks may not be available. In some examples, when the third motion vector $\vec{v}_2$ is not available, the inherited affine MVP is considered as unavailable. In some examples, when the third motion vector $\vec{v}_2$ is not available, the derivation process is performed as if the affine motion model is a 4-parameters affine motion model, using the following equations:

$$\vec{v}'_0 = \vec{v}_0 + (x0' - x0) * \frac{\vec{v}_1 - \vec{v}_0}{x1 - x0}$$

$$\vec{v}'_1 = \vec{v}_0 + (x1' - x0) * \frac{\vec{v}_1 - \vec{v}_0}{x1 - x0}$$

$$\vec{v}'_2 = \vec{v}_0 + (x2' - x0) * \frac{\vec{v}_1 - \vec{v}_0}{x1 - x0} + (y2' - y0) * \nabla \vec{v}_v,$$

where $\nabla \vec{v}_v = \left(\frac{v_{0y} - v_{1y}}{x1 - x0}, \frac{v_{1x} - v_{0x}}{x1 - x0}\right)$.

Figure 15:
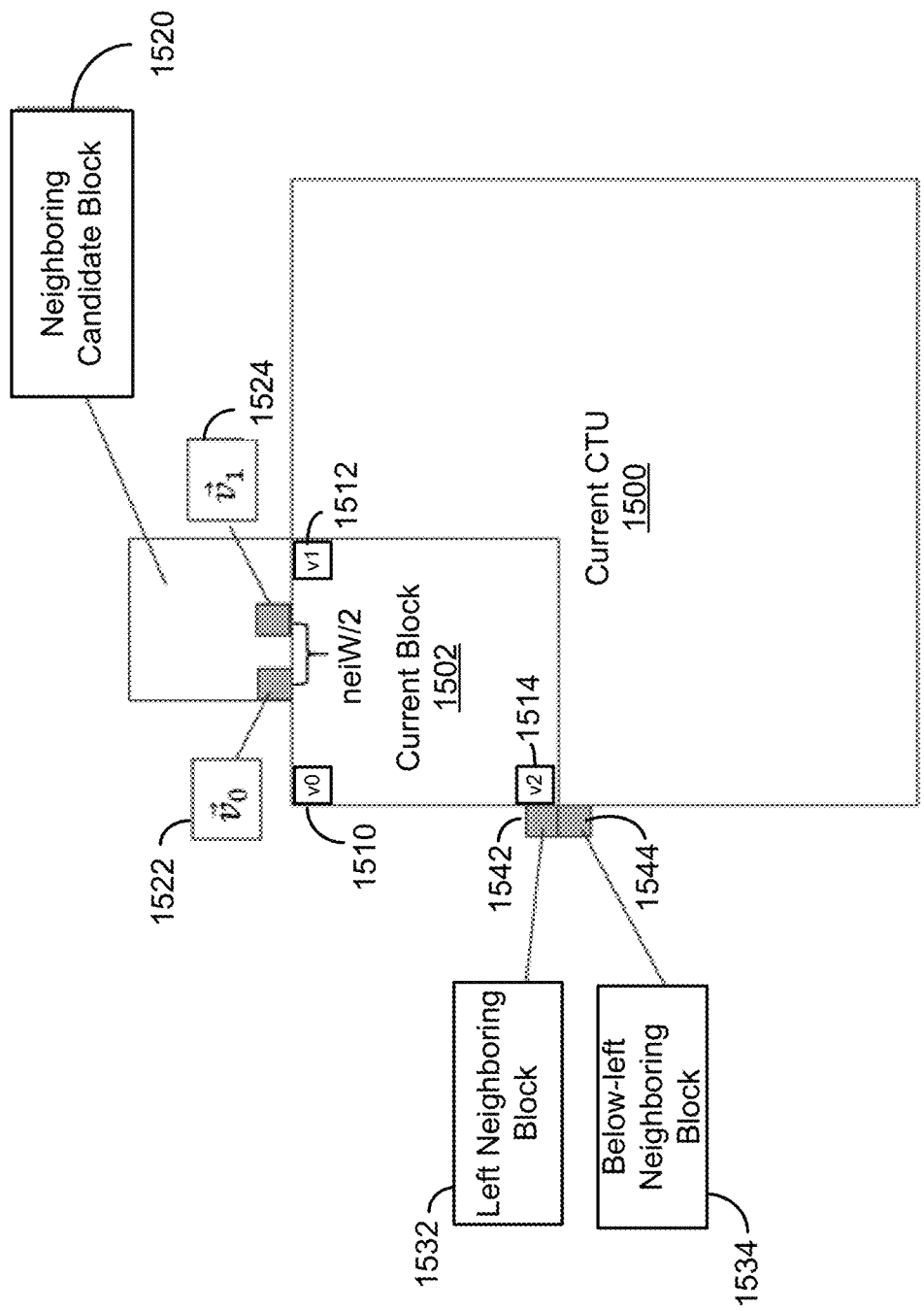
FIG. 15 is a diagram illustrating another example of a current block of a CTU, in accordance with some examples.

FIG. 15 is a diagram illustrating another example aspect of improved line buffer utilization in affine motion prediction. FIG. 15 is similar in many aspects to FIG. 14, and the following explanation will highlight the distinctive features of FIG. 15. In FIG. 15, a current CTU 1500 is shown to include a current block 1502. Affine motion prediction of the current block 1502 can be performed using affine motion vectors or CPMVs at control points 1510, 1512, and 1514. A neighboring block 1520 of the current block 1502 may be located outside the current CTU 1500, e.g., in a neighboring CTU above the current CTU 1500.

In some examples, two MVs, a first motion vector $\vec{v}_0$ and a second motion vector $\vec{v}_1$, at a bottom boundary of the neighboring block 1520 are obtained for inherited affine MVP of the current block 1502. In some examples, the MV $\vec{v}_0$ can be at control point 1522 located at the bottom left corner of the neighboring block 1520, and MV $\vec{v}_1$ can be at control point 1524 located at the bottom-middle of the neighboring block 1520 (i.e., at the location neiW/2 as illustrated). In such examples, the third motion vector $\vec{v}_2$ can be derived from an additional neighboring block. The third motion vector $\vec{v}_2$ can include a motion vector 1542 of a left neighboring block 1532 located to the left of the control point 1514 of the current block 1502, or a motion vector 1544 of a below left neighboring block 1534 located below and to the left of the control point 1514 of the current block 1502, similar to the example discussed with reference to FIG. 14.

Figure 16:
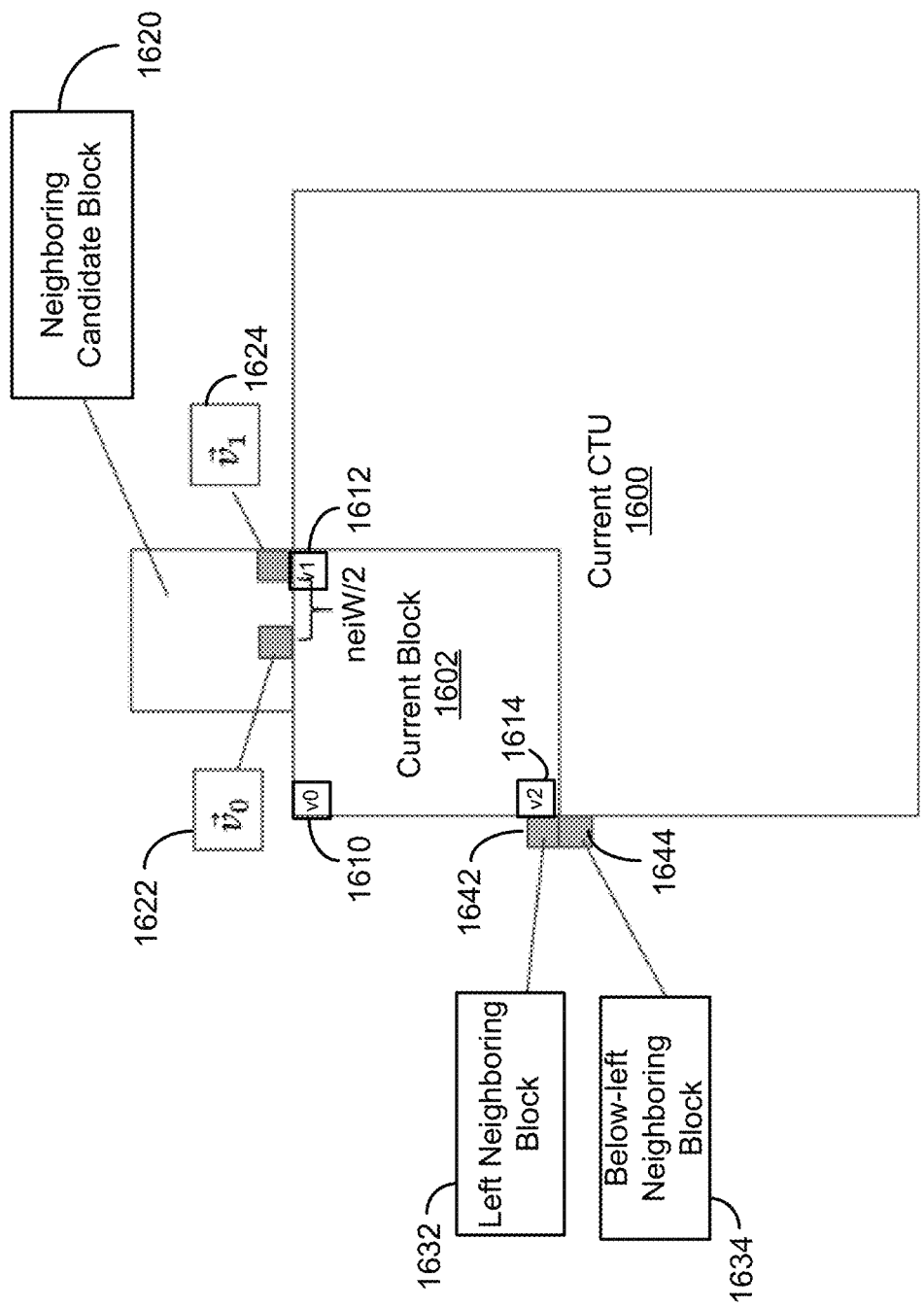
FIG. 16 is a diagram illustrating another example of a current block of a CTU, in accordance with some examples.

FIG. 16 is a diagram illustrating another example aspect of improved line buffer utilization in affine motion prediction. FIG. 16 is similar in many aspects to FIG. 14 and FIG. 15, and the following explanation will highlight the distinctive features of FIG. 16. In FIG. 16, a current CTU 1600 is shown to include a current block 1602. Affine motion prediction of the current block 1602 can be performed using affine motion vectors or CPMVs at control points 1610, 1612, and 1614. A neighboring block 1620 of the current block 1602 may be located outside the current CTU 1600, e.g., in a neighboring CTU above the current CTU 1600.

In some examples, two MVs, a first motion vector $\vec{v}_0$ and a second motion vector $\vec{v}_1$, at a bottom boundary of the neighboring block 1620 are obtained for inherited affine MVP of the current block 1602. In some examples, the MV $\vec{v}_0$ can be at control point 1622 located at the bottom-middle of the neighboring block 1620 (i.e., at the location neiW/2 as illustrated), and MV $\vec{v}_1$ can be at control point 1624 located at the bottom right corner of the neighboring block 1620. In such examples, the third motion vector $\vec{v}_2$ can be derived from an additional neighboring block. For example, the third motion vector $\vec{v}_2$ can include a motion vector 1642 of a left neighboring block 1632 located to the left of the control point 1614 of the current block, or a motion vector 1644 of a below left neighboring block 1634, similar to the examples discussed with reference to FIG. 14 and FIG. 15.

In some implementations, an inherited affine MVP can be can be obtained from a neighboring CTU which may be a left CTU. In some examples, the neighboring candidate block can be located to the left of the current CTU's column (e.g., neiCtuX<curCtuX && neiCtuY==curCtuY). As noted previously, obtaining and storing three CPMVs from the neighboring candidate block for inherited affine MVP of the current block can increase the size of the line buffer. In addition to the above techniques, the following techniques can also prevent such an increase in the size of the line buffer in such cases.

Figure 17:
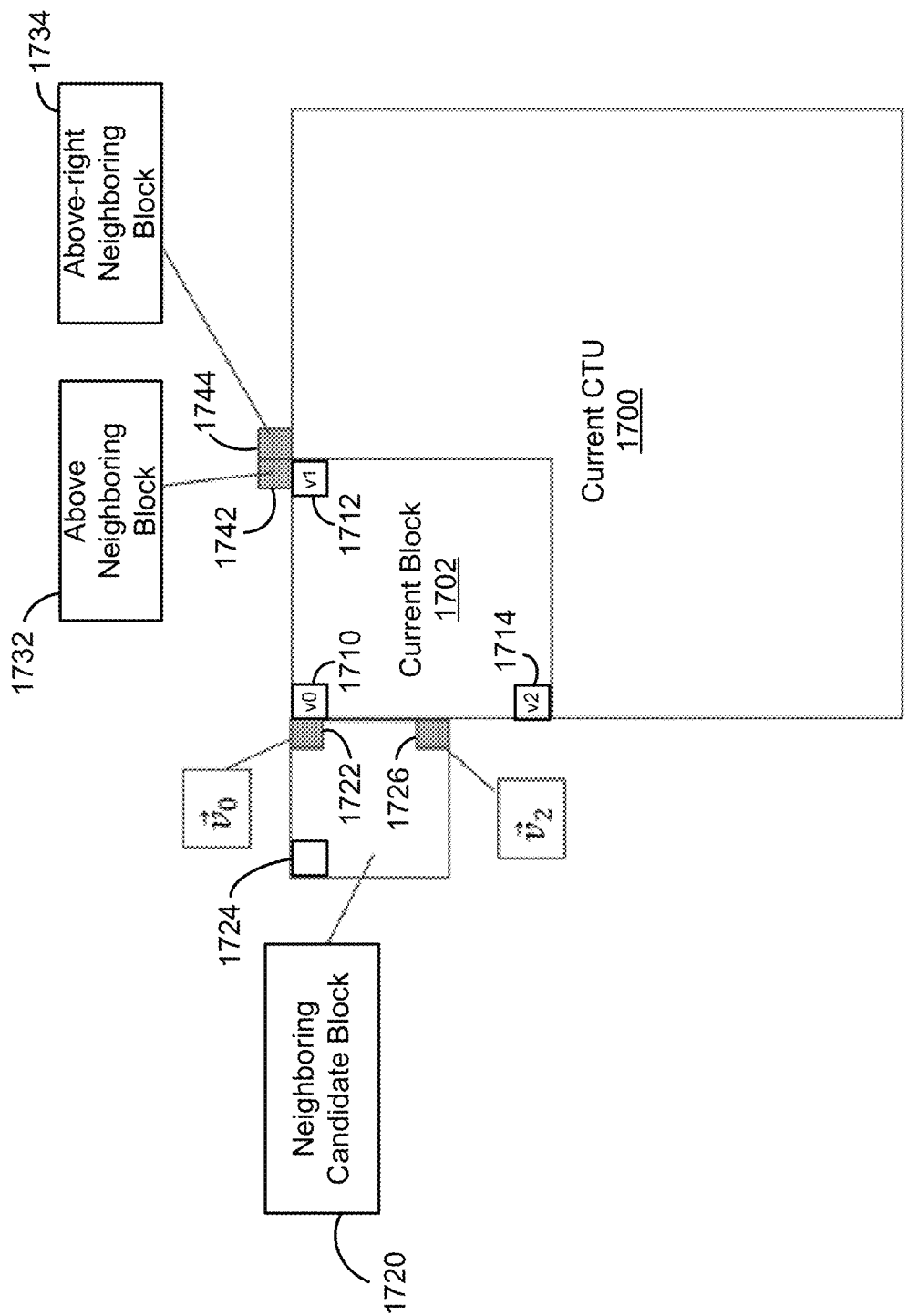
FIG. 17 is a diagram illustrating another example of a current block of a CTU, in accordance with some examples.

FIG. 17 is a diagram illustrating an example aspect of improved line buffer utilization in affine motion prediction. In FIG. 17, a current CTU 1700 is shown to include a current block 1702. Affine motion prediction of the current block 1702 can be performed using affine motion vectors or CPMVs at control points 1710, 1712, and 1714. A neighboring block 1720 of the current block 1702 may be located outside the current CTU 1700, e.g., in a neighboring CTU to the left of the current CTU 1700. For example, the neighboring block 1720 can be similar to one of a line of the blocks 1342 on a right boundary of a left CTU 1340, where the blocks 1342 may be stored in the line buffer 1304, as shown in FIG. 13. One or more of the motion vectors {$\vec{v}_0$, $\vec{v}_1$, $\vec{v}_2$} at the control points 1722, 1724, and 1726 of the neighboring block 1720 can be inherited for using as CPMVs of the current block 1702.

In some examples, two MVs $\vec{v}_1$ and $\vec{v}_2$ at the right boundary of the neighboring block 1720 can be stored in the line buffer and used as CPMVs at location (x1, y1) and (x2, y2), where x1 is equal to x2, y1 is not equal to y2.

In some examples, an additional buffer may be provided which may be another local buffer used for storing the motion information of coding blocks in the right boundary of a left CTU. For example, the additional buffer can be provided in addition to the line buffer for storing one or more of the coding blocks 1342 in the left CTU 1340 of FIG. 13. The additional buffer can be updated after coding each CTU. The size of the additional buffer may be tailored to correspond to the size of the CTU, e.g., of size sufficient to accommodate coding blocks on the right boundary of the CTU. In some examples, a predefined maximum number of MVs can be stored in the additional buffer, and used to obtain the MV $\vec{v}_0$. In some examples, the predefined maximum number can be calculated as CTUSize/MinBlockSize, where the CTUSize refers to the size (in width and height of the CTU 1700 and the MinBlockSize refers to the minimum block size). The size of the additional buffer may be smaller than the size of the line buffer which was previously discussed as being proportional to a number N of all CTUs in a row. The smaller additional buffer can therefore be used instead of relying on the line buffer in some examples. This way, the storage demands on the line buffer can be reduced.

In some examples, the motion vector (MV) $\vec{v}_0$ from the neighboring block 1720 can be previously stored in the additional buffer. In some examples, the motion vector (MV) $\vec{v}_0$ from the neighboring block 1720 can be obtained from the additional buffer and used as a CPMV of the current block 1702 at location (x0, y0), where x0 is not equal to x1, but y0 is equal to y1. In some examples, the additional buffer can be separate from the line buffer.

In some examples, the three MVs ($\vec{v}_0$, $\vec{v}_1$, and $\vec{v}_2$) obtained as above from the neighboring block 1720 can be used to derive the affine motion model, and therefore derive the inherited affine MVPs. For example, CPMVs of the inherited affine MVP can be derived using the following equations:

$$\vec{v}'_0 = \vec{v}_0 + (x0' - x0) * \frac{\vec{v}_1 - \vec{v}_0}{x1 - x0} + (y0' - y0) * \frac{\vec{v}_2 - \vec{v}_1}{y2 - y1}$$

$$\vec{v}'_1 = \vec{v}_0 + (x1' - x0) * \frac{\vec{v}_1 - \vec{v}_0}{x1 - x0} + (y1' - y0) * \frac{\vec{v}_2 - \vec{v}_1}{y2 - y1}$$

$$\vec{v}'_2 = \vec{v}_0 + (x2' - x0) * \frac{\vec{v}_1 - \vec{v}_0}{x1 - x0} + (y2' - y0) * \frac{\vec{v}_2 - \vec{v}_1}{y2 - y1}$$

In some examples, the motion vector (MV) $\vec{v}_1$ can be obtained from another neighboring coded block, referred to as an additional neighboring block. In FIG. 17, an above neighboring block 1732 located to the top of the control point 1712 of the current block 1702 and an above right neighboring block 1734 located above and to the right of the control point 1712 of the current block 1702 are examples of the additional neighboring block. In some examples, the motion information of the above neighboring block 1732 and/or the motion information of the above right neighboring block 1734 may already be stored in the line buffer. For example, the above neighboring block 1732 and/or the above right neighboring block 1734 can be located at a bottom boundary of an above CTU, similar to the blocks 1322 of the above CTU 1320 shown in FIG. 13. In some examples, the additional neighboring block can be selected from one of the above neighboring block 1732 or the above right neighboring block 1734 based on which one of these two neighboring blocks 1732 or 1734 may include the MV $\vec{v}_1$. For example, the MV $\vec{v}_1$ can include a motion vector 1742 of the above neighboring block 1732 or a motion vector 1744 of the above right neighboring block 1734. In some examples, these two neighboring blocks 1732 or 1734 may be checked for the respective MV $\vec{v}_1$ in an order which can be predefined. In some examples, the order can include checking the above neighboring block 1732 first and then the above right neighboring block 1734. In some examples, the order can be reversed to include checking the above right neighboring block 1734 first and then the above neighboring block 1732. In some examples, the MV $\vec{v}_1$ obtained from the additional neighboring block can be used to obtain a CPMV for the current block 1702 at the control point 1712 located at (x1, y1), where x1 is not equal to x0. In some examples, the MV $\vec{v}_1$ from the additional neighboring block can be used as the CPMV for inherited affine MVP at the control point 1712. In some examples, the MV $\vec{v}_1$ from the additional neighboring block can be used to derive the CPMV for an AMVP mode of affine motion prediction at the control point 1712.

In some cases, the two MVs $\vec{v}_0$ and $\vec{v}_2$ from the neighboring block 1720 are considered to have the same x coordinate as the top left CPMV at the control point 1710 of the current block 1702. For instance, the CPMVs of the inherited affine MVP can be derived as $\vec{v}'_0 = \vec{v}_0 + (y0'-y0)*(\vec{v}_2-\vec{v}_0)/(y2-y0)$, $\vec{v}'_2 = \vec{v}_0 + (y2'-y0)*(\vec{v}_2-\vec{v}_0)/(y2-y0)$ and $\vec{v}'_1 = \vec{v}_1$.

In some examples, the two MVs $\vec{v}_0$ and $\vec{v}_2$ from the neighboring block 1720 can be located at the center of two sub-blocks (not specifically illustrated). In such cases a temporary MV $\vec{v}_t$ can be obtained at location (x0, y1), derived as $\vec{v}_t=(y1-y0)*(\vec{v}_2-\vec{v}_0)/(y2-y0)$. For example, the temporary MV can be obtained from a location in the right boundary of the neighboring block 1720 from a control point located at the same y axis as $\vec{v}_1$ but at the same x axis as $\vec{v}_0$. In such cases, the CPMVs of the inherited affine MVP can be derived as:

$$\vec{v}'_0 = \vec{v}_0 + (x0'-x0)*\frac{\vec{v}_1-\vec{v}_t}{x1-x0} + (y0'-y0)*\frac{\vec{v}_2-\vec{v}_0}{y2-y0}$$

$$\vec{v}'_1 = \vec{v}_0 + (x1'-x0)*\frac{\vec{v}_1-\vec{v}_t}{x1-x0} + (y1'-y0)*\frac{\vec{v}_2-\vec{v}_0}{y2-y0}$$

$$\vec{v}'_2 = \vec{v}_0 + (x2'-x0)*\frac{\vec{v}_1-\vec{v}_t}{x1-x0} + (y2'-y0)*\frac{\vec{v}_2-\vec{v}_0}{y2-y0}$$

In some examples, the two CPMVs $\vec{v}_0$ and $\vec{v}_2$ from the neighboring block 1720 are considered to have the same x coordinate as the top left CPMV located at the control point 1710 of the current block 1702 (not specifically illustrated) of current block. In such cases, a temporary MV $\vec{v}_t$ can be obtained at a location (x0, y1), derived as $\vec{v}_t=(y1-y0)*(\vec{v}_2-\vec{v}_0)/(y2-y0)$. For example, the temporary MV can be obtained from a location at the right boundary of the neighboring block 1720 from a control point located at the same y axis as $\vec{v}_2$ but at the same x axis as $\vec{v}_0$. In such cases, the CPMVs of the inherited affine MVP can be derived as:

$$\vec{v}'_0 = \vec{v}_0 + (y0'-y0)*\frac{\vec{v}_2-\vec{v}_0}{y2-y0}$$

$$\vec{v}'_1 = \vec{v}_0 + (x1'-x0)*\frac{\vec{v}_1-\vec{v}_t}{x1-x0} + (y1'-y0)*\frac{\vec{v}_2-\vec{v}_0}{y2-y0}$$

$$\vec{v}'_2 = \vec{v}_0 + (y2'-y0)*\frac{\vec{v}_2-\vec{v}_0}{y2-y0}$$

While the above discussion is directed to obtaining the motion vector (MV) $\vec{v}_1$ from the additional neighboring block, in some cases the motion vector (MV) $\vec{v}_1$ may not be available from such an additional neighboring block. For example, the additional neighboring block at the location (x1, y1) may not be inter-coded, or the motion information of the additional neighboring block may not have been previously stored in the line buffer. In some examples, when the MV $\vec{v}_1$ is not available, the inherited affine MVP is considered as unavailable. In some examples, when the MV $\vec{v}_2$ is not available, the derivation process is performed as if the affine model is a 4-parameters affine motion model, using the following equations:

$$\vec{v}'_0 = \vec{v}_0 + (y0'-y0)*(\vec{v}_2-\vec{v}_0)/(y2-y0),$$

$$\vec{v}'_2 = \vec{v}_0 + (y2'-y0)*(\vec{v}_2-\vec{v}_0)/(y2-y0),$$

$$\vec{v}'_2 = \vec{v}_1 + (y1'-y0)*\frac{\vec{v}_2-\vec{v}_0}{y2-y0} + (x1'-x0)*\nabla\vec{v}_h,$$

where $\nabla\vec{v}_h = \left(\frac{v_{2y}-v_{0y}}{y2-y0}, \frac{v_{0x}-v_{2x}}{y2-y0}\right)$.

Figure 18:
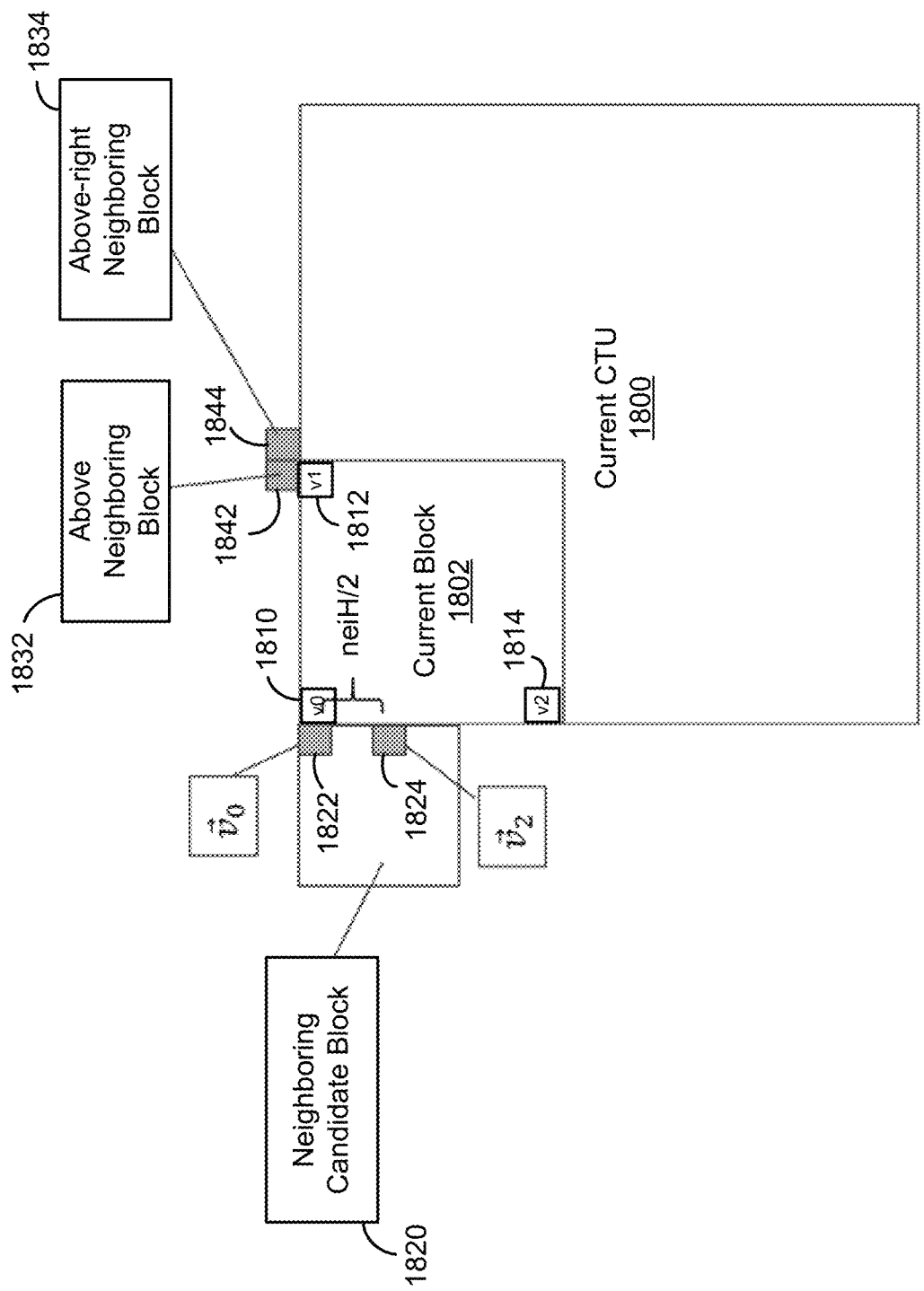
FIG. 18 is a diagram illustrating another example of a current block of a CTU, in accordance with some examples.

FIG. 18 is a diagram illustrating another example aspect of improved line buffer utilization in affine motion prediction. FIG. 18 is similar in many aspects to FIG. 17, and the following explanation will highlight the distinctive features of FIG. 18. In FIG. 18, a current CTU 1800 is shown to include a current block 1802. Affine motion prediction of the current block 1802 can be performed using affine motion vectors or CPMVs at control points 1810, 1812, and 1814. A neighboring block 1820 of the current block 1802 may be located outside the current CTU 1800, e.g., in a neighboring CTU to the left of the current CTU 1800.

In some examples, two MVs, $\vec{v}_0$ and $\vec{v}_2$, at the right boundary of the neighboring block 1820 are obtained for inherited affine MVP of the current block 1802. In some examples, the MV $\vec{v}_0$ can be at control point 1822 located at the top right corner of the neighboring block 1820, and the MV $\vec{v}_1$ can be at control point 1824 located at the middle of the right boundary of the neighboring block 1820 (i.e., at the location neiH/2 as illustrated). In such examples, the MV $\vec{v}_2$ can be derived from an additional neighboring block. For example, the MV $\vec{v}_2$ can include the motion vector 1842 of the above neighboring block 1832 located to the top of the control point 1814 of the current block 1802 or the motion vector 1844 of the above right neighboring block 1834 located to the top and right of the control point 1814 of the current block 1802, similar to the example discussed with reference to FIG. 17.

Figure 19:
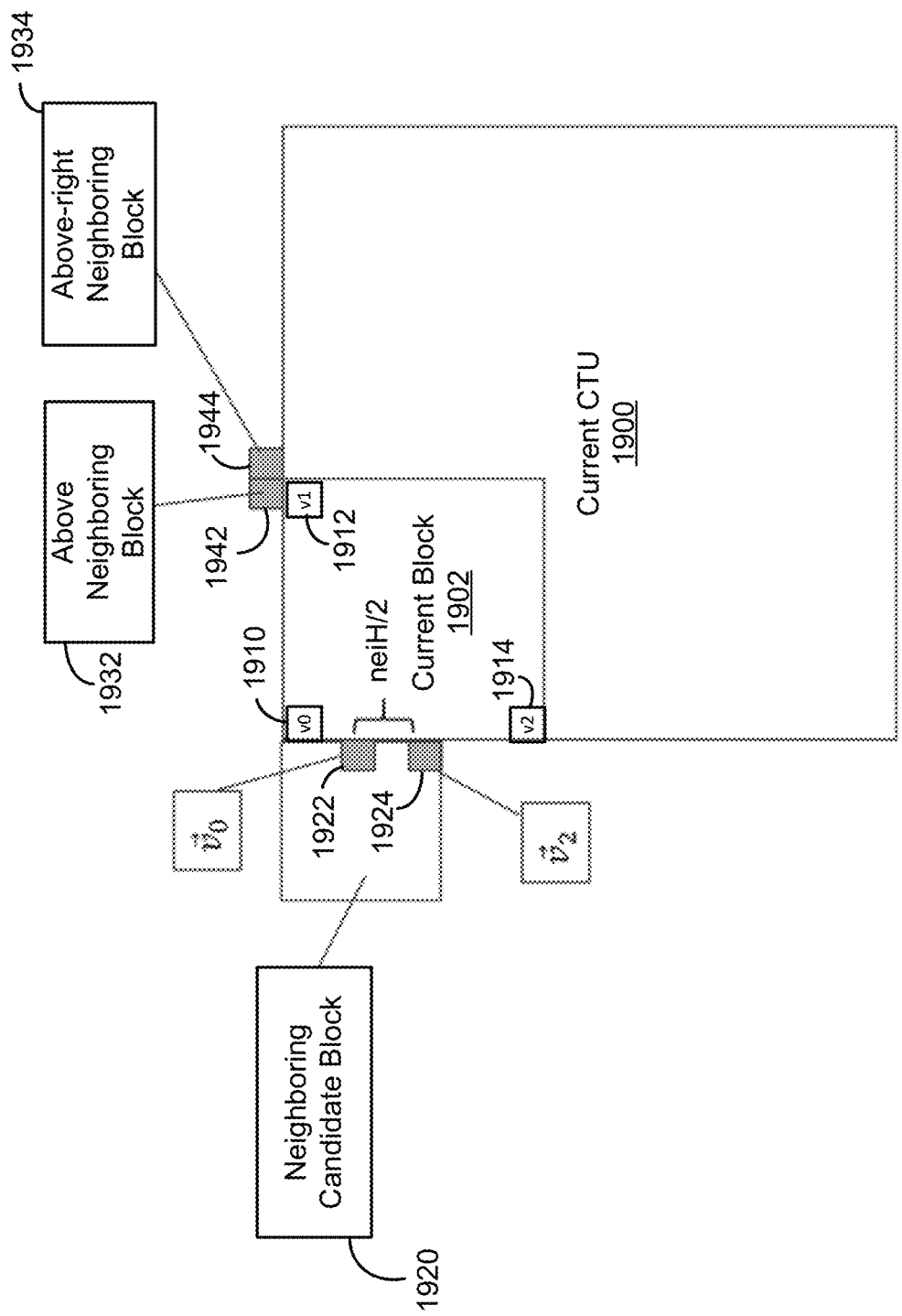
FIG. 19 is a diagram illustrating another example of a current block of a CTU, in accordance with some examples.

FIG. 19 is a diagram illustrating another example aspect of improved line buffer utilization in affine motion prediction. FIG. 19 is similar in many aspects to FIG. 17 and FIG. 18, and the following explanation will highlight the distinctive features of FIG. 19. In FIG. 19, a current CTU 1900 is shown to include a current block 1902. Affine motion prediction of the current block 1902 can be performed using affine motion vectors or CPMVs at control points 1910, 1912, and 1914. A neighboring block 1920 of the current block 1902 may be located outside the current CTU 1900, e.g., in a neighboring CTU to the left of the current CTU 1900.

In some examples, two MVs, $\vec{v}_0$ and $\vec{v}_2$, at the right boundary of the neighboring block 1920 are obtained for inherited affine MVP of the current block 1902. In some examples, the MV $\vec{v}_0$ can be at control point 1922 located at the middle of the right boundary of the neighboring block 1920 (i.e. at the location neiH/2, and the MV $\vec{v}_2$ can be at control point 1924 located at the bottom right corner of the neighboring block 1920. In such examples, the MV $\vec{v}_2$ can be derived from an additional neighboring block. For example, the MV $\vec{v}_2$ can include the motion vector 1942 of the above neighboring block 1932 located to the top of the control point 1914 of the current block 1902 or the motion vector 1944 of the above right neighboring block 1934 located to the top and right of the control point 1914 of the current block 1902, similar to the examples discussed with reference to FIG. 17 and FIG. 18.

In some implementations, an inherited affine MVP can be from an above left CTU. In a first illustrative example, if the neighboring candidate block is located to the left of the current CTU row (i.e. neiCtuX<curCtuX && neiCtuY<curCtuY), the inherited affine MVP is considered as unavailable.

In another illustrative example, if the neighboring candidate block is located to the left of the current CTU row (i.e. neiCtuX<curCtuX && neiCtuY<curCtuY), the inherited affine MVP can be derived by deriving the inherited affine MVP from the above CTU using a similar technique as that described above with reference to FIG. 14, FIG. 15, and FIG. 16. However, deviating from these techniques, the MV $\vec{v}_0$ of the neighboring candidate block is not stored in the line buffer but is stored in an additional buffer.

In another illustrative example, if the neighboring candidate block is located to the left of current CTU row (i.e. neiCtuX<curCtuX && neiCtuY<curCtuY), the inherited affine MVP can be derived by deriving the inherited affine MVP from the left CTU using a similar technique as that described above with reference to FIG. 16, FIG. 17, and FIG. 18. However, deviating from these techniques, the MVs $\vec{v}_0$, $\vec{v}_1$, and/or $\vec{v}_2$ of the neighboring candidate block may not be stored in the line buffer and may need to be stored in an additional buffer.

In some implementations of any one or more of the above-described techniques, the inherited affine MVP may be from the left, the above left, or the above CTU, and different combinations of the methods described above can be applied. For example, the techniques for the left CTU derivation described above with reference to FIG. 16, FIG. 17, and FIG. 18 can be used together with the method for the above CTU derivation described above with reference to FIG. 14, FIG. 15, and FIG. 16. In another example, any method for the above-left CTU derivation can be used together with the method for the above CTU derivation and the method for the left CTU derivation.

In some implementations, the division described above can be replaced with a right shifting operation if the denominator is a power of two. If the denominator is not a power of 2, the division can be replaced by scaling and right shifting. For example, y divided by x can be approximated as (y*LUT[x])>>LUT_PRECISION, wherein LUT[x]=(1<<LUT_PRECISION)/x, and LUT_PRECISION is a predefined precision for the approximation.

In some cases, the right shifting operation can be performed in the final stage of calculating the CPMV. For example:

$$\vec{v}'_0 = \vec{v}_0 + (x0' - x0) * \frac{\vec{v}_1 - \vec{v}_0}{x1 - x0} + (y0' - y0) * \frac{\vec{v}_2 - \vec{v}_1}{y2 - y1}$$

can be replaced by:

$\vec{v}'_0 = ((\vec{v}_0 <<\text{LUT\_PRECISION}) + (x0'-x0)*$
   $(\vec{v}_1 - \vec{v}_0)*\text{LUT}[x1-x0] + (y0'-y0)*$
   $(\vec{v}_2 - \vec{v}_1)*\text{LUT}[y2-y1]) >>\text{LUT\_PRECISION}$ In some cases, a rounding process can be applied and the division operation can be replaced by the following:

$(v'_{0x}, v'_{0y}) = (\vec{v}_0 <<\text{LUT}_{PRECISION}) + (x0'-x0)*$
   $(\vec{v}_1 - \vec{v}_0)*\text{LUT}[x1-x0] + (y0'-y0)*$
   $(\vec{v}_2 - \vec{v}_1)*\text{LUT}[y2-y1]$ $\vec{v}'_0 = (\text{round}(v'_{0x}), \text{round}(v'_{0y}))$, where round(x)=x>=0 ? (x+(1<<(LUT_PRECISION−1)))>>LUT_PRECISION: −((−x+(1<<(LUT_PRECISION−1)))>>LUT_PRECISION).

In some implementations, an inherited affine motion vector predictor (MVP) for a block of a coding unit (e.g., a CTU) can be determined based on one or more size constraints. For example, obtaining control point motion vectors (CPMVs) from a neighboring block (e.g., in the same CTU) of a current block for inherited affine MVP of the current block can include an intermediate step of storing the CPMVs of the neighboring block in a local buffer. The CPMVs can include three MVs for each prediction direction when a 6-parameters affine motion model is used and two MVs for each prediction direction when a 4-parameters affine motion model is used. Storing the CPMVs in the local buffer can increase the memory usage for the local buffer. The techniques described herein for determining an inherited affine MVP with one or more size constraints can reduce the amount of local buffer storage that is required to store CPMVs.

In some examples, a minimum size threshold can be defined for neighboring blocks whose CPMVs are used for inherited affine MVP of the current block. CPMVs of neighboring blocks whose sizes are less than the minimum size threshold can be excluded from being used for inherited affine MVP of the current block. By excluding the CPMVs of neighboring blocks whose sizes are less than the minimum size threshold from being used for inherited affine MVP of the current block, the CPMVs of neighboring blocks whose sizes are less than the minimum size threshold need not be stored in the local buffers. Thus, prior to storing CPMVs of neighboring blocks, example techniques described herein may include a comparison of the size of the neighboring blocks with the minimum size threshold. The minimum size threshold used in this comparison is different from a minimum block size that is required for a block to coded using an affine motion model. For example, a minimum block size can be defined, which requires any block to be greater than (or equal to in some cases) the minimum block size in order for the block to be coded using an affine motion model. The minimum size threshold (denoted as minSize as noted below) described herein is defined for neighboring blocks and used to determine whether CPMVs of the neighboring blocks can be used for inheriting affine MVPs for a current block.

Figure 20:
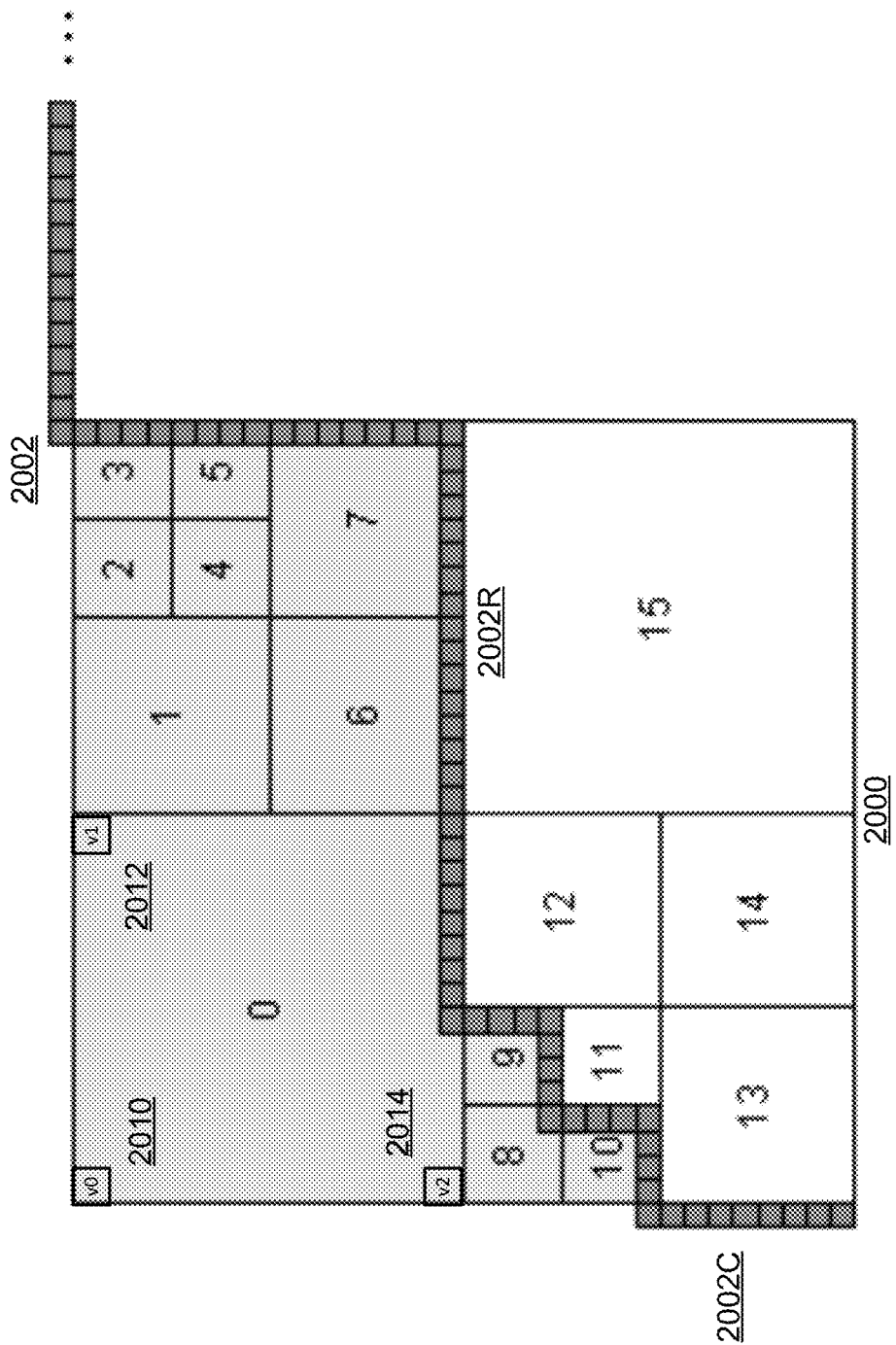
FIG. 20 is a diagram illustrating an example of a CTU, in accordance with some examples.

FIG. 20 is a diagram illustrating blocks of a CTU 2000. In CTU 2000, blocks of various sizes are shown, identified with numbers ranging from 0 to 15. The numbers indicate the coding order. Blocks 0 to 10 are already or previously coded blocks, and the blocks 11 to 15 are blocks which are to be coded. Thus, the blocks 0 to 10 can serve as neighboring blocks for the blocks 11 to 15. For example, CPMVs of the blocks 0 to 10 can be used for inherited affine MVP of corresponding blocks 11 to 15. In some examples, the CPMVs of the blocks 0 to 10 whose sizes are greater than or equal to the minimum size threshold can be stored in a local buffer 2002 for their use in inherited affine MVP of the blocks 11 to 15. In some examples, the CPMVs of the blocks 0 to 10 whose sizes are less than the minimum size threshold can be excluded or prevented from being stored in the local buffer 2002.

The following terminology is used to describe example aspects of reducing the memory usage of local buffers such as the local buffer 2002 for storing the CPMVs of the blocks 0 to 10. As used herein, (neiW, neiH) specifies the width (neiW) and height (neiH) of a neighboring block (e.g., one of the blocks 0 to 10 in a same CTU 2000) of a current block (e.g., one of the blocks 11 to 15). A minSize is the minimum size threshold noted above, which can be used as a restriction to exclude affine motion information from certain neighboring blocks from being used when deriving affine motion information for a current block. The minSize can be a predefined value that is larger than the minimum size for a block coded using an affine motion model. If neiW<minSize or neiH<minSize for a neighboring block, the CPMVs from the neighboring block can be excluded from being used for deriving an inherited affine MVP.

In some cases, the minimum size threshold (minSize) used for comparison to the width (neiW) is the same size as the minimum size threshold (minSize) used for comparison to the height (neiH). A common minSize can be used for both the width and height comparison when the block size is of the form N×N (e.g., 4×4, 8×8, 16×16, 32×32, 64×64, or the like, where the width and height of the block are same). In some cases, a minimum size threshold used for comparison to the width (neiW) can be different than a minimum size threshold used for comparison to the height (neiH). In some examples, the minimum size threshold (e.g., minSize) can be set to a value of 8, 16, 32, 64, or any other suitable value. In some examples, the minimum size threshold (e.g., minSize) can be a fixed value that is agreed to by the encoder and the decoder (e.g., during negotiation between the encoder and decoder). In some examples, the minimum size threshold (e.g., minSize) can be a variable that is signaled in a high level syntax (e.g., in a sequence parameter set, a video parameter set, a slice header, a Supplemental Enhancement Information (SEI) message, any suitable combination thereof, or in another syntax). In some cases, when signaling the minimum size threshold (e.g., minSize), the log 2(minSize) is signaled instead of minSize to reduce the number of bits required for signaling. In some cases, the minimum size threshold (e.g., minSize), can be signaled as log 2(minSize)−3, where in some instances the minimum possible value for minSize is 8.

In one illustrative example, CPMVs are stored in a first buffer, and normal MVs are stored in a second buffer. In some cases, the normal MVs are stored in a 4×4 block basis, since the minimum coding block size is typically 4×4. However, using the minimum size threshold based techniques described above, the CPMVs can be stored in blocks of size minSize x minSize since a block with width or height less than minSize is not used for inherited affine MVP derivation. In some cases, the CPMVs can be stored in a row buffer and a column buffer instead of storing the CPMVs of all coded blocks of the CTU 2000 in a single local buffer 2002. In such cases, the storage for the row buffer and/or the column buffer can be on a minSize basis (e.g., neighboring blocks with width or height less than minSize are not used for inherited affine MVP derivation).

In some examples, as noted above, the minSize can have different values for width and height, denoted as a minimum width threshold (minSizeW) and a minimum height threshold (minSizeH). In such cases, the CPMVs are stored based on the lower value of minSizeW and minSizeH. For example, if either neiW<minSizeW or neiH<minSizeH for a block, CPMVs of the block are excluded from being stored.

In some examples, the CPMVs of the neighboring blocks can be stored in the same buffer as normal MVs. In such examples, one or more row buffers and one or more column buffers can be used for storing MVs of blocks of the CTU 2000. In some examples, the local buffer 2000 can include one or more row buffers and one or more column buffers. In FIG. 20, the horizontal parts of the local buffer 2002 can include row buffers such as a row buffer 2002R and the vertical parts of the local buffer 2002 can include column buffers such as a column buffer 2002C.

In some cases, a first portion of the CPMVs of a block can be stored in a first set of row buffers and column buffers and a second portion of the CPMVs of the block can be stored in a second set of row buffers and column buffers. For example, block 0 is identified with a top left CPMV $v_0$ at a control point 2010, a top right CPMV $v_1$ at a control point 2012, and a bottom left CPMV $v_2$ at a control point 2014. In some examples, the top right CPMV $v_1$ and the bottom left CPMV $v_2$ of block 0 used as a neighboring block can be stored in the same row buffer and column buffer as the normal MVs, while the top left CPMV $v_0$ may be stored in a separate row buffer and column buffer. In some examples, storing the CPMVs of the block 0 can be based on the minimum size threshold criteria described above. For example, the CPMVs of the block 0 can be stored in the separate row buffer and column buffers as mentioned above if the size of the block 0 is greater than or equal to the minimum size threshold.

As described above, the one or more row buffers and one or more column buffers can be used for storing MVs of blocks of the CTU 2000 in some implementations. In some cases, when deriving an MV or inherited affine MVP from a neighboring block (e.g., the coded blocks 0 to 10), the neighboring block is a block which is an immediate neighbor of the current block (e.g., corresponding one or more of the blocks 11 to 15 to be coded). If the neighboring block is an immediate neighbor of the current block, it may not be necessary to store all the MVs of the coded blocks. For example, the blocks 0 to 10 are identified in their coding order. In some examples, only the MVs of the blocks 0 to 10 can be stored in the local buffer 2002 (which can be of size 4×4). After a block is coded, the MVs in the corresponding position in the one or more row buffers and the one or more column buffers can be updated with the MVs of the coded block.

In some implementations, an inherited affine motion vector predictor (MVP) can be determined based on one or more coding mode constraints. For example, the affine motion parameters of a block that is coded in affine merge mode can be derived by motion information from neighboring coded blocks. In some cases, the affine motion parameter of the block may not be accurate. In one illustrative example, a coding mode constraint can be used where it is not possible to derive the inherited affine MVP for a current block from a neighboring block if the neighboring block is coded by an affine merge mode.

In some cases, a coding mode constraint can be used where, if a neighboring block is coded by an affine merge mode, the inherited affine MVP derived from the block is inserted into the candidate list in a lower priority as compared to other motion vectors. In one illustrative example, the inherited affine MVP can be inserted after other inherited affine MVPs. In another illustrative example, the inherited affine MVP can be inserted after the other inherited affine MVPs and the constructed affine MVP.

In some implementations, a combined inherited affine MVP can be used. For example, the CPMVs of different inherited affine MVPs can be combined to generate new affine MVPs. In some cases, an inherited affine MVP can be derived from block A0, A1, B0, B1, B2, B3, or A2 (e.g., as discussed with reference to FIG. 12). In the following description, the block indicator (e.g., A0, A1, B0, etc.) will be used to denote the inherited affine MVP from that block or the block interchangeably.

Referring to FIG. 12, in one illustrative example, $\vec{v}_0$ is from the top-left CPMV of B2, B3 or A2, $\vec{v}_1$ is from the top-right CPMV of B0 or B1, and $\vec{v}_2$ is from bottom-left CPMV of A0 or A1.

In some examples, if one or two of the $\vec{v}_i$ ($\vec{v}_0$, $\vec{v}_1$, and/or $\vec{v}_2$) are not available, the one or more non-available $\vec{v}_i$ are replaced by a normal MVP. For example, if $\vec{v}_0$ is not available, it is replaced by the normal MV from B2, B3 or A2. In another example, if $\vec{v}_1$ is not available, it is replaced by the normal MV from B0 or B1. In another example, if $\vec{v}_2$ is not available, it is replaced by the normal MV from A0 or A1.

In some examples, if only the 4-parameters affine motion model is available or enabled, the combined inherited affine MVP can include 2 CPMVs. In one example, the two CPMVs are $\vec{v}_0$ and $\vec{v}_1$, where $\vec{v}_0$ is from the top-left CPMV of B2, B3 or A2, $\vec{v}_1$ is from the top-right CPMV of B0 or B1. In another example, the two CPMVs are $\vec{v}_0$ and $\vec{v}_2$, where $\vec{v}_0$ is from the top-left CPMV of B2, B3 or A2, $\vec{v}_2$ is from the top-right CPMV of A0 or A1.

In some examples, $\vec{v}_i$ can be derived by first checking the first available immediate neighboring block that is not coded by affine mode, and if not found, $\vec{v}_i$ can be derived by the first available MV from a block from an immediate neighboring block either coded by affine or normal translational motion. For example, $\vec{v}_0$ can be derived from the first available block from B2, B3 and A2 that is not coded by affine, and then if $\vec{v}_0$ is not found from that block, $\vec{v}_0$ can derived as the first available MV from block from B2, B3 and A2 (either coded by affine or normal inter coded). In another example, $\vec{v}_1$ can be derived from the first available block from B0 and B1 that is not coded by affine, and then if $\vec{v}_1$ is not found, $\vec{v}_1$ can be derived as the first available MV from block from B0 and B1 (either coded by affine or normal inter coded). In another example, $\vec{v}_2$ can be derived from the first available block from A0 and A1 that is not coded by affine, and then if $\vec{v}_2$ is not found, $\vec{v}_2$ can be derived as the first available MV from block from A0 and A1 (either coded by affine or normal inter coded).

In some examples, the combined inherited affine MVP can be inserted into the candidate list after the inherited affine MVP is derived. In such examples, the CPMVs of inherited affine MVP are already available when deriving the combined inherited affine MVP.

In some examples, combinations and extensions of the above described methods are possible for affine motion inheritance. For example, as described above, when deriving inherited affine MVP from a neighboring coded block in the current CTU, the inherited affine motion vector predictor (MVP) method described above is applied, where the CPMVs of the neighboring coded block are used for the derivation of the predicted CPMVs of current block. As another example, as described above, when deriving an inherited affine MVP from a neighboring coded block in the above CTU of the current CTU, the MVs that are stored in the MV buffer are used for the derivation, and the method described above for inheriting an affine MVP from an above CTU may be applied. In such an example, the CPMVs of an affine coded block can only be stored in a local buffer when coding current CTU. The line buffer may only store the sub-block MVs that are used for motion compensation as in High Efficiency Video Coding, where the stored MVs are used for MV prediction when coding the following CTU. Therefore, the line buffer does not need to store the additional CPMVs that are required by the affine motion inheritance. The size constraint described above for the inherited affine MVP with size constraint process may also be applied, such that the number of CPMVs is reduced and therefore the local buffer size can be reduced.

In the following description of the combinations and/or extensions of the above-described methods, neiPU specifies a neighboring coded block, (xNb, yNb) specifies the coordinate of the top-left pixel of neiPU, and (nNbW, nNbH) specifies the width and height of the neiPU. Further, the current block is denoted as curPU, (xCb, yCb) specifies the coordinate of the top-left pixel of the current block, and (nCbW, nCbH) specifies the width and height of the current block. MvLX[x][y] specifies the MV of the sub-block at location (x,y), where MvLX[x][y][0] is the x component of the MV and MvLX[x][y][1] is the y component of the MV. cpMvLX[x][y] specifies the control point motion vector (CPMV) at location (x,y), where cpMvLX[x][y][0] is the x component of the MV and cpMvLX[x][y][1] is the y component of the CPMV. (CtuW, CtuH) specifies the width and height of a CTU. MotionModelIdc[x][y] specifies the motion model of the block at location (x,y), where MotionModelIdc[x][y] equal to 0 indicates translational motion model (i.e., affine motion is not used), MotionModelIdc[x][y] equal to 1 indicates a 4-parameters affine motion model, and MotionModelIdc[x][y] equal to 2 indicates a 6-parameters affine motion model. The variable numCpMv specifies the number of CPMVs required for the current block. If the current block uses a 6-parameters affine motion model, numCpMv equals to 3, otherwise if the current block uses a 4-parameter affine motion model, numCpMv equals to 2.

In the examples below, the neiPU is affine coded. If the size constraint described above is applied, then the neiPU satisfies the size constraint.

In some examples, the affine MVP can be inherited from the current CTU. In such examples, if neiPU is located in the current CTU (i.e., xNb/CtuW is equal to xCb/CtuW and yNb/CtuH is equal to yCb/CtuH), the inherited affine MVP is derived as described in the following:

The variables mvScaleHor and mvScaleHor are derived as follows:

mvScaleHor=cpMvLX[xNb][yNb][0]

mvScaleVer=cpMvLX[xNb][yNb][1]

The variables dHorX and dVerX are derived as follows:

dHorX=(cpMvLX[xNb+nNbW−1][yNb][0]−cpMvLX[xNb][yNb][0])/nNbW dVerX=(cpMvLX[xNb+nNbW−1][yNb][1]−cpMvLX[xNb][yNb][1])/nNbW

The variables dHorY and dVerY are derived as follows:
If MotionModelIdc[xNb][yNb] is equal to 2, the following applies:

dHorY=(cpMvLX[xNb][yNb+nNbH−1][0]−cpMvLX[xNb][yNb][0])/nNbH dVerY=(cpMvLX[xNb][yNb+nNbH−1][1]−cpMvLX[xNb][yNb][1])/nNbH

Otherwise (MotionModelIdc[xNb][yNb] is equal to 1), the following applies:

dHorY=−dVerX dVerY=dHorX

The CPMVs of the inherited affine motion MVP inheritMvLX[cpIdx] with cpIdx=0 ... numCpMv−1 are derived as follows:
The first two control point motion vectors inheritMvLX[0] and inheritMvLX[1] are derived as follows:

inheritMvLX[0][0]=mvScaleHor+dHorX*(xCb−xNb)+dHorY*(y Cb−yNb)

inheritMvLX[0][1]=mvScaleVer+dVerX*(xCb−xNb)+dVerY*(yCb−yNb)

inheritMvLX[1][0]=mvScaleHor+dHorX*(xCb+nCbW−xNb)+dHorY*(yCb−yNb)

inheritMvLX[1][1]=mvScaleVer+dVerX*(xCb+nCbW−xNb)+dVerY*(yCb−yNb)

If numCpMv is equal to 3, the third control point vector inheritMvLX[2] is derived as follows:

inheritMvLX[2][0]=mvScaleHor+dHorX*(xCb−xNb)+dHorY*(yCb+nCbH−yNb)

inheritMvLX[2][1]=mvScaleVer+dVerX*(xCb−xNb)+dVerY*(yCb+nCbH−yNb)

In some implementations, scaling may be applied to avoid the division operations. In such implementations, if the neiPU is located in the current CTU, the inherited affine MVP is derived as described in the following, where N is a predefined precision (e.g., and can have a value of 7 or other integer number):

The variables log 2NbW and log 2NbH are derived as follows:

log 2NbW=Log 2(nNbW)

log 2NbH=Log 2(nNbH)

The variables mvScaleHor and mvScaleHor are derived as follows:

mvScaleHor=cpMvLX[xNb][yNb][0]<<N mvScaleVer=cpMvLX[xNb][yNb][1]<<N

The variables dHorX and dVerX are derived as follows:

dHorX=((cpMvLX[xNb+nNbW−1][yNb][0]−cpMvLX[xNb][yNb][0]))<<(N−log 2NbW)

dVerX=((cpMvLX[xNb+nNbW−1][yNb][1]−cpMvLX[xNb][yNb][1]))<<(N−log 2NbW)

The variables dHorY and dVerY are derived as follows:
If MotionModelIdc[xNb][yNb] is equal to 2, the following applies:

dHorY=((cpMvLX[xNb][yNb+nNbH−1][0]−cpMvLX[xNb][yNb][0]))<<(N−log 2NbH)

dVerY=((cpMvLX[xNb][yNb+nNbH−1][1]−cpMvLX[xNb][yNb][1]))<<(N−log 2NbH)

Otherwise (MotionModelIdc[xNb][yNb] is equal to 1), the following applies:

dHorY=−dVerX dVerY=dHorX

The CPMVs of the inherited affine motion MVP inheritMvLX[cpIdx] with cpIdx=0 ... numCpMv−1 are derived as follows:
The first two control point motion vectors inheritMvLX[0] and inheritMvLX[1] are derived as follows:

inheritMvLX[0][0]=mvScaleHor+dHorX*(xCb−xNb)+dHorY*(yCb−yNb)

inheritMvLX[0][1]=mvScaleVer+dVerX*(xCb−xNb)+dVerY*(yCb−yNb)

inheritMvLX[1][0]=mvScaleHor+dHorX*(xCb+nCbW−xNb)+dHorY*(yCb−yNb)

inheritMvLX[1][1]=mvScaleVer+dVerX*(xCb+nCbW−xNb)+dVerY*(yCb−yNb)

If numCpMv is equal to 3, the third control point vector inheritMvLX[2] is derived as follows:

inheritMvLX[2][0]=mvScaleHor+dHorX*(xCb−xNb)+dHorY*(yCb+nCbH−yNb)

inheritMvLX[2][1]=mvScaleVer+dVerX*(xCb−xNb)+dVerY*(yCb+nCbH−yNb)

The rounding process described below can be applied to inheritMvLX[cpIdx] with cpIdx=0 numCpMv−1, with rightShift set equal to N, and leftShift set equal to 0.

The rounding process will now be described. For the rounding of mvX, the following applies:

offset=1<<(rightShift−1)

mvX[0]=(mvX[0]>=0?(mvX[0]+offset)>>rightShift: −((−mvX[0]+offset)>>rightShift))<<leftShift mvX[1]=(mvX[1]>=0?(mvX[1]+offset)>>rightShift: −((−mvX[1]+offset)>>rightShift))<<leftShift In some examples, the affine MVP can be inherited from the above CTU. In such examples, if neiPU is located in the above CTU (i.e., yNb/CtuH is less than yCb/CtuH), the inherited affine MVP is derived as described in the following (note that the term MvLX is used instead of cpMvLX, and the scaling process is applied; if the scaling is not applied, the following methods can be modified accordingly):

Method 1—

In this method, if the affine motion model of the neiPU is a 6-parameters affine motion model, it can be treated as if the affine motion model is 4-parameters.

The variables yNbB and xNbR are derived as follows:

yNbB=yNb+nNbH−1 xNbR=xNb+nNbW−1

The variables mvScaleHor and mvScaleHor are derived as follows:

mvScaleHor=MvLX[xNb][yNbB][0]<<N mvScaleVer=MvLX[xNb][yNbB][1]<<N

The variables dHorX and dVerX are derived as follows:

dHorX=((MvLX[xNbR][yNbB][0]−MvLX[xNb][yNbB][0]))<<(N−log 2NbW)

dVerX=((MvLX[xNbR][yNbB][1]−MvLX[xNb][yNbB][1]))<<(N−log 2NbW)

The variables dHorY and dVerY are derived as follows:

dHorY=−dVerX dVerY=dHorX

The CPMVs of the inherited affine motion MVP inheritMvLX[cpIdx] with cpIdx=0 numCpMv−1 are derived as follows:
The first two control point motion vectors inheritMvLX[0] and inheritMvLX[1] are derived as follows:

inheritMvLX[0][0]=mvScaleHor+dHorX*(xCb−xNb)

inheritMvLX[0][1]=mvScaleVer+dVerX*(xCb−xNb)

inheritMvLX[1][0]=mvScaleHor+dHorX*(xCb+nCbW−xNb)

inheritMvLX[1][1]=mvScaleVer+dVerX*(xCb+nCbW−xNb)

If numCpMv is equal to 3, the third control point vector inheritMvLX[2] is derived as follows:

inheritMvLX[2][0]=mvScaleHor+dHorX*(xCb−xNb)+dHorY*nCbH inheritMvLX[2][1]=mvScaleVer+dVerX*(xCb−xNb)+dVerY*nCbH The rounding process described above can be applied to inheritMvLX[cpIdx] with cpIdx=0 numCpMv−1, with rightShift set equal to N, and leftShift set equal to 0.

Method 2—

In this method, the derivation depends on whether the inter prediction direction of neiPU is bi-prediction. If the affine motion model of the neiPU is a 6-parameter affine motion model and the inter prediction direction is bi-prediction, it is treated as if the affine motion model is a 4-parameters model, and the top-left CPMV of neiPU is used in the derivation. If the affine motion model of the neiPU is a 6-parameters model and the inter prediction direction is not bi-prediction, then the top-left CPMV of neiPU is used in the derivation. Since the inter prediction direction is not bi-prediction in such cases, the sub-block MVs of only one direction needs to be stored in the line buffer, and the buffer for the other direction can be used to store the top-left CPMV.

The variable interDir[x][y] equal to 1 specifies the inter prediction direction at location (x,y) is "forward prediction" (i.e., using reference list 0), interDir[x][y] equal to 2 specifies the inter prediction direction at location (x,y) is "backward prediction" (i.e., using reference list 1), and interDir[x][y] equal to 3 specifies the inter prediction direction at location (x,y) is bi-prediction (i.e., both reference list 0 and 1 are used).

The variables yNbB and xNbR are derived as follows:

yNbB=yNb+nNbH−1 xNbR=xNb+nNbW−1

The variables mvScaleHor and mvScaleHor are derived as follows:

mvScaleHor=MvLX[xNb][yNbB][0]<<N mvScaleVer=MvLX[xNb][yNbB][1]<<N

The variables dHorX and dVerX are derived as follows:

dHorX=((MvLX[xNbR][yNbB][0]−MvLX[xNb][yNbB][0]))<<(N−log 2NbW)

dVerX=((MvLX[xNbR][yNbB][1]−MvLX[xNb][yNbB][1]))<<(N−log 2NbW)

The variables dHorY and dVerY are derived as follows:
If MotionModelIdc[xNb][yNb] is equal to 2 and interDir[xNb][yNb] is not equal to 3, the following applies:

dHorY=((cpMvLX[xNb][yNb+nNbH−1][0]−cpMvLX[xNb][yNb][0]))<<(N−log 2NbH)

dVerY=((cpMvLX[xNb][yNb+nNbH−1][1]−cpMvLX[xNb][yNb][1]))<<(N−log 2NbH)

Otherwise (MotionModelIdc[xNb][yNb] is equal to 1), the following applies:

dHorY=−dVerX dVerY=dHorX

The CPMVs of the inherited affine motion MVP inheritMvLX[cpIdx] with cpIdx=0 numCpMv−1 are derived as follows:
The first two control point motion vectors inheritMvLX[0] and inheritMvLX[1] are derived as follows:

inheritMvLX[0][0]=mvScaleHor+dHorX*(xCb−xNb)

inheritMvLX[0][1]=mvScaleVer+dVerX*(xCb−xNb)

inheritMvLX[1][0]=mvScaleHor+dHorX*(xCb+nCbW−xNb)

inheritMvLX[1][1]=mvScaleVer+dVerX*(xCb+nCbW−xNb)

If numCpMv is equal to 3, the third control point vector inheritMvLX[2] is derived as follows:

inheritMvLX[2][0]=mvScaleHor+dHorX*(xCb−xNb)+dHorY*nCbH inheritMvLX[2][1]=mvScaleVer+dVerX*(xCb−xNb)+dVerY*nCbH The rounding process described above can be applied to inheritMvLX[cpIdx] with cpIdx=0 numCpMv−1, with rightShift set equal to N, and leftShift set equal to 0.

Method 3—

In the above two methods 1 and 2, the distance between two MVs MvLX[xNbR][yNbB] and MvLX[xNb][yNbB] is actually not equal to the nNbW, but is nNbW−(SubBlkSize/2) (because the MV represents the motion at the center of the sub-block), where SubBlkSize is the size of the sub-block for affine motion compensation. The division by nNbW and therefore shifting by (N−log 2NbW) is an approximation.

In method 3, the MV at the bottom-middle position of neiPU is used for the derivation, so that the distance between two MVs can be exactly power of 2. And it can be assumed that derivation depends on whether the inter prediction direction of neiPU is bi-prediction. If the derivation does not depend on the inter prediction direction, the following process can be modified accordingly.

The variables yNbB, yNbM and xNbR are derived as follows:

yNbB=yNb+nNbH−1 yNbM=yNbB−(nNbH>>1)

xNbR=xNb+(nNbW>>1)

The variables mvScaleHor and mvScaleHor are derived as follows:

mvScaleHor=MvLX[xNb][yNbB][0]<<N mvScaleVer=MvLX[xNb][yNbB][1]<<N

The variables dHorX and dVerX are derived as follows:

dHorX=((MvLX[xNbR][yNbB][0]−MvLX[xNb][yNbB][0]))<<(N−log 2NbW+1)

dVerX=((MvLX[xNbR][yNbB][1]−MvLX[xNb][yNbB][1]))<<(N−log 2NbW+1)

The variables dHorY and dVerY are derived as follows:
If MotionModelIdc[xNb][yNb] is equal to 2 and interDir[xNb][yNb] is not equal to 3, the following applies:

dHorY=((cpMvLX[xNb][yNbM][0]−cpMvLX[xNb][yNbB][0]))<<(N−log 2NbH+1)

dVerY=((cpMvLX[xNb][yNbM][1]−cpMvLX[xNb][yNbB][1]))<<(N−log 2NbH+1)

Otherwise (MotionModelIdc[xNb][yNb] is equal to 1), the following applies:

dHorY=−dVerX dVerY=dHorX

The CPMVs of the inherited affine motion MVP inheritMvLX[cpIdx] with cpIdx=0 . . . numCpMv−1 are derived as follows:
The first two control point motion vectors inheritMvLX[0] and inheritMvLX[1] are derived as follows:

inheritMvLX[0][0]=mvScaleHor+dHorX*(xCb−xNb)

inheritMvLX[0][1]=mvScaleVer+dVerX*(xCb−xNb)

inheritMvLX[1][0]=mvScaleHor+dHorX*(xCb+nCbW−xNb)

inheritMvLX[1][1]=mvScaleVer+dVerX*(xCb+nCbW−xNb)

If numCpMv is equal to 3, the third control point vector inheritMvLX[2] is derived as follows:

inheritMvLX[2][0]=mvScaleHor+dHorX*(xCb−xNb)+dHorY*nCbH inheritMvLX[2][1]=mvScaleVer+dVerX*(xCb−xNb)+dVerY*nCbH The rounding process described above can be applied to inheritMvLX[cpIdx] with cpIdx=0 numCpMv−1, with rightShift set equal to N, and leftShift set equal to 0.

The above process uses the MV at the bottom-middle position of neiPU and the MV at the bottom-left position of neiPU. If the MV at the bottom-right position of neiPU is used instead of bottom-left, the process can be modified accordingly.

In some examples, the method described above for inheriting an affine MVP from an above CTU can be applied to the above-described method 1, method 2, and method 3. In such examples, the derivation of CPMVs of the inherited affine motion MVP inheritMvLX[cpIdx] with cpIdx=0 numCpMv−1 are modified as follows (and in some cases the other process remain the same):

The variables yNbB, yNbM and xNbR are derived as follows:
The first two control point motion vectors inheritMvLX[0] and inheritMvLX[1] are derived as follows:

inheritMvLX[0][0]=mvScaleHor+dHorX*(xCb−xNb)

inheritMvLX[0][1]=mvScaleVer+dVerX*(xCb−xNb)

inheritMvLX[1][0]=mvScaleHor+dHorX*(xCb+nCbW−xNb)

inheritMvLX[1][1]=mvScaleVer+dVerX*(xCb+nCbW−xNb)

The rounding process described above can be applied to inheritMvLX[cpIdx] with cpIdx=0, 1, with rightShift set equal to N, and leftShift set equal to 0.

If numCpMv is equal to 3, the third control point vector inheritMvLX[2] is derived following ordered steps:
1. The sample locations (xNbA$_1$, yNbA$_1$) and (xNbA$_0$, yNbA$_0$) are set equal to (xCb−1, yCb+nCbH−1) and (xCb−1, yCb+nCbH), respectively.
2. The availability flag availableFlagLX is set equal to 0.
3. The following applies for (xNbBL, yNbBL) with BL being replaced by A$_1$ and A$_0$:
If availableFlagLX is equal to 0, the block at location (xNbBL, yNbBL) is available and MvLX[xNbBL][yNbBL] is available and has the same reference picture as current, the following applies:

inheritMvLX[2][0]=MvLX[xNbBL][yNbBL][0]

inheritMvLX[2][1]=MvLX[xNbBL][yNbBL][1]

availableFlagLX=1

4. If availableFlagLX is equal to 0, the following applies:

inheritMvLX[2][0]=mvScaleHor+dHorX*(xCb−xNb)+dHorY*nCbH inheritMvLX[2][1]=mvScaleVer+dVerX*(xCb−xNb)+dVerY*nCbH The rounding process described above can be applied to inheritMvLX[2].

In some examples, an adaptive sub-block size can be defined for affine motion compensation. For example, to reduce the complexity, sub-block based motion compensation is performed for affine motion compensation. The current block can be divided into non-overlapping sub-blocks. For each sub-block, a motion vector (MV) is derived by the determined affine motion model, and then block based motion compensation (block matching) is performed using the derived MV.

In some cases, the size of sub-block is fixed. However, a small sub-block size (e.g., 4×4) may significantly increase the memory bandwidth if the difference between MVs of two adjacent sub-blocks is large. On the other hand, a large sub-block size can degrade the accuracy of motion compensation prediction. To solve this dilemma, methods of providing an adaptive sub-block size that can be applied are described herein.

In one illustrative example, if the inter prediction direction is not bi-prediction, the sub-block size is 4×4, otherwise the sub-block size depends on the difference between CPMVs. cpMvLx[cpIdx] with cpIdx=0 . . . 2 represent the CPMVs of an affine coded block. The variables iDMvHorX, iDMvHorY, iDMvVerX and iDMvVerY are derived as follows:

iDMvHorX=cpMvLx[1][0]−cpMvLx[0][0]

iDMvHorY=cpMvLx[1][1]−cpMvLx[0][1]

If the affine motion model is 6-parameter the follow applies:

iDMvVerX=cpMvLx[2][0]−cpMvLx[0][0]

iDMvVerY=cpMvLx[1][1]−cpMvLx[0][1]

Otherwise:

iDMvVerX=−iDMvHorY iDMvVerY=iDMvHorX

The variables iMaxDMvHor and iMaxDMvVer are derived as follows:

iMaxDMvHor=iDMvHorX>=iDMvHorY?iDMvHorX:iDMvHorY iMaxDMvVer=iDMvVerX>=iDMvVerY?iDMvVerX:iDMvVerY

In one illustrative example, if iMaxDMvHor is larger than or equal to iMaxDMvVer, then the sub-block size is 8×4, otherwise 4×8.

In another illustrative example, if iMaxDMvHor is larger than iMaxDMvVer, then the sub-block size is 8×4, otherwise 4×8.

In another illustrative example, if a specified constraint is satisfied, the sub-block size is 4×4, otherwise the sub-block size depends on the difference between CPMVs as in the above examples. For example, in some embodiments, the specified constraints may be constraints on blocks such as described in Appendix A.

FIG. 21 is a flowchart illustrating an example of a process 2100 for processing video data using the techniques described herein. At block 2102, the process 2100 includes obtaining video data for a current block of a current coding unit. For example, the video data can include at least a current picture and a reference picture. The current picture includes a picture currently being encoded (or decoded in an inverse loop of the encoder). In some examples, the current block can include the current block 1402 of FIG. 14 (or any of the current blocks 1502-1902 of FIG. 15-FIG. 19) and the current coding unit can include the coding tree unit (CTU) 1400 of FIG. 14 (or any of the CTUs 1500-1900 of FIG. 15-FIG. 19).

At block 2104, the process 2100 includes determining that a neighboring block of the current block is located outside the current coding unit. For example, determining that a neighboring block of the current block is located outside the current coding unit in FIG. 14-FIG. 16, includes determining that the respective neighboring blocks 1420-1620 are located above the CTUs 1400-1600. In FIG. 17-FIG. 19, determining that a neighboring block of the current block is located outside the current coding unit includes determining that the respective neighboring blocks 1720-1920 are located to the left of the CTUs 1700-1900.

At block 2106, the process 2100 includes obtaining a first motion vector and a second motion vector associated with a boundary of the neighboring block. In some examples, the first motion vector and the second motion vector are obtained from a line buffer for storing motion vectors of coding blocks in the boundary. For example, in FIG. 14-FIG. 16, obtaining the first motion vector and the second motion vector from the boundary of the neighboring block includes obtaining the first motion vector and the second motion vector from the bottom boundary of the neighboring block and the neighboring block is located above a row of the current coding unit. In FIG. 17-FIG. 19, obtaining the first motion vector and the second motion vector from the boundary of the neighboring block includes obtaining the first motion vector and the second motion vector from the right boundary of the neighboring block and the neighboring block is located to the left of the current coding unit.

In more detail, referring to FIG. 14, obtaining the first motion vector and the second motion vector from the bottom boundary of the neighboring block for using as affine motion parameters of the current block includes obtaining the two MVs $\vec{v}_0$ and $\vec{v}_1$ from bottom left control point 1422 and bottom right control point 1424 located at the bottom boundary of the neighboring block 1420 for using as inherited affine MVP or CPMVs of the current block 1402. In FIG. 15, obtaining the first motion vector and the second motion vector from the bottom boundary of the neighboring block for using as affine motion parameters of the current block includes obtaining the MV $\vec{v}_0$ from the control point 1522 located at the bottom left corner and the MV $\vec{v}_1$ from the control point 1524 located at the bottom-middle of the bottom boundary of the neighboring block 1520 for using as inherited affine MVP or CPMVs of the current block 1502. In FIG. 16, obtaining the first motion vector and the second motion vector from the bottom boundary of the neighboring block for using as affine motion parameters of the current block includes obtaining the MV $\vec{v}_0$ from the control point 1622 located at the bottom-middle and the MV $\vec{v}_1$ from the control point 1624 located at the bottom right corner of the bottom boundary of the neighboring block 1620 for using as inherited affine MVP or CPMVs of the current block 1602.

Similarly, referring to FIG. 17, obtaining the first motion vector and the second motion vector from the right boundary of the neighboring block for using as affine motion parameters of the current block includes obtaining the two MVs $\vec{v}_0$ and $\vec{v}_2$ from top right control point 1722 and bottom right control point 1724 located at the right boundary of the neighboring block 1720 for using as inherited affine MVP or CPMVs of the current block 1702. With reference to FIG. 18, obtaining the first motion vector and the second motion vector from the right boundary of the neighboring block for using as affine motion parameters of the current block includes obtaining the MV $\vec{v}_0$ from the control point 1822 located at the top right corner and the MV $\vec{v}_2$ from the control point 1824 located at the middle of the right boundary of the neighboring block 1820 for using as inherited affine MVP or CPMVs of the current block 1802. With reference to FIG. 19, obtaining the first motion vector and the second motion vector from the right boundary of the neighboring block for using as affine motion parameters of the current block includes obtaining the MV $\vec{v}_0$ from the control point 1922 located at the middle of the right boundary and the MV $\vec{v}_1$ from the control point 1924 located at the bottom corner of the right boundary of the neighboring block 1920 for using as inherited affine MVP or CPMVs of the current block 1902.

At block 2108, the process 2100 includes determining whether a third motion vector from an additional neighboring block is available. For example, in FIG. 14-FIG. 16, determining whether the third motion vector from the additional neighboring block is available includes determining whether the third motion vector is available from a left neighboring block located to the left of a bottom left control point of the current block or a below left neighboring block located below and to the left of the bottom left control point of the current block. In FIG. 17-FIG. 19, determining whether the third motion vector from the additional neighboring block is available includes determining whether the third motion vector is available from a top neighboring block located to the top of a top right control point of the current block or from a top right neighboring block located above and to the right of the top right control point of the current block.

In more detail, in FIG. 14, the third motion vector can include the motion vector 1442 of the left neighboring block 1432 located to the left of the control point 1414 of the current block 1402 or the motion vector 1444 of the below left neighboring block 1434 located below and to the left of the control point 1414 of the current block 1402. In FIG. 15, the third motion vector can include the motion vector 1542 of the left neighboring block 1532 located to the left of the control point 1514 of the current block 1502 or the motion vector 1544 of the below left neighboring block 1534 located below and to the left of the control point 1514 of the current block 1502. In FIG. 16, the third motion vector can include the motion vector 1642 of the left neighboring block 1632 located to the left of the control point 1614 of the current block 1602 or the motion vector 1644 of the below left neighboring block 1634 located below and to the left of the control point 1614 of the current block 1602.

Similarly, in FIG. 17, the third motion vector obtained from the additional neighboring block can include the motion vector 1742 of the above neighboring block 1732 located to the top of the control point 1712 of the current block 1702 or the motion vector 1744 of the above right neighboring block 1734 located above and to the right of the control point 1712 of the current block 1702. In FIG. 18, the third motion vector obtained from the additional neighboring block can include the motion vector 1842 of the above neighboring block 1832 located to the top of the control point 1812 of the current block 1802 or the motion vector 1844 of the above right neighboring block 1834 located above and to the right of the control point 1812 of the current block 1802. In FIG. 19, the third motion vector obtained from the additional neighboring block can include the motion vector 1942 of the above neighboring block 1932 located to the top of the control point 1912 of the current block 1902 or the motion vector 1944 of the above right neighboring block 1834 located above and to the right of the control point 1912 of the current block 1902.

At block 2110, the process 2100 includes, based on a determination that the third motion vector from the additional neighboring block is available, determining a set of affine motion parameters for the current block using the first motion vector, the second motion vector, and the third motion vector. In some examples, referring to FIG. 14-FIG. 19, the additional neighboring block can be located outside the current CTU 1400-1900, respectively. In some examples, the additional neighboring block can be located inside the current CTU 1400-1900, respectively.

For example, in the case of FIG. 14-FIG. 16 the additional neighboring block, selected from the left neighboring block and the below left neighboring block, can be located outside the current CTU. In such cases, the third motion vector MV $\vec{v}_2$ from the additional neighboring block is already or previously stored in the line buffer. Accordingly, obtaining the MV $\vec{v}_2$ from the additional neighboring block for inheriting or deriving the CPMV of the current block can include obtaining the MV $\vec{v}_2$ previously stored in the line buffer. In some examples, the additional neighboring block can be located inside the current CTU. For example, the additional neighboring block can include a neighboring coded block located to the left or below left of the current block and within the current CTU. In such cases, the MV $\vec{v}_2$ from the additional neighboring block is already or previously stored in a motion vector (MV) buffer of the current CTU. Accordingly, obtaining the MV $\vec{v}_2$ from the additional neighboring block for inheriting or deriving the CPMV of the current block can include obtaining the MV $\vec{v}_2$ previously stored in the MV buffer.

In the case of FIG. 17-FIG. 19 the additional neighboring block, selected from the above neighboring block and the above right neighboring block, can be located outside the current CTU. In such cases, the MV $\vec{v}_1$ from the additional neighboring block is already or previously stored in the line buffer. Accordingly, obtaining the MV $\vec{v}_1$ from the additional neighboring block for inheriting or deriving the CPMV of the current block can include obtaining the MV $\vec{v}_1$ previously stored in the line buffer. In some examples, the additional neighboring block can be located inside the current CTU. For example, the additional neighboring block can include a neighboring coded block located to above or above and to the right of the current block and within the current CTU. In such cases, the MV $\vec{v}_1$ from the additional neighboring block is already or previously stored in a motion vector (MV) buffer of the current CTU. Accordingly, obtaining the MV $\vec{v}_1$ from the additional neighboring block for inheriting or deriving the CPMV of the current block can include obtaining the MV $\vec{v}_1$ previously stored in the MV buffer.

In some examples, the three MVs obtained from the neighboring block and the additional neighboring block as described above, can be used for determining the affine motion parameters or CPMVs of the current block. For example, the first motion vector, the second motion vector, and the third motion vector ($\vec{v}_0$, $\vec{v}_1$, and $\vec{v}_2$) can be used to inherit and/or derive the CPMVs for the affine motion model of the current block.

FIG. 22 is a flowchart illustrating an example of a process 2200 for processing video data using the techniques described herein. At block 2202, the process 2200 includes obtaining video data for a current block of a current coding unit. For example, the video data can include at least a current picture and a reference picture. The current picture includes a picture currently being encoded (or decoded in an inverse loop of the encoder). In some examples, the current block can include one of the blocks 11 to 15 to be coded and the current coding unit can include the coding tree unit (CTU) 2000 of FIG. 12.

At block 2204, the process 2200 includes determining that a size of a neighboring block of the current block in the current coding unit is greater than a minimum block size for affine motion prediction. For example, a minimum block size for affine motion prediction can be a 4×4 block as described with reference to FIG. 20. Accordingly, determining that the size of the neighboring block of the current block in the current coding unit is greater than the minimum block size for affine motion prediction can includes determining whether the size of the neighboring block selected from the coded blocks 0 to 10 is greater than the 4×4 block size.

At block 2206, the process 2200 includes determining whether the size of the neighboring block is less than a minimum size threshold for using an affine motion vector of the neighboring block as an affine motion vector of the current block, the minimum size threshold being different from the minimum block size. For example, the minimum size threshold can include a common minSize and for width and height, where determining whether the size of the neighboring block is less than a minimum size threshold can include determining whether the width (neiW) of a neighboring block (e.g., one of the blocks 0 to 10 in a same CTU 2000) or the height (neiH) of the neighboring block is less than the common minSize. In some examples, the minimum size threshold can include different values for width and height, denoted as a minimum width threshold (minSizeW) and a minimum height threshold (minSizeH). In such cases, determining whether the size of the neighboring block is less than a minimum size threshold can include determining whether the width (neiW) of the neighboring block is less than minSizeW or the height (neiH) of the neighboring block is less than minSizeH. Whether the minimum size threshold includes the common minSize or different minSizeW and minSizeH, the minimum size threshold is different from the minimum block size (e.g., 4×4) discussed above.

At block 2208, the process 2200 includes determining whether to use an affine motion vector of the neighboring block as an affine motion vector for the current block based on whether the size of the neighboring block is less than the minimum size threshold. For example, if the size of the neighboring block is determined to be less than the minimum size threshold, affine motion vectors of the neighboring block are excluded from being used as an affine motion vector of the current block, based on a restriction that affine motion vectors of neighboring blocks with sizes that are less than the minimum threshold are not used as affine motion vectors of the current block. For example, in the case of the common minSize, if neiW<minSize or neiH<minSize for the neighboring block, the CPMVs of the neighboring block are excluded from being used for deriving an inherited affine MVP of the current block. In the case of the minimum size threshold including different values for width and height if either neiW<minSizeW or neiH<minSizeH for a neighboring block, the CPMVs of the neighboring block are excluded from being used for deriving an inherited affine MVP of the current block.

In some examples, the processes 2100 and 2200 may be performed by a computing device or an apparatus, such as the encoding device 104, the decoding device 112, or any other computing device. In some cases, the computing device or apparatus may include one or more input devices, one or more output devices, one or more processors, one or more microprocessors, one or more microcomputers, and/or other component(s) that is/are configured to carry out the steps of processes 2100 and 2200. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of an output device), a network interface configured to communicate and/or receive data, one or more receivers, transmitters, and/or transceivers (as examples of input devices and/or output devices) configured to communicate the video data. In some examples, the network interface, transceiver, and/or transmitter may be configured to communicate Internet Protocol (IP) based data or other network data.

In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some examples, a camera or other capture device that captures the video data is separate from the computing device, in which case the computing device receives the captured video data.

Processes 2100 and 2200 are illustrated as logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 2100 and 2200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices includes video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 23:
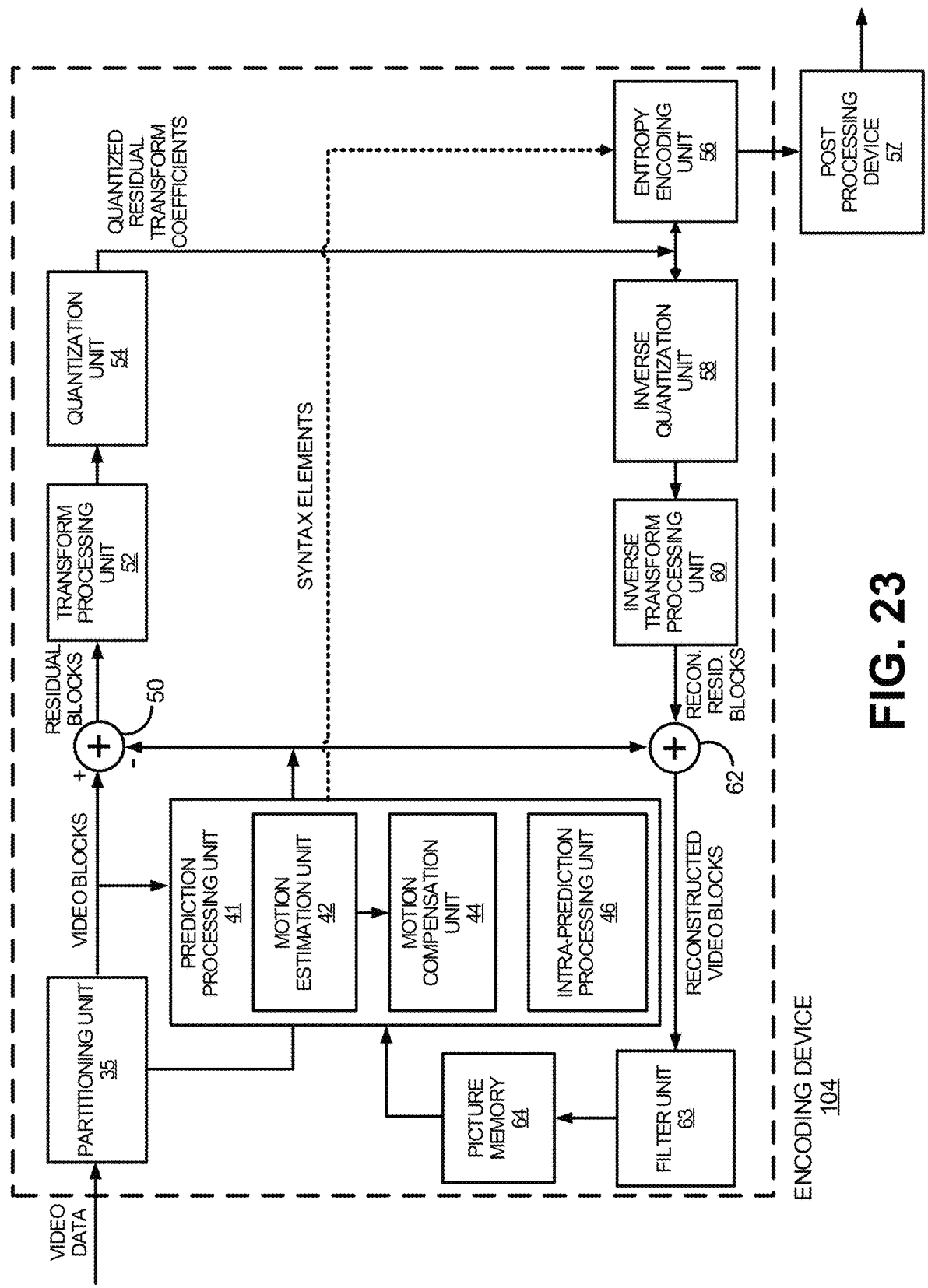
FIG. 23 is a block diagram illustrating an example encoding device, in accordance with some examples.
Figure 24:
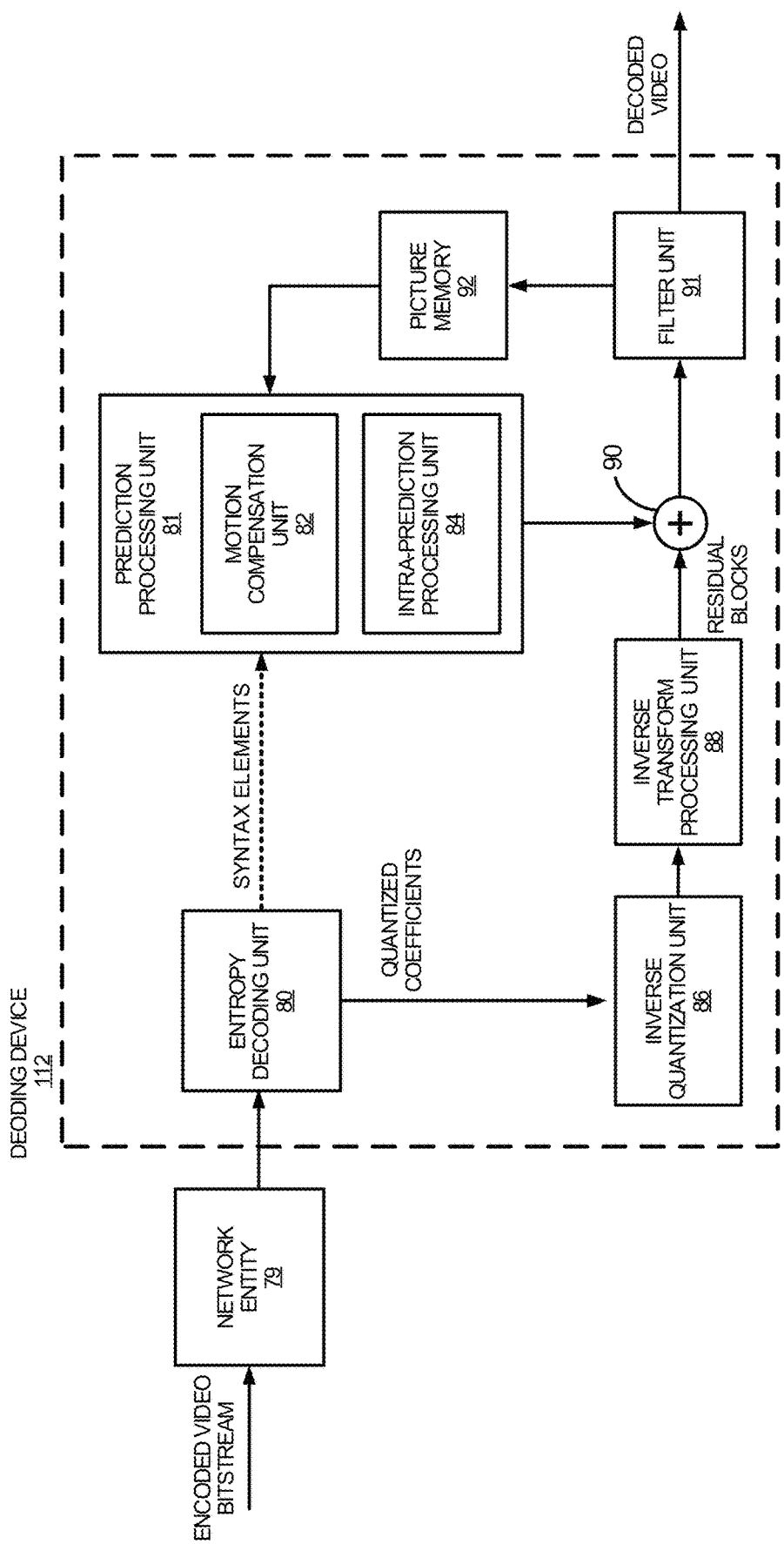
FIG. 24 is a block diagram illustrating an example video decoding device, in accordance with some examples.

Specific details of the encoding device 104 and the decoding device 112 are shown in FIG. 23 and FIG. 24, respectively. FIG. 23 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 23 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 23, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components.

Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

The encoding device 104 may perform any of the techniques described herein. Some techniques of this disclosure have generally been described with respect to the encoding device 104, but as mentioned above, some of the techniques of this disclosure may also be implemented by post processing device 57.

The encoding device 104 of FIG. 23 represents an example of a video decoder configured to perform the template matching based affine motion derivation described herein. The encoding device 104 may, for example, determine affine motion parameters, use the affine motion parameters to determine affine motion for one or more blocks of one or more pictures, and generate an encoded video bitstream with a syntax item (e.g., syntax element, syntax structure, variable, flag, or the like) indicating that the template matching based affine motion derivation mode is to be used for the one or more blocks. The encoding device 104 may perform any of the techniques described herein, including the processes described above with respect to FIG. 21 and FIG. 22.

FIG. 24 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 23.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 24 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

The decoding device 112 of FIG. 24 represents an example of a video decoder configured to perform the template matching based affine motion derivation described herein. The decoding device 112 may, for example, determine affine motion parameters and use the affine motion parameters to determine affine motion for one or more blocks of one or more pictures. The decoding device 112 may perform any of the techniques described herein, including the processes described above with respect to FIG. 21 and FIG. 22.

In the foregoing description, aspects of the application are described with reference to specific embodiments thereof, but those skilled in the art will recognize that the subject matter of this application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set of "one or more of" a set" indicates that one member of the set or multiple members of the set satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
    obtaining video data for a current block of a current coding unit;
    determining that a size of a neighboring block of the current block in the current coding unit is greater than a minimum block size for affine motion prediction, the minimum block size including a first minimum width and a first minimum height;
    determining the size of the neighboring block is less than a minimum size threshold for using one or more affine motion vectors of the neighboring block as one or more affine motion vectors for the current block, the minimum size threshold including a second minimum width and a second minimum height, wherein at least one of the second minimum width is larger than the first minimum width and the second minimum height is larger than the first minimum height;
    excluding, from a buffer, an affine motion vector of the neighboring block when the size of the neighboring block is less than the minimum size threshold, the buffer including at least one candidate affine motion vector for affine motion prediction of the current block;
    storing, in the buffer, the affine motion vector of the neighboring block as a candidate affine motion vector for affine motion prediction of the current block when the size of the neighboring block is greater than or equal to the minimum size threshold; and
    processing the current block using affine motion prediction.

2. The method of claim 1, wherein the method is performed by a decoder, and wherein the video data is obtained from an encoded video bitstream provided by an encoder.

3. The method of claim 2, wherein the minimum size threshold is obtained from signaling provided by the encoder.

4. The method of claim 3, wherein the signaling comprises a logarithmic representation of the minimum size threshold.

5. The method of claim 1, further comprising:
    obtaining the affine motion vector of the neighboring block from the buffer, the buffer including a local buffer of the current coding unit.

6. The method of claim 5, wherein one or more local buffers of the current coding unit include the buffer, the one or more local buffers comprising a first set of one or more local buffers and a second set of one or more local buffers, wherein:

the first set of one or more local buffers comprises one or more affine motion vectors of one or more neighboring blocks of the current block; and the second set of one or more local buffers comprises one or more motion vectors of one or more neighboring blocks of the current block.

7. The method of claim 6, wherein:

the first set of one or more local buffers comprises one or more row buffers; and the second set of one or more local buffers comprises one or more column buffers.

8. The method of claim 6, wherein:

the first set of one or more local buffers comprises a first subset of the one or more affine motion vectors and the one or more motion vectors; and the second set of one or more local buffers comprises a second subset of the one or more affine motion vectors.

9. The method of claim 8, wherein the one or more affine motion vectors of the one or more neighboring blocks comprise one or more control point motion vectors, wherein:

the first subset of the one or more affine motion vectors comprises top-right control point motion vectors for a top-right portion of the one or more neighboring blocks and bottom-left control point motion vectors for a bottom-left portion of the one or more neighboring blocks; and the second subset of the one or more affine motion vectors comprises top-left control point motion vectors for a top-left portion of the one or more neighboring blocks.

10. The method of claim 1, wherein the affine motion vector of the neighboring block comprises one or more scaling variables and one or more position variables.

11. The method of claim 1, wherein the method is performed by an encoder.

12. The method of claim 1, wherein the current coding unit comprises a current coding tree unit (CTU).

13. An apparatus for processing video data, the apparatus comprising:

a memory; and a processor implemented in circuitry and configured to:
obtain video data for a current block of a current coding unit;
determine that a size of a neighboring block of the current block in the current coding unit is greater than a minimum block size for affine motion prediction, the minimum block size including a first minimum width and a first minimum height;
determine the size of the neighboring block is less than a minimum size threshold for using one or more affine motion vectors of the neighboring block as one or more affine motion vectors for the current block, the minimum size threshold including a second minimum width and a second minimum height, wherein at least one of the second minimum width is larger than the first minimum width and the second minimum height is larger than the first minimum height;
exclude, from a buffer, an affine motion vector of the neighboring block when the size of the neighboring block is less than the minimum size threshold, the buffer including at least one candidate affine motion vector for affine motion prediction of the current block;
store, in the buffer, the affine motion vector of the neighboring block as a candidate affine motion vector for affine motion prediction of the current block when the size of the neighboring block is greater than or equal to the minimum size threshold; and
process the current block using affine motion prediction.

14. The apparatus of claim 13, wherein the apparatus comprises a decoder, and wherein the video data is obtained from an encoded video bitstream provided by an encoder.

15. The apparatus of claim 14, wherein the minimum size threshold is obtained from signaling provided by the encoder.

16. The apparatus of claim 15, wherein the signaling comprises a logarithmic representation of the minimum size threshold.

17. The apparatus of claim 13, wherein the processor is further configured to:
obtain the affine motion vector of the neighboring block from the buffer, the buffer including a local buffer of the current coding unit.

18. The apparatus of claim 17, wherein one or more local buffers of the current coding unit include the buffer, the one or more local buffers comprising a first set of one or more local buffers and a second set of one or more local buffers, wherein:

the first set of one or more local buffers comprises one or more affine motion vectors of one or more neighboring blocks of the current block; and the second set of one or more local buffers comprises one or more motion vectors of one or more neighboring blocks of the current block.

19. The apparatus of claim 18, wherein:

the first set of one or more local buffers comprises one or more row buffers; and the second set of one or more local buffers comprises one or more column buffers.

20. The apparatus of claim 18, wherein:

the first set of one or more local buffers comprises a first subset of the one or more affine motion vectors and the one or more motion vectors; and the second set of one or more local buffers comprises a second subset of the one or more affine motion vectors.

21. The apparatus of claim 20, wherein the one or more affine motion vectors of the one or more neighboring blocks comprise one or more control point motion vectors, wherein:

the first subset of the one or more affine motion vectors comprises top-right control point motion vectors for a top-right portion of the one or more neighboring blocks and bottom-left control point motion vectors for a bottom-left portion of the one or more neighboring blocks; and the second subset of the one or more affine motion vectors comprises top-left control point motion vectors for a top-left portion of the one or more neighboring blocks.

22. The apparatus of claim 13, wherein the affine motion vector of the neighboring block comprises one or more scaling variables and one or more position variables.

23. A non-transitory computer-readable medium having stored thereon instructions that, when executed by one or more processors, cause the one or more processors to:
obtain video data for a current block of a current coding unit;
determine that a size of a neighboring block of the current block in the current coding unit is greater than a minimum block size for affine motion prediction, the minimum block size including a first minimum width and a first minimum height;
determine the size of the neighboring block is less than a minimum size threshold for using one or more affine motion vectors of the neighboring block as one or more affine motion vectors for the current block, the minimum size threshold including a second minimum width and a second minimum height, wherein at least one of the second minimum width is larger than the first minimum width and the second minimum height is larger than the first minimum height;

exclude, from a buffer, an affine motion vector of the neighboring block when the size of the neighboring block is less than the minimum size threshold, the buffer including at least one candidate affine motion vector for affine motion prediction of the current block;

store, in the buffer, the affine motion vector of the neighboring block as a candidate affine motion vector for affine motion prediction of the current block when the size of the neighboring block is greater than or equal to the minimum size threshold; and process the current block using affine motion prediction.

24. The apparatus of claim 13, wherein the current coding unit comprises a current coding tree unit (CTU).

25. The apparatus of claim 13, wherein the apparatus comprises an encoder.

26. The non-transitory computer-readable medium of claim 23, wherein the video data is obtained from an encoded video bitstream provided by an encoder.

27. The non-transitory computer-readable medium of claim 26, wherein the minimum size threshold is obtained from signaling provided by the encoder.

28. The non-transitory computer-readable medium of claim 27, wherein the signaling comprises a logarithmic representation of the minimum size threshold.

29. The non-transitory computer-readable medium of claim 23, further comprising instructions that, when executed by the one or more processors, cause the one or more processors to:

obtaining the affine motion vector of the neighboring block from the buffer, the buffer including a local buffer of the current coding unit.

30. The non-transitory computer-readable medium of claim 29, wherein one or more local buffers of the current coding unit include the buffer, the one or more local buffers comprising a first set of one or more local buffers and a second set of one or more local buffers, wherein:

the first set of one or more local buffers comprises one or more affine motion vectors of one or more neighboring blocks of the current block; and the second set of one or more local buffers comprises one or more motion vectors of one or more neighboring blocks of the current block.

* * * * *